US012651780B2

(12) United States Patent
Yokoyama et al.

(10) Patent No.: US 12,651,780 B2
(45) Date of Patent: Jun. 9, 2026

(54) BATTERY USING LAYERED DOUBLE HYDROXIDE-LIKE COMPOUND

(71) Applicant: NGK INSULATORS, LTD.,
Nagoya-City (JP)

(72) Inventors: Shohei Yokoyama, Nagoya-City (JP);
Sho Yamamoto, Nagoya-City (JP);
Naohito Yamada, Tajimi-City (JP);
Naoko Inukai, Nagoya-City (JP)

(73) Assignee: NGK INSULATORS, LTD., Nagoya
(JP)

( * ) Notice: Subject to any disclaimer, the term of this
patent is extended or adjusted under 35
U.S.C. 154(b) by 637 days.

(21) Appl. No.: 18/175,751

(22) Filed: Feb. 28, 2023

(65) Prior Publication Data

US 2023/0207888 A1     Jun. 29, 2023

Related U.S. Application Data

(63) Continuation of application No.
PCT/JP2021/029097, filed on Aug. 5, 2021.

(30) Foreign Application Priority Data

Nov. 30, 2020     (JP) ................................. 2020-198981

(51) Int. Cl.
H01M 10/26       (2006.01)
H01M 50/446      (2021.01)
H01M 50/491      (2021.01)

(52) U.S. Cl.
CPC ......... H01M 10/26 (2013.01); H01M 50/446
(2021.01); H01M 50/491 (2021.01); H01M
2300/0014 (2013.01)

(58) Field of Classification Search
None
See application file for complete search history.

(56) References Cited

U.S. PATENT DOCUMENTS

| | | | |
|---|---|---|---|
| 6,183,900 B1 | 2/2001 | Bronoel et al. | |
| 9,293,791 B2 | 3/2016 | Yamada et al. | |
| 9,391,349 B2 | 7/2016 | Yamada et al. | |
| 10,290,847 B2 | 5/2019 | Kitoh et al. | |
| 10,297,861 B2 | 5/2019 | Yonehara et al. | |
| 10,700,385 B2 | 6/2020 | Yokoyama et al. | |
| 10,903,495 B2 | 1/2021 | Sonoyama et al. | |
| 11,431,034 B2 | 8/2022 | Yamamoto et al. | |
| 2014/0315099 A1* | 10/2014 | Yamada ................ | H01M 10/24 |
| | | | 429/304 |
| 2017/0200981 A1* | 7/2017 | Yokoyama .............. | H01M 4/52 |
| 2017/0214019 A1 | 7/2017 | Yokoyama et al. | |
| 2021/0184268 A1* | 6/2021 | Yamamoto .......... | H01M 8/0236 |

FOREIGN PATENT DOCUMENTS

| | | |
|---|---|---|
| JP | 2001-500661 A | 1/2001 |
| WO | 2013/118561 A1 | 8/2013 |
| WO | 2013/161516 A1 | 10/2013 |
| WO | 2014/119665 A1 | 8/2014 |
| WO | 2016/051934 A1 | 4/2016 |
| WO | 2016/067884 A | 5/2016 |
| WO | 2016/076047 A1 | 5/2016 |
| WO | 2017/163906 A1 | 9/2017 |
| WO | 2018/062360 A1 | 4/2018 |
| WO | 2019/131221 A1 | 7/2019 |
| WO | 2020/255856 A1 | 12/2020 |

OTHER PUBLICATIONS

English translation of Written Opinion of the International Search
Authority (Application No. PCT/JP2021/029097) dated Oct. 26,
2021.
International Search Report and Written Opinion (Application No.
PCT/JP2021/029097) dated Oct. 26, 2021.

* cited by examiner

*Primary Examiner* — Anca Eoff
(74) *Attorney, Agent, or Firm* — BURR PATENT LAW,
PLLC

(57)          ABSTRACT

Provided is a battery including a positive electrode; a
negative electrode; an electrolytic solution being an aqueous
alkali metal hydroxide solution; and a layered double
hydroxide (LDH)-like compound provided so as to be in
contact with the electrolytic solution. A metal compound
containing at least one metal element constituting the LDH-
like compound is dissolved in the electrolytic solution such
that erosion of the LDH-like compound by the electrolytic
solution is suppressed.

16 Claims, 21 Drawing Sheets

BATTERY USING LAYERED DOUBLE HYDROXIDE-LIKE COMPOUND

CROSS-REFERENCE TO RELATED APPLICATIONS

This application is a continuation application of PCT/JP2021/029097 filed Aug. 5, 2021, which claims priority to Japanese Patent Application No. 2020-198981 filed Nov. 30, 2020, the entire contents all of which are incorporated herein by reference.

BACKGROUND OF THE INVENTION

1. Field of the Invention

The present invention relates to a battery comprising a layered double hydroxide (LDH)-like compound.

2. Description of the Related Art

In secondary zinc batteries, such as secondary nickel-zinc batteries and secondary air-zinc batteries, it is known that metallic zinc dendrites precipitate on negative electrodes during a charge mode, penetrate through voids in separators composed of, for example, non-woven fabrics, and reach positive electrodes, resulting in short circuit. The short circuit caused by such zinc dendrites occurs during repeated charge/discharge operations, leading to a reduction in service lives of the secondary zinc batteries.

In order to solve such a problem, secondary zinc batteries have been proposed that include layered double hydroxide (LDH) separators that selectively permeate hydroxide ions while blocking the penetration of zinc dendrites. For example, Patent Literature 1 (WO2013/118561) discloses a secondary nickel-zinc battery including an LDH separator disposed between a positive electrode and a negative electrode. Patent Literature 2 (WO2016/076047) discloses a separator structure including an LDH separator that is fit in or joined to a resin frame and is dense enough to restrict permeation of gas and/or water. Patent Literature 2 also discloses that the LDH separator may be a composite with a porous substrate. In addition, Patent Literature 3 (WO2016/067884) discloses various methods for forming a dense LDH membrane on the surface of a porous substrate to give a composite material (an LDH separator). These methods include the steps of: uniformly bonding an initiating material capable of giving origins of crystal growth of LDH to the porous substrate; and then subjecting the porous substrate to hydrothermal treatment in an aqueous raw material solution to form a dense LDH membrane on the surface of the porous substrate.

Patent Literature 4 (WO2013/161516) discloses an application of a hydroxide-ion-conductive ceramic separator to a battery other than a zinc secondary battery; specifically, a lithium-air secondary battery including, as an anion exchanger, an LDH-containing solid electrolyte composed of an LDH having the aforementioned basic composition. According to this patent literature, the anion exchanger can prevent the intrusion of carbon dioxide into the battery. Patent Literature 5 (WO2014/119665) discloses that an anion-conductive material that may contain an LDH and a polymer is used for a battery component, such as a separator, an electrolyte, or an electrode protectant. According to this patent literature, the morphological variation of a zinc electrode active material is reduced if a membrane containing an LDH (e.g., hydrotalcite) and a polymer (e.g., polytetrafluoroethylene) is formed on the zinc-compound-containing electrode through which current flows.

The aforementioned alkaline secondary batteries generally contain an electrolytic solution composed of an aqueous potassium hydroxide (KOH) solution. Techniques for improving the properties of such an electrolytic solution have been proposed. For example, Patent Literature 5 (JP2001-500661A) discloses an alkaline storage battery including a zinc negative electrode that is in contact with an electrolytic solution composed of an aqueous KOH solution (initial concentration: 4 to 8 M) containing aluminum (70 to 100 g), wherein the solubility of zinc in the electrolytic solution is controlled through addition of aluminum. The ion-exchange membrane used in Examples described in this patent literature is not a ceramic separator, but a hydrocarbon ion-exchange membrane.

On the other hand, Patent Literature 7 (WO2016/051934) discloses a battery including a positive electrode; a negative electrode; an electrolytic solution being an aqueous alkali metal hydroxide solution; and a layered double hydroxide having a fundamental composition represented by the formula: $M^{2+}_{1-x}M^{3+}_x(OH)_2A^{n-}_{x/n} \cdot mH_2O$ where $M^{2+}$ represents a divalent cation, $M^{3+}$ represents a trivalent cation, $A^{n-}$ represents an n-valent anion, n is an integer of 1 or more, x is 0.1 to 0.4, and m is any real number, the layered double hydroxide being in contact with the electrolytic solution, in which a metal compound containing a metal corresponding to $M^{2+}$ and/or $M^{3+}$ is dissolved in the electrolytic solution such that erosion of the layered double hydroxide by the electrolytic solution is suppressed.

CITATION LIST

Patent Literature

Patent Literature 1: WO2013/118561
Patent Literature 2: WO2016/076047
Patent Literature 3: WO2016/067884
Patent Literature 4: WO2013/161516
Patent Literature 5: WO2014/119665
Patent Literature 6: JP2001-500661A
Patent Literature 7: WO2016/051934

SUMMARY OF THE INVENTION

The present applicant has already successfully developed a highly-densified LDH separator (layered double hydroxide separator) exhibiting hydroxide ion conductivity and yet water impermeability and gas impermeability. The use of such a separator (or a separator provided with a porous substrate) in a secondary battery, such as a zinc-nickel battery or a zinc-air secondary battery, can prevent the short circuit caused by dendritic zinc or the intrusion of carbon dioxide (which may cause problems especially in a metal-air secondary battery). The degradation of the LDH separator should be reduced for maintaining these effects over a long period of time. The degradation of the LDH should also be reduced in the case where the battery includes, instead of the LDH separator, a separator containing the LDH and an additional material (e.g., a polymer) or an LDH-containing member. The electrolytic solution used in the LDH-containing battery (e.g., a metal-air battery or a nickel-zinc battery) is required to have high hydroxide ion conductivity; hence, the electrolytic solution is desirably a strongly alkaline aqueous KOH solution having a pH of about 14. Thus, the LDH is desired to have alkali resistance high enough to be prevented from degradation in such a strongly alkaline electrolytic solution.

The inventors have now found that by using a layered double hydroxide (LDH)-like compound, which is a hydroxide and/or an oxide having a layered crystal structure with a predetermined composition, as a hydroxide ion-conductive substance instead of conventional LDHs, it is possible to attain excellent alkali resistance. The inventors have also found that the degradation of an LDH-like compound (which is contained in a battery) caused by an alkaline electrolytic solution can be significantly reduced through intentional dissolution of a specific metal compound in the alkaline electrolytic solution. The inventors have further found that the use of the metal-compound-containing electrolytic solution can produce a highly reliable battery wherein the degradation of an LDH-like compound caused by an alkaline electrolytic solution can be significantly reduced.

An object of the present invention is to provide a highly reliable battery having excellent alkali resistance such that the degradation of an LDH-like compound contained in the battery can be significantly reduced.

An aspect of the present invention provides a battery with a layered double hydroxide (LDH)-like compound, the battery comprising:

a positive electrode;

a negative electrode;

an electrolytic solution being an aqueous alkali metal hydroxide solution; and an LDH-like compound provided so as to be in contact with the electrolytic solution, wherein a metal compound containing at least one metal element constituting the LDH-like compound is dissolved in the electrolytic solution such that erosion of the LDH-like compound by the electrolytic solution is suppressed.

In a preferred aspect of the present invention, the battery comprises the LDH-like compound as a separator exhibiting hydroxide ion conductivity, and the separator separates the positive electrode from the negative electrode.

In a more preferred aspect of the present invention, the positive electrode comprises nickel hydroxide and/or nickel oxyhydroxide;

the electrolytic solution comprises a positive-electrode electrolytic solution in which the positive electrode is immersed, and a negative-electrode electrolytic solution in which the negative electrode is immerse;

the battery comprises a container accommodating the positive electrode, the positive-electrode electrolytic solution, the negative electrode, and the negative-electrode electrolytic solution; and the separator is disposed in the container to separate a positive-electrode chamber accommodating the positive electrode and the positive-electrode electrolytic solution from a negative-electrode chamber accommodating the negative electrode and the negative-electrode electrolytic solution, whereby the battery serves as a nickel-zinc secondary battery.

In a still more preferred aspect of the present invention, the positive electrode is an air electrode;

the negative electrode is immersed in the electrolytic solution;

the battery comprises a container accommodating the negative electrode and the electrolytic solution, the container having an opening; and the separator is disposed to cover the opening to be in contact with the electrolytic solution and to define a negative-electrode hermetic space with the container such that the air electrode is separated from the electrolytic solution by the separator through which hydroxide ions pass, whereby the battery serves as a zinc-air secondary battery.

DETAILED DESCRIPTION OF THE INVENTION

Battery

Figure 1:
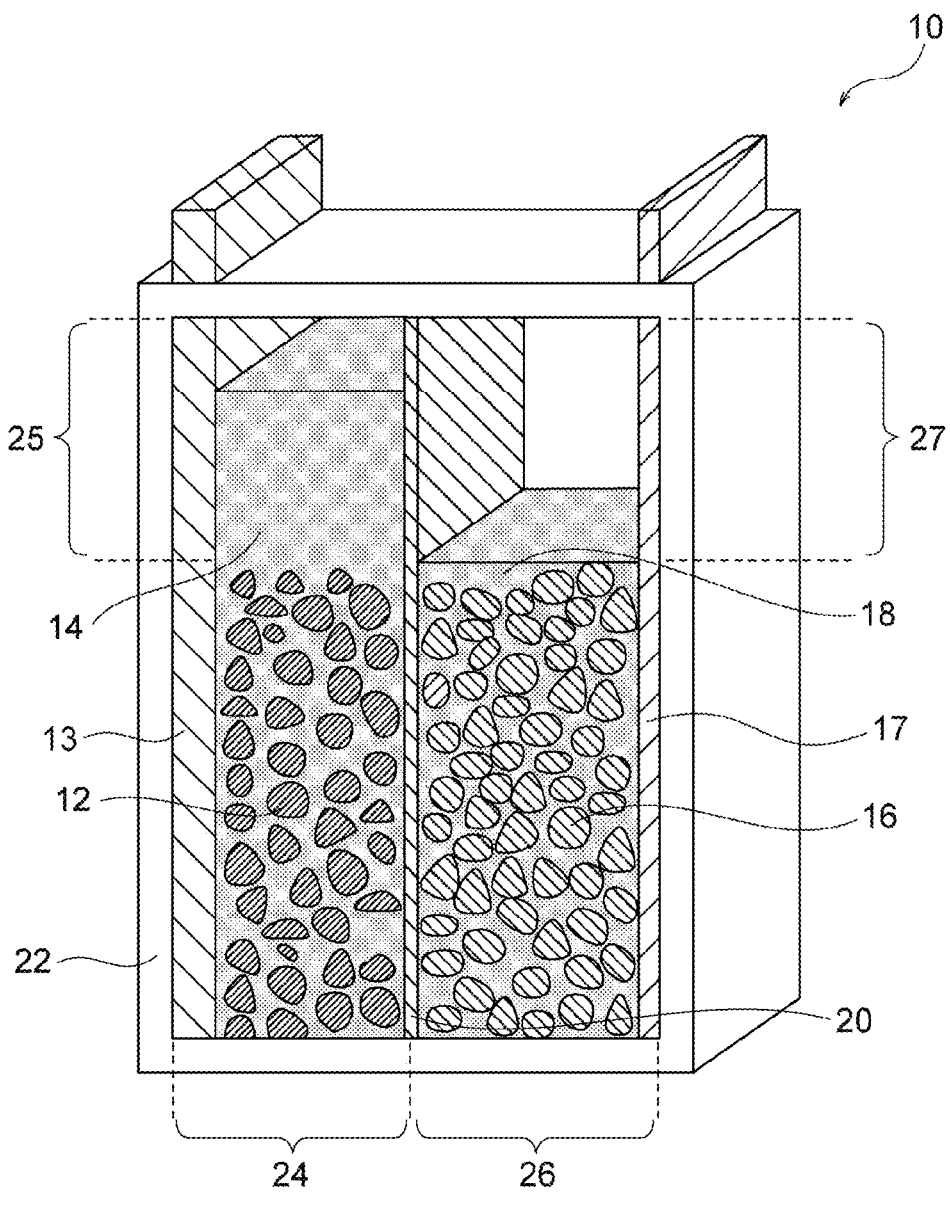
FIG. 1 is a schematic illustration of an exemplary nickel-zinc battery according to an embodiment of the present invention, the battery being in a discharge end state.

The battery of the present invention comprises a layered double hydroxide (LDH)-like compound. The "LDH-like compound" is defined herein as a hydroxide and/or an oxide having a layered crystal structure that cannot be called LDH but is analogous to LDH, for which no peak attributable to LDH is detected in X-ray diffraction method. The LDH-like compound may be incorporated into any component contained in the battery. The component containing the LDH-like compound may be in any form that is in contact with the electrolytic solution. The component containing the LDH-like compound is preferably, for example, a separator, an electrolyte, or an electrode protectant (e.g., a negative electrode protectant). Such a component exhibits desirable properties (e.g., hydroxide ion conductivity) provided by the LDH-like compound and contributes to an improvement in performance of the battery. The component containing the LDH-like compound is particularly preferably a separator. The separator may be composed of the LDH-like compound alone or in the form of a composite containing the LDH-like compound and an additional material (e.g., a polymer). In a preferred embodiment, the electrode, such as a negative electrode (e.g., a negative electrode containing zinc and/or zinc oxide), is coated with the LDH-like compound. As described above, the LDH-like compound may be incorporated into any battery component, and the battery component may be composed of the LDH-like compound alone or in the form of a composite containing the LDH-like compound and an additional material (e.g., a polymer). The battery may be a primary or secondary battery, but is preferably a secondary battery. Examples of the battery include secondary batteries to which the LDH-like compound is applicable, such as nickel-zinc secondary batteries, silver oxide-zinc secondary batteries, manganese oxide-zinc secondary batteries, zinc-air secondary batteries, other alkali-zinc secondary batteries, and lithium-air secondary batteries. Particularly preferred are a nickel-zinc secondary battery and a zinc-air secondary battery. Although the present invention will be described in detail below with reference to a nickel-zinc secondary battery (FIG. 1) and a zinc-air secondary battery (FIGS. 3A and 3B), the present invention should not be construed to be limited to these secondary batteries. Thus, the present invention encompasses any secondary battery to which an LDH-like compound can be applied.

A battery according to an embodiment of the present invention includes a positive electrode, a positive electrode, a negative electrode, an electrolytic solution, and a layered double hydroxide (LDH)-like compound. The battery optionally includes a separator that is in contact with the electrolytic solution and separates the positive electrode from the negative electrode. The LDH-like compound is provided so as to be in contact with the electrolytic solution. As described above, the LDH-like compound may be in any form of battery component, such as a separator. The electrolytic solution is an aqueous alkali metal hydroxide (KOH) solution. As described above, the electrolytic solution used in the battery to which the LDH-like compound is applied (e.g., a metal-air battery or a nickel-zinc battery) is required to have high hydroxide ion conductivity; hence, the electrolytic solution is desirably a strongly alkaline aqueous KOH solution having a pH of about 14. Thus, the LDH-like compound is desired to have alkali resistance high enough to be prevented from degradation in such a strongly alkaline electrolytic solution. In connection therewith, the inventors have found that by using a layered double hydroxide (LDH)-like compound, which is a hydroxide and/or an oxide having a layered crystal structure with a predetermined composition, as a hydroxide ion-conductive substance instead of conventional LDHs, it is possible to attain excellent alkali resistance. The inventors have also found that the degradation of the LDH-like compound caused by an alkaline electrolytic solution can be significantly reduced through intentional dissolution of a specific metal compound in the alkaline electrolytic solution. In the battery of the present invention, a metal compound containing at least one metal element constituting the LDH-like compound is dissolved in the electrolytic solution such that erosion of the LDH-like compound by the electrolytic solution is suppressed. Since the LDH-like compound is prevented from being eroded by the electrolytic solution, the battery can maintain high hydroxide ion conductivity inherent in the LDH-like compound and high density derived from the component containing the LDH-like compound over a long period of time. Thus, the present invention can provide a highly reliable secondary battery having excellent alkali resistance such that the degradation of an LDH-like compound (which is contained in the battery) caused by an alkaline electrolytic solution can be significantly reduced.

Preferably, the LDH-like compound is:

(a) a hydroxide and/or an oxide with a layered crystal structure, containing: Mg; and one or more elements, which include at least Ti, selected from the group consisting of Ti, Y, and Al, or (b) a hydroxide and/or an oxide with a layered crystal structure, comprising (i) Ti, Y, and optionally Al and/or Mg, and (ii) at least one additive element M selected from the group consisting of In, Bi, Ca, Sr, and Ba, or (c) a hydroxide and/or an oxide with a layered crystal structure, comprising Mg, Ti, Y, and optionally Al and/or In, wherein in (c) the LDH-like compound is present in a form of a mixture with $In(OH)_3$.

According to a preferred embodiment (a) of the present invention, the LDH-like compound is a hydroxide and/or an oxide with a layered crystal structure containing: Mg; and one or more elements, which include at least Ti, selected from the group consisting of Ti, Y, and Al. Accordingly, the LDH-like compound is typically a composite hydroxide and/or a composite oxide of Mg, Ti, optionally Y, and optionally Al. The aforementioned elements may be replaced with other elements or ions to the extent that the basic properties of the LDH-like compound are not impaired, but the LDH-like compound is preferably free from Ni. For example, the LDH-like compound may further contain Zn and/or K. This can further improve the ion conductivity of the LDH-like compound separator.

The LDH-like compound can be identified by X-ray diffraction. Specifically, the LDH-like compound has a peak that is derived from the LDH-like compound and detected in the range of typically $5° \leq 2\theta \leq 10°$, more typically $7° \leq 2\theta \leq 10°$, when X-ray diffraction is performed on its surface. As generally known, an LDH is a substance having an alternating laminated structure in which exchangeable anions and $H_2O$ are present as an interlayer between stacked basic hydroxide layers. In this regard, when the LDH is measured by X-ray diffraction, a peak due to the crystal structure of the LDH (that is, the (003) peak of LDH) is originally detected at a position of $2\theta = 11°$ to $12°$. In contrast, when the LDH-like compound is measured by X-ray diffraction, a peak is typically detected in such a range shifted toward the low angle side from the peak position of the LDH. Further, the interlayer distance in the layered crystal structure can be determined by Bragg's equation using 2θ corresponding to peaks derived from the LDH-like compound in X-ray diffraction. The interlayer distance in the layered crystal structure constituting the LDH-like compound thus determined is typically 0.883 to 1.8 nm, more typically 0.883 to 1.3 nm.

The LDH-like compound according to the above embodiment (a) preferably has an atomic ratio Mg/(Mg+Ti+Y+Al) in the LDH-like compound, as determined by energy dispersive X-ray spectroscopy (EDS), of 0.03 to 0.25, more preferably 0.05 to 0.2. Further, an atomic ratio Ti/(Mg+Ti+Y+Al) in the LDH-like compound is preferably 0.40 to 0.97, more preferably 0.47 to 0.94. Further, an atomic ratio Y/(Mg+Ti+Y+Al) in the LDH-like compound is preferably 0 to 0.45, more preferably 0 to 0.37. Further, an atomic ratio Al/(Mg+Ti+Y+Al) in the LDH-like compound is preferably 0 to 0.05, more preferably 0 to 0.03. Within such a range, the alkali resistance is further excellent, and the effect of suppressing short circuits due to zinc dendrites (that is, dendrite resistance) can be achieved more effectively. Meanwhile, conventionally known LDHs can be expressed by a basic composition represented by the formula: $M^{2+}_{1-x}M^{3+}_x(OH)_2A^{n-}_{x/n} \cdot mH_2O$ (in the formula, $M^{2+}$ is a divalent cation, $M^{3+}$ is a trivalent cation, $A^{n-}$ is an n-valent anion, n is an integer of 1 or more, x is 0.1 to 0.4, and m is 0 or more). In contrast, the aforementioned atomic ratios in the LDH-like compound generally deviate from those in the aforementioned formula of LDH. Therefore, it can be said that the LDH-like compound in the present embodiment generally has composition ratios (atomic ratios) different from those of such a conventional LDH. The EDS analysis is preferably performed by 1) capturing an image at an acceleration voltage of 20 kV and a magnification of 5,000 times, 2)

performing analysis at three points at intervals of about 5 μm in the point analysis mode, 3) repeating procedures 1) and 2) above once again, and 4) calculating an average of the six points in total, using an EDS analyzer (for example, X-act, manufactured by Oxford Instruments).

According to another embodiment (b), the LDH-like compound may be a hydroxide and/or an oxide with a layered crystal structure containing (i) Ti, Y, and optionally Al and/or Mg, and (ii) an additive element M. Therefore, the LDH-like compound is typically a complex hydroxide and/or a complex oxide with Ti, Y, the additive element M, and optionally Al and optionally Mg. The additive element M is In, Bi, Ca, Sr, Ba, or combinations thereof. The elements described above may be replaced by other elements or ions to the extent that the basic properties of the LDH-like compound are not impaired, and the LDH-like compound is preferably free of Ni.

The LDH-like compound according to the above embodiment (b) preferably has an atomic ratio of Ti/(Mg+Al+Ti+Y+M) of 0.50 to 0.85 in the LDH-like compound, as determined by energy dispersive X-ray spectroscopy (EDS) and more preferably has the atomic ratio of 0.56 to 0.81. An atomic ratio of Y/(Mg+Al+Ti+Y+M) in the LDH-like compound is preferably 0.03 to 0.20 and more preferably 0.07 to 0.15. An atomic ratio of M/(Mg+Al+Ti+Y+M) in the LDH-like compound is preferably 0.03 to 0.35 and more preferably 0.03 and 0.32. An atomic ratio of Mg/(Mg+Al+Ti+Y+M) in the LDH-like compound is preferably 0 to 0.10 and more preferably 0 to 0.02. In addition, an atomic ratio of Al/(Mg+Al+Ti+Y+M) in the LDH-like compound is preferably 0 to 0.05 and more preferably 0 to 0.04. The ratios within the above ranges enable to achieve more excellent alkali resistance and a short-circuit inhibition effect caused by zinc dendrite (i.e., dendrite resistance) in more efficient manner. By the way, a conventionally known LDH can be represented by the basic composition of the formula: $M^{2+}_{1-x}M^{3+}_x(OH)_2A^{n-}_{x/n} \cdot mH_2O$ wherein $M^{2+}$ is a divalent cation, $M^{3+}$ is a trivalent cation, $A^{n-}$ is an n-valent anion, n is an integer of 1 or greater, x is 0.1 to 0.4, and m is an integer of to 0 or greater. In contrast, the above atomic ratio in the LDH-like compound generally deviates from that of the above formula of LDH. Therefore, the LDH-like compound in the present embodiment can be generally said to have a composition ratio (atomic ratio) different from that of conventional LDH. The EDS analysis is preferably carried out with an EDS analyzer (for example, X-act manufactured by Oxford Instruments) by 1) capturing an image at an accelerating voltage of 20 kV and a magnification of 5,000 times, 2) carrying out a three-point analysis at about 5 μm intervals in a point analysis mode, 3) repeating the above 1) and 2) once more, and 4) calculating an average value of a total of 6 points.

According to yet another embodiment (c), the LDH-like compound may be a hydroxide and/or an oxide with a layered crystal structure, comprising Mg, Ti, Y, and optionally Al and/or In, in which the LDH-like compound is present in a form of a mixture with $In(OH)_3$. The LDH-like compound of the present embodiment is a hydroxide and/or an oxide with a layered crystal structure containing Mg, Ti, Y, and optionally Al and/or In. Therefore, the typical LDH-like compound is a complex hydroxide and/or a complex oxide with Mg, Ti, Y, optionally Al, and optionally In. Here, In that can be contained in the LDH-like compound may be not only one intentionally added, but also one unavoidably incorporated in the LDH-like compound derived from formation of $In(OH)_3$ or the like. The elements described above may be replaced by other elements or ions to the extent that the basic properties of the LDH-like compound are not impaired, and the LDH-like compound is preferably free of Ni. By the way, a conventionally known LDH can be represented by the basic composition of the formula: $M^{2+}_{1-x}M^{3+}_x(OH)_2A^{n-}_{x/n}\cdot mH_2O$ wherein $M^{2+}$ is a divalent cation, $M^{3+}$ is a trivalent cation, $A^{n-}$ is an n-valent anion, n is an integer of 1 or greater, x is 0.1 to 0.4, and m is 0 or greater. In contrast, the atomic ratio in the LDH-like compound generally deviates from that of the above formula of LDH. Therefore, the LDH-like compound in the present embodiment can be generally said to have a composition ratio (atomic ratio) different from that of conventional LDH.

The mixture according to the above embodiment (c) contains not only the LDH-like compound but also $In(OH)_3$ (typically composed of the LDH-like compound and $In(OH)_3$). $In(OH)_3$ contained effectively improves alkali resistance and dendrite resistance in the LDH-like compound or the separator using it. The content ratio of $In(OH)_3$ in the mixture is preferably an amount that can improve the alkali resistance and dendrite resistance without impairing hydroxide-ion conductivity of the LDH-like compound or the separator using it and is not limited to any particular amount. $In(OH)_3$ may have a cubic crystal structure and may be in a configuration where the crystals thereof are surrounded by the LDH-like compounds. The $In(OH)_3$ can be identified by X-ray diffraction; and X-ray diffraction measurement is preferably conducted according to the procedure described in the Example below.

As described above, the LDH-like compound may be used in combination with an additional material in a battery component. The additional material may be, for example, a polymer, a zinc-containing compound, alumina, silica, a conductive carbon material, or a conductive ceramic material. The additional material is particularly preferably a polymer. Examples of the polymer include hydrocarbon-containing polymers, such as polyethylene and polypropylene; aromatic-group-containing polymers, such as polystyrene; ether-group-containing polymers, such as poly(alkylene glycol); hydroxy-group-containing polymers, such as poly(vinyl alcohol) and poly(α-hydroxymethylacrylic acid salt); amide-bond-containing polymers, such as polyamide, nylon, polyacrylamide, polyvinylpyrrolidone, and N-substituted polyacrylamide; imide-bond-containing polymers, such as polymaleimide; carboxyl-group-containing polymers, such as poly((meth)acrylic acid), poly(maleic acid), poly(itaconic acid), and poly(methyleneglutaric acid); polymers containing carboxylic acid salts, such as poly((meth)acrylic acid salt), poly(maleic acid salt), poly(itaconic acid salt), and poly(methyleneglutaric acid salt); halogen-containing polymers, such as poly(vinyl chloride), poly(vinylidene fluoride), and polytetrafluoroethylene; polymers formed through bonding of ring-opened epoxy groups, such as epoxy resins; polymers containing sulfonic acid salts; polymers containing quaternary ammonium salts and quaternary phosphonium salts; ion-exchange polymers for use in cation-exchange membranes and anion-exchange membranes; natural rubbers; synthetic rubbers, such as styrene-butadiene rubber (SBR); saccharides, such as cellulose, cellulose acetate, hydroxyalkyl cellulose, carboxymethyl cellulose, hydroxyethyl cellulose, chitin, chitosan, and alginic acid (salts); amino-group-containing polymers, such as polyethyleneimine; carbamate-group-containing polymers; carbamide-group-containing polymers; epoxy-group-containing polymers; polymers containing heterocyclic rings and/or ionized heterocyclic rings; polymer alloys; heteroatom-containing polymers; and low-molecular-weight surfactants.

The electrolytic solution may be any alkaline electrolytic solution that can be used in batteries as far as the electrolytic solution is an aqueous alkali metal hydroxide solution. Each of the positive-electrode electrolytic solution 14 and the negative-electrode electrolytic solution 18 illustrated in FIG. 1 is preferably an aqueous alkali metal hydroxide solution. Examples of the alkali metal hydroxide include potassium hydroxide, sodium hydroxide, lithium hydroxide, and ammonium hydroxide. More preferred is potassium hydroxide. The electrolytic solution used in a zinc secondary battery may contain a zinc compound, such as zinc oxide or zinc hydroxide, for preventing the self-dissolution of a zinc alloy. As described above, the alkaline electrolytic solution may be in the form of a positive-electrode mixture and/or a negative-electrode mixture prepared through combination with the positive electrode and/or the negative electrode.

Alternatively, the alkaline electrolytic solution may be formed into a gel for preventing the leakage of the solution. The gelling agent is preferably a polymer that swells through absorption of the solvent of the electrolytic solution. Examples of the gelling agent include polymers, such as poly(ethylene oxide), poly(vinyl alcohol), and polyacrylamide; and starch.

As described above, a metal compound containing at least one metal element constituting the LDH-like compound is dissolved in the electrolytic solution. The metal compound is intentionally dissolved in the electrolytic solution. Preferably, the metal compound is preliminarily dissolved in the electrolytic solution; for example, during preparation of the battery or the electrolytic solution or before use of the battery. The metal compound may be dissolved in the electrolytic solution, for example, during use of the battery. In this case, the metal compound may be gradually dissolved in the electrolytic solution during use of the battery. The metal dissolved in the electrolytic solution may be in any form, and is typically in the form of a metal ion, a hydroxide, and/or a hydroxy complex. For example, Al dissolved in the electrolytic solution may be in the form of $Al^{3+}$, $Al(OH)^{2+}$, $Al(OH)_2^+$, $Al(OH)_3^0$, $Al(OH)_4^-$, or $Al(OH)_5^{2-}$. When the LDH-like compound contains Al, the metal compound preferably contains Al.

Preferred examples of the Al-containing metal compound include aluminum hydroxide, γ-alumina, α-alumina, boehmite, diaspore, hydrotalcite, and any combination of these compounds. The Al-containing metal compound is more preferably aluminum hydroxide and/or γ-alumina, most preferably aluminum hydroxide. The Al concentration of the electrolytic solution is preferably 0.001 mol/L or more, more preferably 0.01 mol/L or more, still more preferably 0.1 mol/L or more, yet more preferably 1.0 mol/L or more, particularly preferably 2.0 mol/L or more, very particularly preferably more than 3.0 mol/L, most preferably 3.3 mol/L or more. As described above, Al is preferably dissolved in an intentionally large amount. More preferably, Al is dissolved, for example, in an amount greater than that of Al contained in the LDH-like compound. Thus, the upper limit of the Al concentration of the electrolytic solution may be any value. The Al concentration may be equal to the saturation solubility of the Al compound in the electrolytic solution and is, for example, 20 mol/L or less or 10 mol/L or less.

The positive electrode may be appropriately selected depending on the type of the battery. The positive electrode may be an air electrode. The negative electrode may also be appropriately selected depending on the type of the battery. In the case of a zinc secondary battery, the negative electrode may contain zinc, a zinc alloy, and/or a zinc compound. Among the aforementioned battery components, at least the negative electrode and the alkaline electrolytic solution may be accommodated in a container (preferably a resin container). In a nickel-zinc battery 10 illustrated in FIG. 1, a container 22 accommodates a positive electrode 12 and a positive-electrode electrolytic solution 14. In a zinc-air secondary battery 30 illustrated in FIG. 3A including an air electrode 32 serving as a positive electrode, the air electrode 32 (positive electrode) is not necessarily accommodated in a container 46 completely and may be disposed (e.g., in the form of a lid) to cover an opening 46a of the container 46. The positive electrode is not necessarily separated from the alkaline electrolytic solution, and the positive electrode and the alkaline electrolyte may be combined together to form a positive-electrode mixture. The positive electrode in the form of an air electrode does not require an electrolytic solution in the positive electrode side. The negative electrode is not necessarily separated from the alkaline electrolytic solution, and the negative electrode and the alkaline electrolytic solution may be combined together to form a negative-electrode mixture. A positive-electrode collector may optionally be disposed in contact with the positive electrode, and a negative-electrode collector may optionally be disposed in contact with the negative electrode.

In a preferred embodiment of the present invention, the LDH-like compound included in the battery is in the form of a separator (i.e., an LDH-like compound separator) that separates the positive electrode from the negative electrode. As in the nickel-zinc battery 10 illustrated in FIG. 1, the separator 20 may be disposed in the container 22 to separate the positive-electrode chamber 24 accommodating the positive electrode 12 and the positive-electrode electrolytic solution 14 from the negative-electrode chamber 26 accommodating the negative electrode 16 and the negative-electrode electrolytic solution 18. Alternatively, as in the zinc-air secondary battery 30 illustrated in FIG. 3A, the separator 40 may be disposed to cover the opening 46a of the container 46 such that the separator 40 is in contact with the electrolytic solution 36 and defines a negative-electrode hermetic space with the container 46. Preferably, the separator, which has hydroxide ion conductivity, has been densified to have water impermeability and gas impermeability. The expression "separator has water impermeability and gas impermeability" refers to that the separator has a density sufficiently high to prevent the permeation of water and gas and is not a porous film or porous material having water or gas permeability. Thus, the aforementioned configuration of the zinc secondary battery is very effective for physically inhibiting the penetration of dendritic zinc (which may be formed during a charge mode of the battery) through the separator, to prevent the short circuit between the positive and negative electrodes. Meanwhile, the aforementioned configuration of the metal-air secondary battery is very effective for inhibiting the intrusion of carbon dioxide contained in air, to prevent precipitation of an alkaline carbonate (caused by carbon dioxide) in the electrolytic solution. In any case, the hydroxide ion conductivity of the separator leads to efficient migration of hydroxide ions between the positive electrode side (e.g., alkaline electrolytic solution or air electrode) and the negative electrode side (e.g., alkaline electrolytic solution), resulting in charge/discharge reaction between the positive and negative electrodes. As described above, the incorporation of the separator into a secondary battery (e.g., a zinc-nickel battery or a zinc-air secondary battery) can prevent the short circuit caused by dendritic zinc and the intrusion of carbon dioxide (which may cause problems especially in a metal-air secondary battery). The degradation of the separator should be reduced for maintaining these effects over a long period of time. The configuration according to this embodiment can significantly reduce the degradation of the hydroxide-ion-conductive separator containing the LDH-like compound (hereinafter, LDH-like compound separator) by the alkaline electrolytic solution.

The "LDH-like compound separator" is defined herein as a separator including an LDH-like compound and configured to selectively pass hydroxide ions exclusively by means of the hydroxide ion conductivity of the LDH-like compound. Preferred embodiments of the LDH-like compound separator are described later.

The LDH-like compound separator may be composed of the LDH-like compound or may comprise the LDH-like compound in combination with an additional material (e.g., a polymer). The additional material used in combination with the LDH-like compound does not necessarily have hydroxide ion conductivity. In any case, the use of the LDH-like compound having hydroxide ion conductivity as the separator can separate the electrolytic solutions between the positive and negative electrodes, and ensures conduction of hydroxide ions. The LDH-like compound separator is desirably densified to exhibit water impermeability and gas impermeability. For example, the LDH-like compound separator compound has a relative density of preferably 90% or more, more preferably 92% or more, still more preferably 95% or more, as determined by the Archimedes method. The density may be any value so long as the LDH-like compound separator is dense and hard enough to prevent the penetration of dendritic zinc. Such a dense and hard solid electrolyte may be produced through hydrothermal treatment.

Thus, a green compact which has not undergone hydrothermal treatment is not suitable as the LDH-like compound separator in the present invention because the compact is not dense and brittle in the solution. Any process other than hydrothermal treatment may be used for producing a dense and hard LDH-like compound separator.

The container accommodates at least the negative electrode and the alkaline electrolytic solution. In the nickel-zinc battery 10 illustrated in FIG. 1, the container 22 may accommodate the positive electrode 12 and the positive-electrode electrolytic solution 14 as described above. In the zinc-air secondary battery 30 illustrated in FIG. 3A including the air electrode 32 serving as a positive electrode, the air electrode 32 (positive electrode) is not necessarily accommodated in the container 46 and may be disposed (e.g., in the form of a lid) to cover the opening 46a of the container 46. In any case, the container preferably has a structure exhibiting liquid tightness and gas tightness. The container is preferably a resin container. The resin for the resin container preferably exhibits resistance to an alkali metal hydroxide, such as potassium hydroxide. More preferably, the resin is a polyolefin resin, an ABS resin, or a modified polyphenylene ether.

Still more preferably, the resin is an ABS resin or a modified polyphenylene ether, and a polypropylene resin. Preferably, the separator and/or the porous substrate is fixed to the container with a commercially available adhesive or thermal fusion bonding.

Nickel-Zinc Battery

In a preferred embodiment, the present invention provides a nickel-zinc secondary battery. FIG. 1 is a schematic illustration of an exemplary nickel-zinc battery according to this embodiment. FIG. 1 illustrates the initial state (i.e., discharge end state) of the nickel-zinc battery before charging. It should be understood that the nickel-zinc battery according to this embodiment may be in a full charge state. As illustrated in FIG. 1, the nickel-zinc battery 10 according to this embodiment includes a container 22, and the container 22 includes a positive electrode 12, a positive-electrode electrolytic solution 14, a negative electrode 16, a negative-electrode electrolytic solution 18, and a separator 20.

The positive electrode 12 contains nickel hydroxide and/or nickel oxyhydroxide. The positive-electrode electrolytic solution 14 is an alkaline electrolytic solution containing an alkali metal hydroxide. The positive electrode 12 is immersed in the positive-electrode electrolytic solution 14. The negative electrode 16 contains zinc and/or zinc oxide. The negative-electrode electrolytic solution 18 is an alkaline electrolytic solution containing an alkali metal hydroxide. The negative electrode 16 is immersed in the negative-electrode electrolytic solution 18. The container 22 accommodates the positive electrode 12, the positive-electrode electrolytic solution 14, the negative electrode 16, and the negative-electrode electrolytic solution 18. The positive electrode 12 is not necessarily separated from the positive-electrode electrolytic solution 14, and the positive electrode 12 and the positive-electrode electrolytic solution 14 may be combined into a positive-electrode mixture. Similarly, the negative electrode 16 is not necessarily separated from the negative-electrode electrolytic solution 18, and the negative electrode 16 and the negative-electrode electrolytic solution 18 may be combined into a negative-electrode mixture. A positive-electrode collector 13 is optionally disposed in contact with the positive electrode 12, and a negative-electrode collector 17 is optionally disposed in contact with the negative electrode 16.

The separator 20 is disposed in the container 22 so as to separate a positive-electrode chamber 24 accommodating the positive electrode 12 and the positive-electrode electrolytic solution 14 from a negative-electrode chamber 26 accommodating the negative electrode 16 and the negative-electrode electrolytic solution 18. The separator 20 exhibits hydroxide ion conductivity and water impermeability. The water impermeability of the separator 20 indicates that the separator 20 has a density sufficiently high to prevent the permeation of water and is not a porous film or porous material having water permeability. Thus, this configuration is very effective for physically inhibiting the penetration of dendritic zinc (which may be formed during a charge mode of the battery) through the separator, to prevent the short circuit between the positive and negative electrodes. In any case, the hydroxide ion conductivity of the separator 20 leads to efficient migration of hydroxide ions between the positive-electrode electrolytic solution 14 and the negative-electrode electrolytic solution 18, resulting in charge/discharge reaction in the positive-electrode chamber 24 and the negative-electrode chamber 26. The following reactions occur at the positive-electrode chamber 24 and the negative-electrode chamber 26 during a charge mode of the battery (reverse reactions occur during a discharge mode).

$$\text{Positive electrode: } Ni(OH)_2 + OH^- \rightarrow NiOOH + H_2O + e^-$$

$$\text{Negative electrode: } ZnO + H_2O + 2e^- \rightarrow Zn + 2OH^-$$

The aforementioned reaction at the negative electrode involves the following two reactions:

$$\text{Dissolution of ZnO: } ZnO + H_2O + 2OH^- \rightarrow Zn(OH)_4^{2-}$$

$$\text{Precipitation of Zn: } Zn(OH)_4^{2-} + 2e^- \rightarrow Zn + 4OH^-$$

Figure 2:
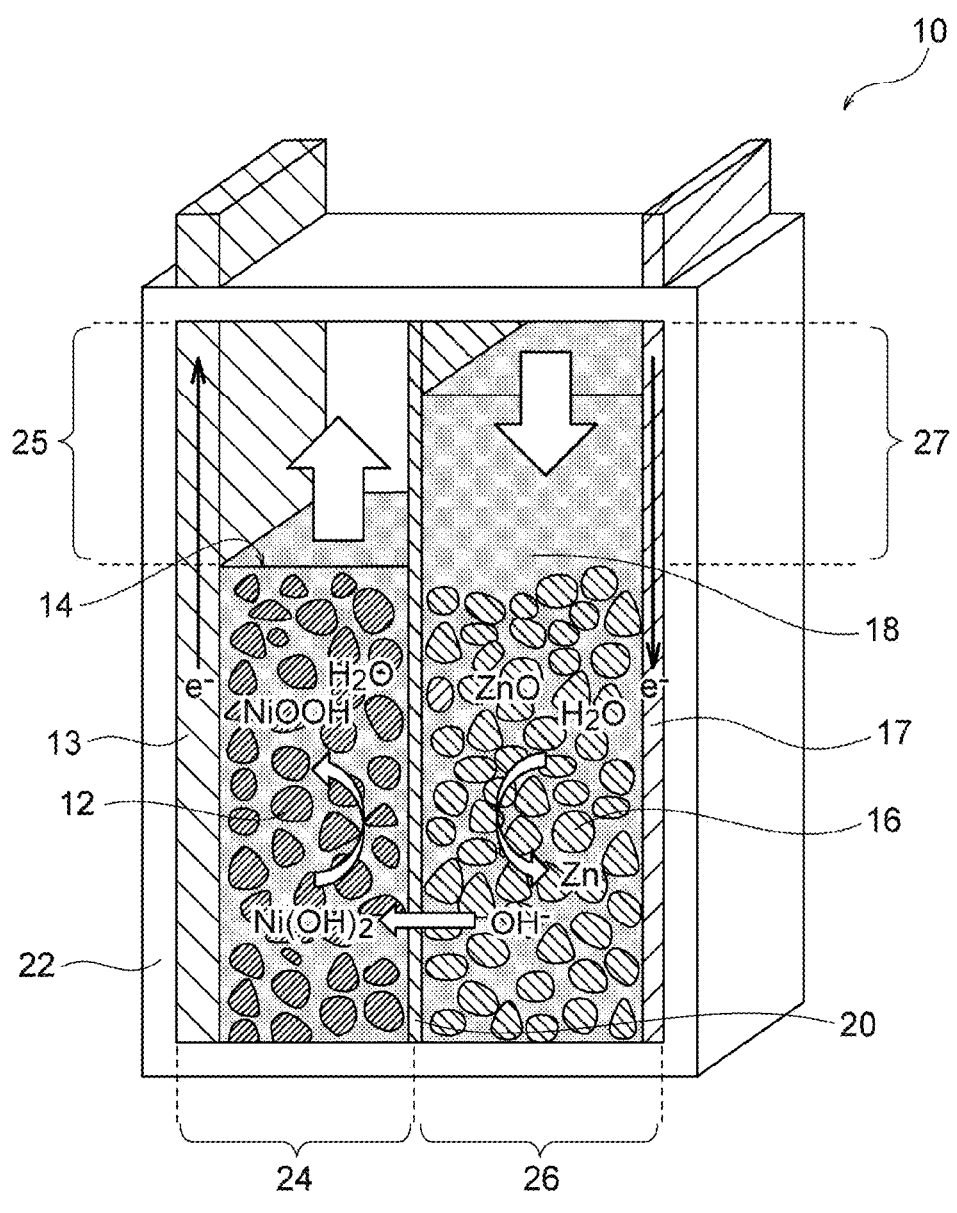
FIG. 2 illustrates the full charge state of the nickel-zinc battery of FIG. 1.

The nickel-zinc battery 10 preferably has an extra positive-electrode space 25 in the positive-electrode chamber 24. The extra positive-electrode space 25 has a volume that meets a variation in amount of water in association with the reaction at the positive electrode during charge/discharge of the battery. Also, the nickel-zinc battery 10 preferably has an extra negative-electrode space 27 in the negative-electrode chamber 26. The extra negative-electrode space 27 has a volume that meets a variation in amount of water in association with the reaction at the negative electrode during charge/discharge of the battery. This configuration effectively prevents problems caused by a variation in amount of water in the positive-electrode chamber 24 and the negative-electrode chamber 26 (e.g., liquid leakage and deformation of the container due to a variation in internal pressure of the container), resulting in further improved reliability of the nickel-zinc battery. As indicated by the aforementioned reaction formulae, the amount of water increases in the positive-electrode chamber 24 and decreases in the negative-electrode chamber 26 during a charge mode, whereas the amount of water decreases in the positive-electrode chamber 24 and increases in the negative-electrode chamber 26 during a discharge mode. Most traditional separators exhibit water permeability and thus allow water to pass therethrough freely. In contrast, the separator 20 used in this embodiment has high density and water impermeability. Hence, water cannot pass through the separator 20 freely, and an increase in amount of the electrolytic solution in the positive-electrode chamber 24 and/or the negative-electrode chamber 26 during charge/discharge of the battery may cause problems, such as liquid leakage. As illustrated in FIG. 2, the positive-electrode chamber 24 has the extra positive-electrode space 25 having a volume that meets a variation in amount of water in association with the reaction at the positive electrode during charge/discharge of the battery, and thus the extra positive-electrode space 25 can buffer an increase in amount of the positive-electrode electrolytic solution 14 during a charge mode. Since the extra positive-electrode space 25 serves as a buffer even after full charge as illustrated in FIG. 2, an increased amount of the positive-electrode electrolytic solution 14 can be reliably retained in the positive-electrode chamber 24 without causing overflow of the electrolytic solution. Similarly, the negative-electrode chamber 26 has the extra negative-electrode space 27 having a volume that meets a variation in amount of water in association with the reaction at the negative electrode during charge/discharge of the battery, and thus the extra negative-electrode space 27 can buffer an increase in amount of the negative-electrode electrolytic solution 18 during a discharge mode.

A variation in amount of water in the positive-electrode chamber 24 or the negative-electrode chamber 26 can be determined on the basis of the aforementioned reaction formulae. As indicated by the reaction formulae, the amount of $H_2O$ produced at the positive electrode 12 during a charge mode is twice the amount of $H_2O$ consumed at the negative electrode 16. Thus, the volume of the extra positive-electrode space 25 may be greater than that of the extra negative-electrode space 27. The volume of the extra positive-electrode space 25 is preferably determined such that the positive-electrode chamber 24 can be adapted to an increased amount of water and gasses (e.g., air originally contained in the positive-electrode chamber 24, and oxygen gas generated from the positive electrode 12 during overcharge) at an appropriate internal pressure. Although the volume of the extra negative-electrode space 27 may be equal to that of the extra positive-electrode space 25 as illustrated in FIG. 1, the volume of the extra negative-electrode space 27 is preferably greater than the amount of water decreased during a charge mode in the case of the battery in a discharge end state. In any case, the volume of the extra negative-electrode space 27 may be smaller than that of the extra positive-electrode space 25 because a variation in amount of water in the negative-electrode chamber 26 is about half that in the positive-electrode chamber 24.

The nickel-zinc battery 10 in a discharge end state preferably satisfies the following conditions: the extra positive-electrode space 25 has a volume greater than the amount of water that will increase in association with the reaction at the positive electrode during a charge mode; the extra positive-electrode space 25 is not preliminarily filled with the positive-electrode electrolytic solution 14; the extra negative-electrode space 27 has a volume greater than the amount of water that will decrease in association with the reaction at the negative electrode during the charge mode; and the extra negative-electrode space 27 is preliminarily filled with an amount of the negative-electrode electrolytic solution 18 that will decrease during the charge mode. In contrast, the nickel-zinc battery 10 in a full charge state preferably satisfies the following conditions: the extra positive-electrode space 25 has a volume greater than the amount of water that will decrease in association with the reaction at the positive electrode during a discharge mode; the extra positive-electrode space 25 is preliminarily filled with an amount of the positive-electrode electrolytic solution 14 that will decrease during the discharge mode; the extra negative-electrode space 27 has a volume greater than the amount of water that will increase in association with the reaction at the negative electrode during the discharge mode; and the extra negative-electrode space 27 is not preliminarily filled with the negative-electrode electrolytic solution 18.

Preferably, the extra positive-electrode space 25 is not filled with the positive electrode 12 and/or the extra negative-electrode space 27 is not filled with the negative electrode 16. More preferably, the extra positive-electrode space 25 and the extra negative-electrode space 27 are not filled with the positive electrode 12 and the negative electrode 16, respectively. The electrolytic solution may be drained due to a decrease in amount of water during charge/discharge of the battery in these extra spaces. Thus, the positive electrode 12 and the negative electrode 16 in these extra spaces are insufficiently involved in the charge/discharge reaction, resulting in low efficiency. If the extra positive-electrode space 25 and the extra negative-electrode space 27 are not filled with the positive electrode 12 and the negative electrode 16, respectively, the positive electrode 12 and the negative electrode 16 are effectively and reliably involved in the battery reaction.

The separator 20 exhibits hydroxide ion conductivity and water impermeability, and is typically in a plate, membrane, or layer form. The separator 20 is disposed in the container 22 so as to separate the positive-electrode chamber 24 accommodating the positive electrode 12 and the positive-electrode electrolytic solution 14 from the negative-electrode chamber 26 accommodating the negative electrode 16 and the negative-electrode electrolytic solution 18. As described above, a second separator (resin separator) composed of a hygroscopic resin or a liquid-retaining resin (e.g., non-woven fabric) may be disposed between the positive electrode 12 and the separator 20 and/or between the negative electrode 16 and the separator 20 such that the electrolytic solution can be retained in a reaction portion of the positive electrode and/or the negative electrode despite a reduction in amount of the electrolytic solution. Preferred examples of the hygroscopic resin or the liquid-retaining resin include polyolefin resins.

The positive electrode 12 contains nickel hydroxide and/or nickel oxyhydroxide. The nickel-zinc battery in a discharge end state illustrated in FIG. 1 may involve the use of nickel hydroxide in the positive electrode 12. The nickel-zinc battery in a full charge state illustrated in FIG. 2 may involve the use of nickel oxyhydroxide in the positive electrode 12. Nickel hydroxide or nickel oxyhydroxide is a common positive-electrode active material used in nickel-zinc batteries and is typically in a particulate form. Nickel hydroxide or nickel oxyhydroxide may form a solid solution in the crystal lattice with an element other than nickel for an improvement in charge efficiency at high temperature. Examples of the element include zinc and cobalt. Nickel hydroxide or nickel oxyhydroxide may be mixed with a cobalt component. Examples of the cobalt component include particulate metallic cobalt and particulate cobalt oxide (e.g., cobalt monoxide). Particulate nickel hydroxide or nickel oxyhydroxide (which may form a solid solution with an element other than nickel) may be coated with a cobalt compound. Examples of the cobalt compound include cobalt monoxide, α-cobalt (II) hydroxide, β-cobalt (II) hydroxide, cobalt compounds having a valency of more than 2, and any combination thereof.

The positive electrode 12 may contain an additional element besides the nickel hydroxide compound and the element that may form a solid solution with the compound. Examples of the additional element include scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), hafnium (Hf), tantalum (Ta), tungsten (W), rhenium (Re), osmium (Os), iridium (Ir), platinum (Pt), gold (Au), mercury (Hg), and any combination thereof. Such an additional element may be contained in any form, such as elemental metal or a metal compound (e.g., oxide, hydroxide, halide, or carbonate). The amount of the additional element (in the form of elemental metal or metal compound) is preferably 0.5 to 20 parts by weight, more preferably 2 to 5 parts by weight, relative to 100 parts by weight of the nickel hydroxide compound.

The positive electrode 12 may be combined with the electrolytic solution to form a positive-electrode mixture. The positive-electrode mixture may contain the particulate nickel hydroxide compound, the electrolytic solution, and optionally an electrically conductive material (e.g., particulate carbon) or a binder.

The positive-electrode collector 13 is preferably disposed in contact with the positive electrode 12. As illustrated in FIG. 1, the positive-electrode collector 13 may extend to the outside of the container 22 to serve as a positive-electrode terminal. Alternatively, the positive-electrode collector 13 may be connected to a separately provided positive-electrode terminal inside or outside of the container 22. Preferred examples of the positive-electrode collector 13 include nickel porous substrates, such as foamed nickel plates. In such a case, a paste containing an electrode active material (e.g., nickel hydroxide) may be evenly applied onto a nickel porous substrate and then dried, to prepare a positive electrode plate composed of the positive electrode 12 on the positive-electrode collector 13. After the drying step, the positive electrode plate (i.e., the positive electrode 12 on the positive-electrode collector 13) is preferably subjected to pressing for prevention of detachment of the electrode active material or an improvement in electrode density.

The negative electrode 16 contains zinc and/or zinc oxide. Zinc may be contained in any form exhibiting electrochemical activity suitable for the negative electrode; for example, in the form of metallic zinc, a zinc compound, or a zinc alloy. Preferred examples of the negative electrode material include zinc oxide, metallic zinc, and calcium zincate. More preferred is a mixture of metallic zinc and zinc oxide. The negative electrode 16 may be in the form of gel, or may be combined with the electrolytic solution to form a negative-electrode mixture. For example, the negative electrode in the form of gel may be readily prepared through addition of the electrolytic solution and a thickener to the negative-electrode active material. Examples of the thickener include poly(vinyl alcohol), poly(acrylic acid) salts, CMC, and alginic acid. Preferred is poly(acrylic acid), which exhibits high resistance to a strong alkali.

The zinc alloy may be a non-amalgamated zinc alloy; i.e., a zinc alloy not containing mercury or lead. For example, a zinc alloy containing 0.01 to 0.06 mass % indium, 0.005 to 0.02 mass % bismuth, and 0.0035 to 0.015 mass % aluminum is preferred because of the effect of reducing the generation of hydrogen gas. In particular, indium and bismuth are advantageous in improving discharge performance. The use of a zinc alloy in the negative electrode retards the self-dissolution in the alkaline electrolytic solution, to reduce the generation of hydrogen gas, resulting in improved safety.

The negative electrode material may be in any form, but is preferably in a powdery form. The powdery negative electrode material has a large surface area and is adapted to large current discharge. The negative electrode material (in the case of a zinc alloy) preferably has a mean particle size of 90 to 210 μm. The negative electrode material having such a mean particle size has a large surface area and thus is adapted to large current discharge. In addition, the negative electrode material can be evenly mixed with the electrolytic solution or a gelling agent, and is readily handled during the assembly of the battery.

The negative-electrode collector 17 is preferably disposed in contact with the negative electrode 16. As illustrated in FIG. 1, the negative-electrode collector 17 may extend to the outside of the container 22 to serve as a negative-electrode terminal. Alternatively, the negative-electrode collector 17 may be connected to a separately provided negative-electrode terminal inside or outside of the container 22. Preferred examples of the negative-electrode collector 17 include punched copper sheets. In such a case, a mixture containing zinc oxide powder and/or zinc powder and an optional binder (e.g., particulate polytetrafluoroethylene) may be applied onto a punched copper sheet to prepare a negative electrode plate composed of the negative electrode 16 on the negative-electrode collector 17. After the drying of the mixture, the negative electrode plate (i.e., the negative electrode 16 on the negative-electrode collector 17) is preferably subjected to pressing for prevention of detachment of the electrode active material or an improvement in electrode density.

Zinc-Air Secondary Battery

Figures 3A, 3B:
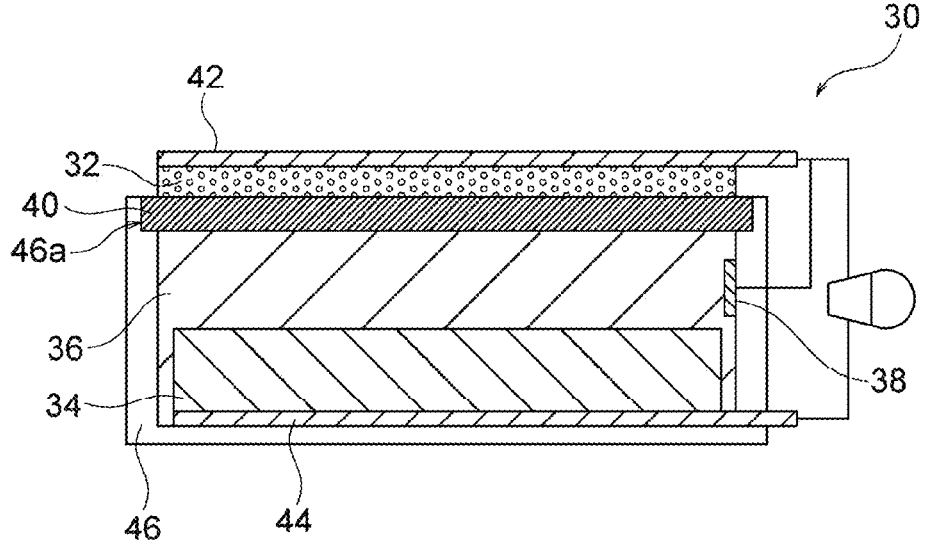
FIG. 3A is a schematic illustration of an exemplary zinc-air secondary battery according to an embodiment of the present invention.
FIG. 3B is a perspective view of the zinc-air secondary battery of FIG. 3A.

In another preferred embodiment, the present invention provides a zinc-air secondary battery. FIGS. 3A and 3B are schematic illustrations of an exemplary zinc-air secondary battery according to this embodiment. As illustrated in FIGS. 3A and 3B, the zinc-air secondary battery 30 according to this embodiment includes an air electrode 32, a negative electrode 34, an alkaline electrolytic solution 36, a separator 40, a container 46, and an optional third electrode 38. The air electrode 32 functions as a positive electrode.

The negative electrode 34 contains zinc, a zinc alloy, and/or a zinc compound. The electrolytic solution 36 is an aqueous electrolyte in which the negative electrode 34 is immersed. The container 46 has an opening 46a and accommodates the negative electrode 34, the electrolytic solution 36, and the third electrode 38. The separator 40 is disposed to cover the opening 46a such that the separator 40 is in contact with the electrolytic solution 36 and defines a negative-electrode hermetic space with the container 46, whereby the air electrode 32 is separated from the electrolytic solution 36 by the separator 40 through which hydroxide ions pass. A positive-electrode collector 42 is optionally disposed in contact with the air electrode 32, and a negative-electrode collector 44 is optionally disposed in contact with the negative electrode 34. In such a case, the negative-electrode collector 44 is also accommodated in the container 46.

As described above, the separator 40 preferably exhibits hydroxide ion conductivity, water impermeability, and gas impermeability, and is typically in a plate, membrane, or layer form. The separator 40 is disposed to cover the opening 46a such that the separator 40 is in contact with the electrolytic solution 36 and defines the negative-electrode hermetic space with the container 46, whereby the air electrode 32 is separated from the electrolytic solution 36 by the separator 40 through which hydroxide ions pass. The separator 40A may include a porous substrate 48. A liquid-retaining member composed of a hygroscopic resin or a liquid-retaining resin (e.g., non-woven fabric) may be disposed between the negative electrode 34 and the separator 40 such that the electrolytic solution 36 is always in contact with the negative electrode 34 and the separator 40 despite a reduction in amount of the electrolytic solution 36. The liquid-retaining member may also serve as a liquid-retaining member for the third electrode 38. Alternatively, another liquid-retaining member may be provided for the separator 40. The liquid-retaining member may be a commercially available battery separator. Preferred examples of the hygroscopic resin or the liquid-retaining resin include polyolefin resins.

The air electrode 32 may be any known air electrode used in metal-air batteries, such as zinc-air batteries. The air electrode 32 typically contains an air electrode catalyst, an electron conductive material, and an optional hydroxide-ion-conductive material. The air electrode 32 may contain an air electrode catalyst that also functions as an electron conductive material, and an optional hydroxide-ion-conductive material.

The air electrode catalyst may be any air electrode catalyst that functions as a positive electrode in a metal-air battery and can utilize oxygen as a positive-electrode active material. Preferred examples of the air electrode catalyst include carbonaceous materials having a redox catalytic function, such as graphite; metals having a redox catalytic function, such as platinum and nickel; and inorganic oxides having a redox catalytic function, such as perovskite oxides, manganese dioxide, nickel oxide, cobalt oxide, and spinel oxides. The air electrode catalyst may be in any form, but is preferably in a particulate form. The air electrode 32 may contain any amount of the air electrode catalyst. The amount of the air electrode catalyst is preferably 5 to 70 vol. %, more preferably 5 to 60 vol. %, still more preferably 5 to 50 vol. %, relative to the total amount of the air electrode 32.

The electron conductive material may be any material having electrical conductivity and capable of conducting electrons between the air electrode catalyst and the separator 40 (or an intermediate layer described below). Preferred examples of the electron conductive material include carbon black materials, such as Ketjen black, acetylene black, channel black, furnace black, lamp black, and thermal black; graphites, such as natural graphite (e.g., scaly graphite), artificial graphite, and expanded graphite; electrically conductive fibers, such as carbon fiber and metal fiber; powdery metals, such as copper, silver, nickel, and aluminum; organic electron conductive materials, such as polyphenylene derivatives; and any mixture of these materials. The electron conductive material may be in any form, such as a particulate form. The electron conductive material is preferably used in a form that provides a continuous phase (i.e., an electron conductive phase) in the air electrode 32 in the thickness direction. The electron conductive material may be a porous material. Alternatively, the electron conductive material may be a mixture or composite material with an air electrode catalyst (e.g., in the form of platinum on carbon), or may be the aforementioned air electrode catalyst that also functions as an electron conductive material (e.g., a perovskite compound containing a transition metal). The air electrode 32 may contain any amount of the electron conductive material. The amount of the electron conductive material is preferably 10 to 80 vol. %, more preferably 15 to 80 vol. %, still more preferably 20 to 80 vol. %, relative to the total amount of the air electrode 32.

The air electrode 32 may further contain a hydroxide-ion-conductive material as an optional component. If the separator 40 is composed of a hydroxide-ion-conductive inorganic solid electrolyte (i.e., dense ceramic material), the formation of the air electrode 32, which contains the air electrode catalyst and the electron conductive material (which are traditional components) and the hydroxide-ion-conductive material, on the separator 40 (optionally via an intermediate layer exhibiting hydroxide ion conductivity) can secure the desired characteristics of the dense ceramic separator 40, and can also reduce the reaction resistance of the air electrode in the metal-air battery. The incorporation of the air electrode catalyst, the electron conductive material, and the hydroxide-ion-conductive material into the air electrode 32 generates a three-phase interface including an electron conductive phase (electron conductive material) and a gaseous phase (air) at the interface between the air electrode 32 and the separator 40 (or the intermediate layer if applicable) and also in the air electrode 32. This leads to effective hydroxide ion conduction contributing to the battery reaction over a large surface area, resulting in reduced reaction resistance of the air electrode in the metal-air battery. The hydroxide-ion-conductive material may be any material through which hydroxide ions can permeate. The hydroxide-ion-conductive material may be any inorganic or organic material and may be in any form; for example, an LDH-like compound as aforementioned. The hydroxide-ion-conductive material may be in a particulate form, or may be in the form of a coating film that partially or substantially entirely covers the air electrode catalyst and the electron conductive material. Preferably, the hydroxide-ion-conductive material in the form of a coating film is not dense and has pores through which 02 and $H_2O$ can pass from the outer surface of the air electrode 32 toward the interface between the air electrode 32 and the separator 40 (or the intermediate layer if applicable). The air electrode 32 may contain any amount of the hydroxide-ion-conductive material. The amount of the hydroxide-ion-conductive material is preferably 0 to 95 vol. %, more preferably 5 to 85 vol. %, still more preferably 10 to 80 vol. %, relative to the total amount of the air electrode 32.

The air electrode 32 may be formed by any process. For example, the air electrode 32 may be formed through the following procedure: an air electrode catalyst, an electron conductive material, and an optional hydroxide-ion-conductive material are wet-mixed with a solvent (e.g., ethanol), followed by drying and pulverization, and the mixture is mixed with a binder and the resultant fibrillary mixture was press-bonded to a collector. A laminate of the air electrode 32/the collector may be press-bonded to the separator 40 (or an intermediate layer if applicable) so that the air electrode 32 comes into contact with the separator 40. Alternatively, the air electrode 32 may be formed through the following procedure: an air electrode catalyst, an electron conductive material, and an optional hydroxide-ion-conductive material are wet-mixed with a solvent (e.g., ethanol), and the resultant slurry is applied to an intermediate layer and then dried. Thus, the air electrode 32 may contain a binder. The binder may be composed of any material, including a thermoplastic resin or a thermosetting resin.

The air electrode 32 is preferably in the form of a layer having a thickness of 5 to 200 μm, more preferably 5 to 100 μm, still more preferably 5 to 50 μm, particularly preferably 5 to 30 μm. Such a preferred thickness of the air electrode 32 containing the hydroxide-ion-conductive material leads to a reduction in gas diffusion resistance and an increase in area of the three-phase interface, resulting in further reduced reaction resistance of the air electrode.

The positive-electrode collector 42 is preferably disposed on the surface of the air electrode 32 remote from the separator 40. The positive-electrode collector 42 preferably exhibits gas permeability so that air can be fed to the air electrode 32. Preferred examples of the positive-electrode collector 42 include plates and meshes of metals, such as stainless steel, copper, and nickel; carbon paper; carbon cloth; and electron-conductive oxides. Particularly preferred is stainless steel mesh in view of corrosion resistance and gas permeability.

An intermediate layer may be disposed between the separator 40 and the air electrode 32. The intermediate layer may be composed of any material that improves adhesion between the separator 40 and the air electrode 32 and exhibits hydroxide ion conductivity.

The intermediate layer may be composed of any organic or inorganic material and may have any known composition and structure. The intermediate layer preferably contains a polymer material and/or a ceramic material. In such a case, at least one of the polymer material and the ceramic material contained in the intermediate layer exhibits hydroxide ion conductivity. Two or more intermediate layers may be disposed, and these intermediate layers may be composed of the same material or different materials. Thus, the intermediate layer may have a single-layer structure or a multilayer structure. The intermediate layer has a thickness of preferably 1 to 200 μm, more preferably 1 to 100 μm, still more preferably 1 to 50 μm, particularly preferably 1 to 30 μm. Such a preferred thickness facilitates an improvement in adhesion between the separator 40 and the air electrode 32, and leads to a more effective reduction in battery resistance (in particular, the interface resistance between the air electrode and the separator) in the zinc-air secondary battery.

The negative electrode 34 contains zinc, a zinc alloy, and/or a zinc compound serving as a negative-electrode active material. The negative electrode 34 may be in any form; for example, in a particulate, platy, or gel form. The negative electrode 34 is preferably in a particulate or gel form in view of reaction rate. The particulate negative electrode is preferably composed of particles having a size of 30 to 350 μm. The gel-form negative electrode is preferably composed of a gel prepared through agitation of a mixture containing non-amalgamated zinc alloy powder having a particle size of 100 to 300 μm, an alkaline electrolytic solution, and a thickener (gelling agent). The zinc alloy may be an amalgamated or non-amalgamated alloy containing magnesium, aluminum, lithium, bismuth, indium, or lead in any amount that secures the desired performance of the negative-electrode active material. Preferred is a non-amalgamated zinc alloy free from silver and lead. More preferred is a zinc alloy containing aluminum, bismuth, indium, or any combination thereof. Still more preferred is a non-amalgamated zinc alloy containing 50 to 1,000 ppm bismuth, 100 to 1,000 ppm indium, and 10 to 100 ppm aluminum and/or calcium. Particularly preferred is a non-amalgamated zinc alloy containing 100 to 500 ppm bismuth, 300 to 700 ppm indium, and 20 to 50 ppm aluminum and/or calcium. Preferred examples of the zinc compound include zinc oxide.

The negative-electrode collector 44 is preferably disposed in contact with the negative electrode 34. As illustrated in FIGS. 3A and 3B, the negative-electrode collector 44 may extend to the outside of the container 46 to serve as a negative-electrode terminal. Alternatively, the negative-electrode collector 44 may be connected to a separately provided negative-electrode terminal inside or outside of the container 46. Preferred examples of the negative-electrode collector include plates and meshes of metals, such as stainless steel, copper (e.g., punched copper sheet), and nickel; carbon paper; and oxide electrical conductors. For example, a mixture containing zinc oxide powder and/or zinc powder and an optional binder (e.g., particulate polytetrafluoroethylene) may be applied onto a punched copper sheet to prepare a negative electrode plate composed of the negative electrode 34 on the negative-electrode collector 44. After the drying of the mixture, the negative electrode plate (i.e., the negative electrode 34 on the negative-electrode collector 44) is preferably subjected to pressing for prevention of detachment of the electrode active material or an improvement in electrode density.

The third electrode 38 may optionally be disposed so as to be in contact with the electrolytic solution 36, but not in contact with the negative electrode 34. In such a case, the third electrode 38 is connected to the air electrode 32 via an external circuit. With this configuration, hydrogen gas generated from the negative electrode 34 by the side reaction comes into contact with the third electrode 38 to produce water through the following reactions:

Third electrode: H$_2$+2OH$^-$→2H$_2$O+2$e^-$

Discharge at positive electrode: O$_2$+2H$_2$ O+4$e^-$→4OH$^-$

In other words, hydrogen gas generated from the negative electrode 34 is absorbed by the third electrode 38, leading to self-discharge. This configuration prevents an increase in pressure in the negative-electrode hermetic space due to generation of hydrogen gas, and avoids problems caused by the increased pressure. This configuration also prevents water loss in the negative-electrode hermetic space through generation of water (which is lost through the aforementioned discharge reaction). Hydrogen gas generated from the negative electrode can be recycled to produce water in the negative-electrode hermetic space. Thus, the zinc-air secondary battery has a configuration very effective for preventing both the short circuit caused by dendritic zinc and the intrusion of carbon dioxide, and can address problems caused by the generation of hydrogen gas; i.e., the zinc-air secondary battery exhibits high reliability.

The third electrode 38 may be any electrode that is connected to the air electrode 32 via an external circuit and that can convert hydrogen gas (H$_2$) into water (H$_2$O) through the aforementioned reactions. The third electrode 38 preferably has an oxygen overvoltage higher than that of the air electrode 32. Preferably, the third electrode 38 is not involved in a common charge/discharge reaction. The third electrode 38 preferably contains platinum and/or a carbonaceous material, and more preferably contains a carbonaceous material. Preferred examples of the carbonaceous material include natural graphite, artificial graphite, hard carbon, soft carbon, carbon fiber, carbon nanotube, graphene, activated carbon, and any combination thereof. The third electrode 38 may be in any form, but is preferably in a form having a large specific surface area (e.g., in a mesh or particulate form). The third electrode 38 (preferably in a form having a large specific surface area) is more preferably coated with and/or disposed on a collector. The collector for the third electrode 38 may be in any form, but is preferably in the form of, for example, wire, punched metal, mesh, foamed metal, or any combination thereof. The collector for the third electrode 38 may be composed of the same material as the third electrode 38, or may be composed of a metal (e.g., nickel), an alloy, or any other electrically conductive material.

The third electrode 38, which is in contact with the electrolytic solution 36, is preferably disposed at a site that is not directly involved in a common charge/discharge reaction. In such a case, a liquid-retaining member composed of a hygroscopic resin or a liquid-retaining resin (e.g., non-woven fabric) is preferably disposed in the negative-electrode hermetic space so as to be in contact with the third electrode 38, such that the electrolytic solution 36 is always in contact with the third electrode 38 despite a reduction in amount of the electrolytic solution. The liquid-retaining member may be a commercially available battery separator. Preferred examples of the hygroscopic resin or the liquid-retaining resin include polyolefin resins. The third electrode 38 is not necessarily impregnated with a large amount of the electrolytic solution 36. The third electrode 38 moistened with a small amount of the electrolytic solution 36 exhibits a desired function. Thus, it is sufficient that the liquid-retaining member have an ability to retain such a small amount of the electrolytic solution.

LDH-Like Compound Separator

The LDH-like compound separator includes a layered double hydroxide (LDH)-like compound, and can isolate a positive electrode plate from a negative electrode plate and ensures hydroxide ionic conductivity therebetween in a secondary zinc battery. The LDH-like compound separator functions as a hydroxide ionic conductive separator. Preferred LDH-like compound separator has gas-impermeability and/or water-impermeability. In other words, the LDH-like compound separator is preferably densified to an extent that exhibits gas-impermeability and/or water-impermeability. The phrase "having gas-impermeability" throughout the specification indicates that no bubbling of helium gas is observed at one side of a sample when helium gas is brought into contact with the other side in water at a differential pressure of 0.5 atm as described in Patent Literatures 2 and 3. In addition, the phrase "having water-impermeability" throughout the specification indicates that water in contact with one side of the sample does not permeate to the other side as described in Patent Literatures 2 and 3. As a result, the LDH-like compound separator having gas-impermeability and/or water-impermeability indicates having high density to an extent that no gas or no water permeates, and not being a porous membrane or any other porous material that has gas-permeability or water-permeability. Accordingly, the LDH-like compound separator can selectively permeate only hydroxide ions due to its hydroxide ionic conductivity, and can serve as a battery separator. The LDH-like compound separator thereby has a physical configuration that prevents penetration of zinc dendrites generated during a charge mode through the separator, resulting in prevention of short circuit between positive and negative electrodes. Since the LDH-like compound separator has hydroxide ionic conductivity, the ionic conductivity allows a necessary amount of hydroxide ions to efficiently move between the positive electrode plate and the negative electrode plate, and thereby charge/discharge reaction can be achieved on the positive electrode plate and the negative electrode plate.

The LDH-like compound separator preferably has a helium permeability per unit area of 3.0 cm/min·atm or less, more preferably 2.0 cm/min·atm or less, further more preferably 1.0 cm/min·atm or less. A separator having a helium permeability of 3.0 cm/min·atm or less can remarkably restrain the permeation of Zn (typically, the permeation of zinc ions or zincate ions) in the electrolytic solution. Thus, it is conceivable in principle that the separator of the present embodiment can effectively restrain the growth of zinc dendrites when used in secondary zinc batteries because Zn permeation is significantly suppressed. The helium permeability is measured through the steps of: supplying helium gas to one side of the separator to allow the helium gas to permeate into the separator; and calculating the helium permeability to evaluate the density of the hydroxide ion conductive separator. The helium permeability is calculated from the expression of $F/(P \times S)$ where F is the volume of permeated helium gas per unit time, P is the differential pressure applied to the separator when helium gas permeates through, and S is the area of the membrane through which helium gas permeates. Evaluation of the permeability of helium gas in this manner can extremely precisely determine the density. As a result, a high degree of density that does not permeate as much as possible (or permeate only a trace amount) substances other than hydroxide ions (in particular, zinc that causes deposition of dendritic zinc) can be effectively evaluated. Helium gas is suitable for this evaluation because the helium gas has the smallest constitutional unit among various atoms or molecules which can constitute the gas and its reactivity is extremely low. That is, helium does not form a molecule, and helium gas is present in the atomic form. In this respect, since hydrogen gas is present in the molecular form ($H_2$), atomic helium is smaller than molecular $H_2$ in a gaseous state. Basically, $H_2$ gas is combustible and dangerous. By using the helium gas permeability defined by the above expression as an index, the density can be precisely and readily evaluated regardless of differences in sample size and measurement condition. Thus, whether the separator has sufficiently high density suitable for separators of secondary zinc batteries can be evaluated readily, safely and effectively. The helium permeability can be preferably measured in accordance with the procedure shown in Evaluation 5 in Examples described later.

In the preferred LDH-like compound separator, the pores in the porous substrate are filled with the LDH-like compound, preferably completely filled with the LDH-like compound. Preferred embodiments and compositions of the LDH-like compound are as described above. The porous substrate is preferably composed of at least one selected from the group consisting of ceramic materials, metal materials, and polymer materials.

Specifically, the LDH-like compound separator comprises the LDH-like compound and the porous substrate (typically consists of the porous substrate and the LDH-like compound), and the LDH-like compound plugs the pores in the porous substrate such that the LDH-like compound separator exhibits hydroxide ionic conductivity and gas-impermeability (thus, so as to serve as an LDH-like compound separator exhibiting hydroxide ionic conductivity). In particular, the LDH-like compound is preferably incorporated into the porous substrate over the entire thickness of the porous substrate. The LDH-like compound separator has a thickness of preferably 5 to 80 μm, more preferably 5 to 60 μm, further more preferably 5 to 40 μm.

The porous substrate is preferably composed of at least one selected from the group consisting of ceramic materials, metal materials, and polymer materials. Preferred examples of the ceramic material include alumina, zirconia, titania, magnesia, spinel, calcia, cordierite, zeolite, mullite, ferrite, zinc oxide, silicon carbide, aluminum nitride, silicon nitride, and any combination thereof. More preferred are alumina, zirconia, titania, and any combination thereof. Particularly preferred are alumina and zirconia. Most preferred is alumina. The use of an alumina porous substrate in combination with the electrolytic solution containing dissolved Al probably leads to reduced elution of Al from the alumina porous substrate and also contributes to a reduction in degradation of the porous substrate. The use of such a porous ceramic material facilitates the formation of a highly-densified LDH-containing separator layer. Preferred examples of the metal material include aluminum and zinc.

In particular, the porous substrate is preferably composed of a polymeric material. The polymeric porous substrate has the following advantages; (1) high flexibility (hard to crack even if thinned), (2) high porosity, (3) high conductivity (small thickness with high porosity), and (4) good manufacturability and handling ability. The polymeric porous substrate has a further advantage; (5) readily folding and sealing the LDH-like compound separator including the porous substrate composed of the polymeric material based on the advantage (1): high flexibility. Preferred examples of the polymeric material include polystyrene, poly(ether sulfone), polypropylene, epoxy resin, poly(phenylene sulfide), fluorocarbon resin (tetra-fluorinated resin such as PTFE), cellulose, nylon, polyethylene and any combination thereof. More preferred examples include polystyrene, poly (ether sulfone), polypropylene, epoxy resin, poly(phenylene sulfide), fluorocarbon resin (tetra-fluorinated resin such as PTFE), nylon, polyethylene and any combination thereof from the viewpoint of a thermoplastic resin suitable for hot pressing. All the various preferred materials described above have alkali resistance to be resistant to the electrolytic solution of batteries. More preferred polymeric materials are polyolefins, such as polypropylene and polyethylene, most preferred are polypropylene and polyethylene from the viewpoint of excellent hot-water resistance, acid resistance and alkali resistance, and low material cost. In case that the porous substrate is composed of the polymeric material, the LDH-like compound layer is particularly preferably embedded over the entire thickness of the porous substrate (for example, most pores or substantially all pores inside the porous substrate are filled with the LDH-like compound). A polymeric microporous membrane commercially available can be preferably used as such a polymeric porous substrate.

Production Method

The method for producing the LDH-like compound separator is not specifically limited, and the LDH-like compound separator can be produced by appropriately changing various conditions (particularly, the composition of LDH raw materials) in the already known methods (for example, see Patent Literatures 1 to 3) for producing an LDH-containing function layer and a composite material. For example, an LDH-like compound-containing function layer and a composite material (that is, an LDH-like compound separator) can be produced by (1) preparing a porous substrate, (2) applying a solution containing titania sol (or further containing yttrium sol and/or alumina sol) to the porous substrate, followed by drying, to form a titania-containing layer, (3) immersing the porous substrate in a raw material aqueous solution containing magnesium ions ($Mg^{2+}$) and urea (or further containing yttrium ions ($Y^{3+}$)), and (4) hydrothermally treating the porous substrate in the raw material aqueous solution, to form an LDH-like compound-containing function layer on the porous substrate and/or in the porous substrate. It is considered that the presence of urea in step (3) above generates ammonia in the solution through hydrolysis of urea, to increase the pH value, and coexisting metal ions form a hydroxide and/or an oxide, so that the LDH-like compound can be obtained.

In particular, in the case of producing a composite material (that is, an LDH-like compound separator) in which the porous substrate is composed of a polymer material, and the LDH-like compound is incorporated over the entire thickness direction of the porous substrate, the mixed sol solution is preferably applied to the substrate in step (2) above by a technique that allows the mixed sol solution to penetrate all or most of the inside of the substrate. This allows most or almost all the pores inside the porous substrate to be finally filled with the LDH-like compound. Preferable examples of the application technique include dip coating and filtration coating, particularly preferably dip coating. Adjusting the number of applications such as dip coating enables adjustment of the amount of the mixed sol solution to be applied. The substrate coated with the mixed sol solution by dip coating or the like may be dried and then subjected to steps (3) and (4) above.

When the porous substrate is composed of a polymer material, an LDH-like compound separator obtained by the aforementioned method or the like is preferably pressed. This enables an LDH-like compound separator with further excellent denseness to be obtained. The pressing technique is not specifically limited and may be, for example, roll pressing, uniaxial compression press, CIP (cold isotropic pressing) or the like but is preferably roll pressing. This pressing is preferably performed under heating, since the porous polymer substrate is softened, so that the pores of the porous substrate can be sufficiently filled with the LDH-like compound. For sufficient softening, the heating temperature is preferably 60 to 200° C., for example, in the case of polypropylene or polyethylene. The pressing such as roll pressing within such a temperature range can considerably reduce residual pores in the LDH-like compound separator. As a result, the LDH-like compound separator can be extremely densified, and short circuits due to zinc dendrites can be thus suppressed further effectively. Appropriately adjusting the roll gap and the roll temperature in roll pressing enables the morphology of residual pores to be controlled, thereby enabling an LDH-like compound separator with desired denseness to be obtained.

EXAMPLES

The present invention will now be described in more detail by way of Examples.

Examples A1 to A5

Examples A1 to A5 shown below are reference examples or comparative examples for LDH dense bodies, but the experimental procedures and results in these examples are similarly applicable to LDH-like compound dense bodies (LDH-like compound separators) as well. The following procedures were used to evaluate the LDH separator produced in these Examples.

Example A1 (Reference): Preparation and Evaluation of LDH Dense Body (1) Preparation of LDH Dense Body Powdery hydrotalcite (DHT-4H, manufactured by Kyowa Chemical Industry Co., Ltd.); i.e., a commercially available layered double hydroxide, was used as a powdery raw material. The powdery raw material had a composition of $Mg^{2+}{}_{0.68}Al^{3+}{}_{0.32}(OH)_2CO_3{}^{2-}{}_{0.16}\cdot mH_2O$. A mold having a diameter of 16 mm was filled with the powdery raw material, and the raw material was subjected to uniaxial pressing at a pressure of 500 kgf·cm², to form a compact having a relative density of 53% and a thickness of about 2 mm. The relative density was measured after storage of the compact at room temperature and a relative humidity of 20% or less for 24 hours. The compact was fired in an alumina sheath. In order to prevent breakage of the compact through release of moisture and carbon dioxide by rapid heating, the compact was fired by a process involving heating of the compact at a rate of 100° C./h or less, keeping of the compact at a maximum temperature of 750° C. for five hours, and then cooling of the compact. The total time of the firing process involving the heating, the keeping, and the cooling (to 100° C. or lower) was 62 hours. The resultant fired product had a relative weight of 59 wt %, a relative volume of 72 vol %, and a relative density of 23%. The "relative weight" and "relative volume" were calculated on the basis of the weight and volume of the compact before the firing process (which are 100 wt % and 100 vol %, respectively). The "relative density" was calculated on the basis of the theoretical densities of oxides of Mg and Al (i.e., constituent metals) of the hydrotalcite. The fired product and deionized water were placed in air in a Teflon (registered trademark) hermetic container provided with an external stainless steel jacket, followed by a hydrothermal treatment process at 100° C. for five hours, to prepare a sample. The sample was cooled to room temperature, and excess water on the surface of the sample was gently wiped off with a paper filter. The resultant sample was dried in a chamber at 25° C. and a relative humidity of about 50%, to prepare an LDH dense body sample.

(2) Determination of Relative Density

The density of the LDH dense body sample was calculated from its dimensions and weight, and the calculated density was divided by the theoretical density of the sample to determine the relative density of the sample. The sample had a relative density of 91%. The theoretical density was calculated on the basis of the theoretical density (2.09 g/cm³) of hydrotalcite (Mg/Al=2) described in JCPDS card No. 70-2151.

(3) Determination of Cracks

No cracks were visually observed in the LDH dense body sample.

(4) Identification of Crystalline Phase

The crystalline phase of the LDH dense body sample was analyzed with an X-ray diffractometer (D8 ADVANCE, manufactured by Bulker AXS) at a voltage of 40 kV, a current of 40 mA, and a measuring range of 5 to 70°, and the Al/Mg ratio of the LDH dense body after immersion is shown in Table 1. The results shown in Table 1 demonstrate that intentional preliminary dissolution of Al in the electrolytic solution (aqueous KOH solution) leads to significantly reduced variation in the Al/Mg ratio of the LDH dense body (i.e., significantly reduced elution of Al from the LDH dense body), resulting in a significant improvement in alkali resistance of the LDH.

TABLE 1

| Electrolytic solution sample | Al/Mg ratio of LDH dense body before immersion | Al concentration [mol/L] | Immersion temperature (1 week) | Al/Mg ratio of LDH dense body after immersion |
|---|---|---|---|---|
| 1# | 0.53 | 3.5 | 30° C. | 0.53 |
| | | | 70° C. | 0.53 |
| 2# | 0.53 | 3 | 30° C. | 0.53 |
| | | | 70° C. | 0.52 |
| 3# | 0.53 | 0.7 | 30° C. | 0.53 |
| | | | 70° C. | 0.51 |
| 4# | 0.53 | 0.1 | 30° C. | 0.53 |
| | | | 70° C. | 0.50 |
| 5# | 0.53 | $1 \times 10^{-2}$ | 30° C. | 0.53 |
| 6# | 0.53 | $1 \times 10^{-3}$ | 30° C. | 0.53 |
| 7# | 0.53 | $3 \times 10^{-4}$ | 30° C. | 0.51 |
| 8* | 0.53 | 0 | 30° C. | 0.45 |

*corresponds to a comparative sample.
corresponds to a reference sample.

sample was identified on the basis of the diffraction peaks of hydrotalcite described in JCPDS card No. 35-0965. Only the peaks derived from the hydrotalcite were observed.

Figure 4:
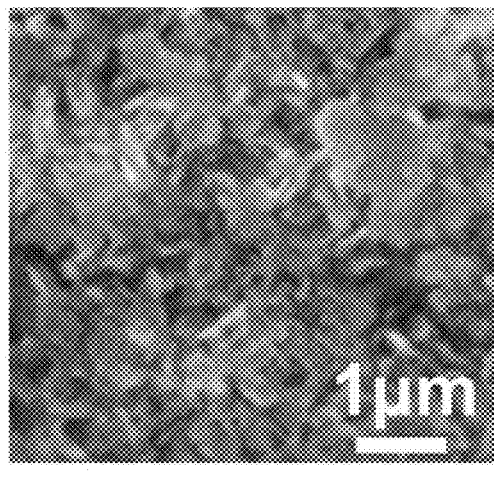
FIG. 4 is a SEM image of a microstructure of an LDH dense body before immersion thereof in an aqueous KOH solution in Example A2.

Example A2 (Reference): Evaluation of Alkali Resistance of LDH Dense Body in Electrolytic Solution The LDH dense body was immersed in electrolytic solutions (aqueous KOH solutions) having different Al concentrations and evaluated for alkali resistance (in particular, the degree of elution of Al) as described below. The surface microstructure of the LDH dense body sample prepared in Example A1 was observed with a scanning electron microscope (SEM, JSM-6610LV, manufactured by JEOL Ltd.) at an accelerating voltage of 10 to 20 kV before immersion of the sample in an electrolytic solution. FIG. 4 is a SEM image of the surface microstructure of the LDH dense body sample. The composition of the LDH dense body sample prepared in Example A1 was analyzed by energy dispersive X-ray spectrometry before immersion of the sample in an electrolytic solution. The Al/Mg ratio of the sample is shown in Table 1.

Figure 5:
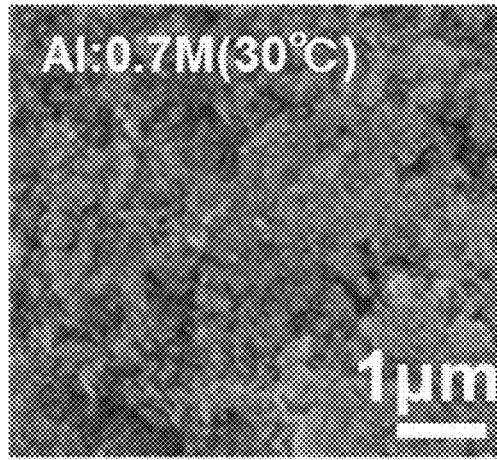
FIG. 5 is a SEM image of a microstructure of an LDH dense body after immersion thereof in an aqueous KOH solution having an Al concentration of 0.7 mol/L at 30° C. for one week in Example A2.
Figure 6:
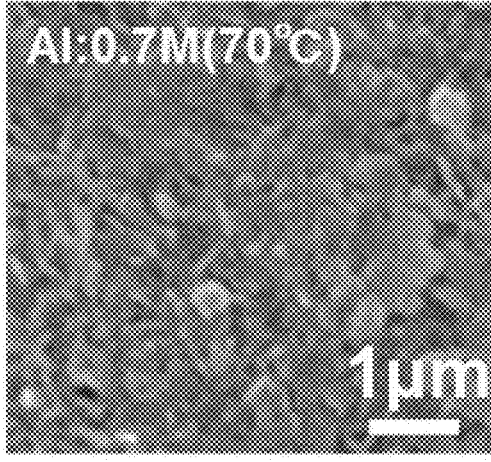
FIG. 6 is a SEM image of a microstructure of an LDH dense body after immersion thereof in an aqueous KOH solution having an Al concentration of 0.7 mol/L at 70° C. for one week in Example A2.
Figure 7:
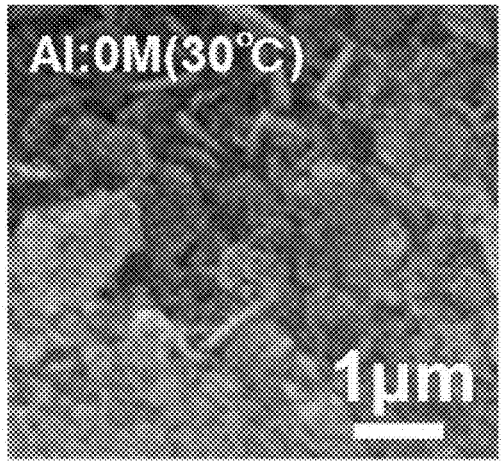
FIG. 7 is a SEM image of a microstructure of an LDH dense body after immersion thereof in an aqueous KOH solution having an Al concentration of 0 mol/L at 30° C. for one week in Example A2.

Powdery KOH and powdery Al(OH)$_3$ were added to deionized water, and the resultant mixture was agitated at 40° C. to 80° C. for 48 hours to 30 days, to prepare electrolytic solution samples 1 to 7. For comparison, electrolytic solution sample 8 was prepared in the same manner as described above except for no addition of powdery Al(OH)$_3$. The ICP analysis of the Al-containing aqueous KOH solutions demonstrated that the solutions had a KOH concentration of 9M and an Al concentration shown in Table 1. The LDH dense body prepared in Example A1 was immersed in each of electrolytic solution samples 1 to 8 at 30° C. for one week. After the one-week immersion, the LDH dense body was removed from the solution and analyzed for its composition by energy dispersive X-ray spectrometry. The LDH dense body was also evaluated under accelerated conditions (i.e., at an immersion temperature of 70° C.) in electrolytic solution samples 1 to 4. The The surface microstructure of the LDH dense body sample immersed in electrolytic solution sample 3 at 30° C. or 70° C. for one week was observed with a scanning electron microscope (SEM, JSM-6610LV, manufactured by JEOL Ltd.) at an accelerating voltage of 10 to 20 kV. The SEM images (secondary electron images) of the surface microstructures of the LDH dense body sample are illustrated in FIG. 5 (30° C.) and FIG. 6 (70° C.). The surface microstructure of the LDH dense body sample immersed in electrolytic solution sample 8 (containing no dissolved Al) at 30° C. for one week was observed in the same manner as described above. The SEM image of the surface microstructure is illustrated in FIG. 7.

Example A3 (Reference): Preparation and Evaluation of LDH Separator with Porous Substrate (1) Preparation of Porous Substrate Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a plate having a size sufficiently exceeding 5 cm×8 cm and a thickness of 0.5 cm. The resultant green body was dried at 80° C. for 12 hours and then fired at 1,150° C. for three hours, to prepare an alumina porous substrate. The porous substrate was cut into a piece of 5 cm×8 cm.

Figure 8:
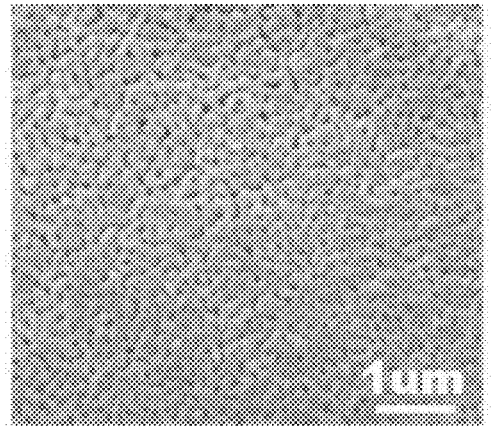
FIG. 8 is a SEM image of the surface of a porous alumina substrate prepared in Example A3.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared by using tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate. FIG. 8 illustrates the SEM image of the surface of the porous substrate.

The average pore size of the porous substrate was about 0.1 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 600 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon (registered trademark) container (with an internal volume of 800 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes (separator layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 μm. A Layered double hydroxide-containing composite material sample (hereinafter referred to as "composite material sample") was thereby prepared. LDH membranes were formed on the opposite surfaces of the porous substrate. In order to use the composite material as a separator, the LDH membrane on one surface of the porous substrate was mechanically removed.

(5) Evaluations (5a) Identification of Membrane Sample

Figure 9:
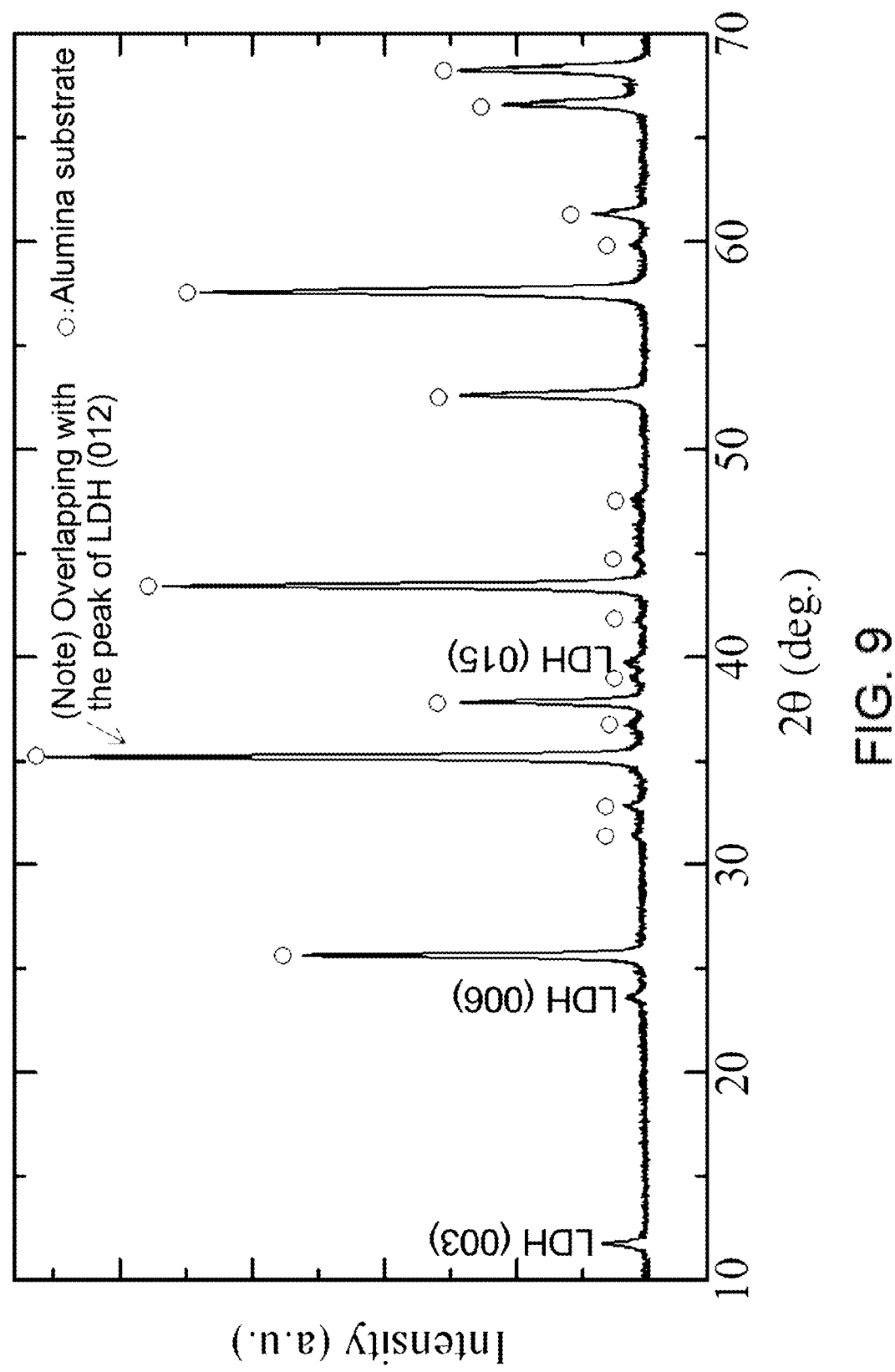
FIG. 9 is an XRD profile of a crystalline phase of a sample in Example A3.

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile is illustrated in FIG. 9. The XRD profile was compared with the diffraction peaks of a layered double hydroxide (or a hydrotalcite compound) described in JCPDS card No. 35-0964 for identification of the membrane sample. The membrane sample was identified as a layered double hydroxide (LDH, or a hydrotalcite compound). As shown in the XRD profile of FIG. 9, peaks derived from alumina in the porous substrate on which the membrane sample was formed (i.e., the peaks marked with a circle) were also observed.

(5b) Observation of Microstructure

Figure 10:
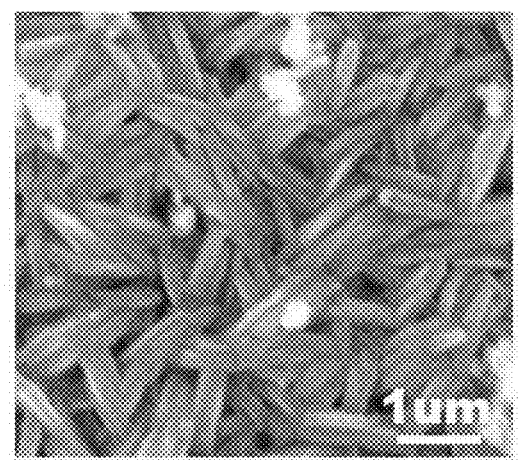
FIG. 10 is a SEM image of a surface microstructure of a sample membrane in Example A3.

The surface microstructure of the membrane sample was observed with a scanning electron microscope (SEM; JSM-6610LV, manufactured by JEOL Ltd.) at an acceleration voltage of 10 to 20 kV. FIG. 10 illustrates the resultant SEM image (i.e., a secondary electron image) of the surface microstructure of the membrane sample.

Figure 11:
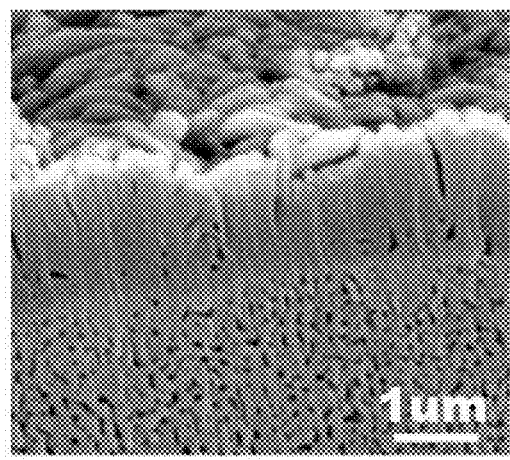
FIG. 11 is a SEM image of a microstructure at a polished cross-sectional surface of a composite material sample in Example A3.

A cross-section of the composite material sample was subjected to CP polishing, and the microstructure of the polished cross-section was observed with a scanning electron microscope (SEM) at an acceleration voltage of 10 to 20 kV. FIG. 11 illustrates the resultant SEM image of the microstructure of the polished cross-section of the composite material sample.

(5c) Measurement of Porosity

The porosity at the surface of the membrane sample was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared by using tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the membrane. The porosity was 19.0%. This porosity was used to calculate the density D (hereinafter referred to as "membrane surface density") of the surface of the membrane by the expression: D=100%−(the porosity at the surface of the membrane). The density D was 81.0%.

The porosity at the polished cross-section of the membrane sample was also determined. The porosity was determined as in the above procedure except for taking an electron microscopic (SEM) image of the polished cross-section along the thickness of the membrane at a magnification of 10,000 or more (through the above procedure (5b)). The determination of the porosity was performed on the cross-section of the membrane portion in the oriented membrane sample. The porosity at the polished cross-section of the membrane sample was 3.5% on average (i.e., the average porosity of three polished cross-sections). The results demonstrate a significantly high density of the membrane formed on the porous substrate.

(5d) Evaluation of Density I

Figure 12A:
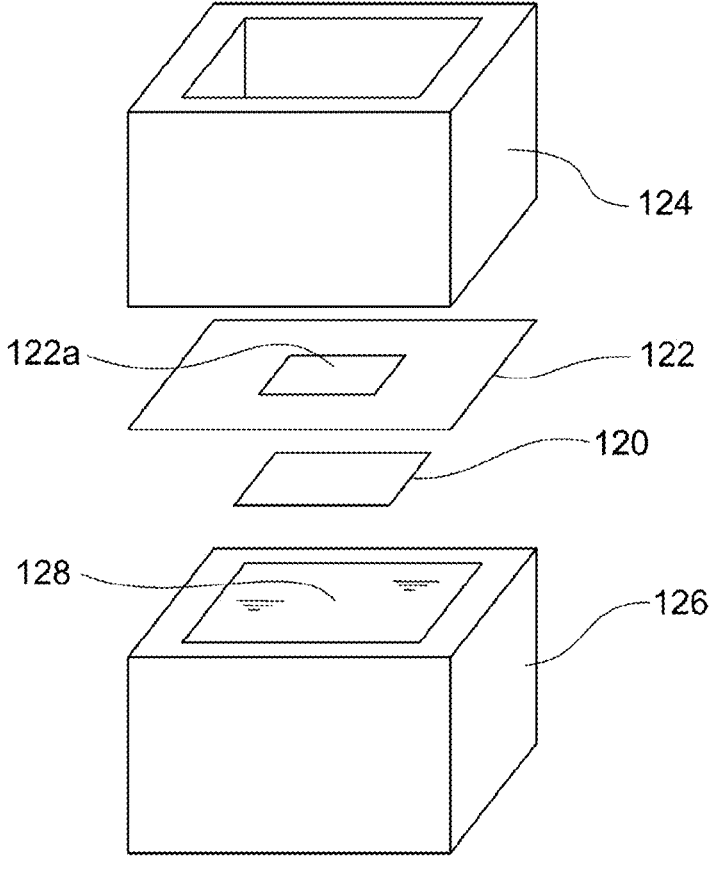
FIG. 12A is an exploded perspective view of a system for evaluating and measuring density in Example A3.
Figure 12B:
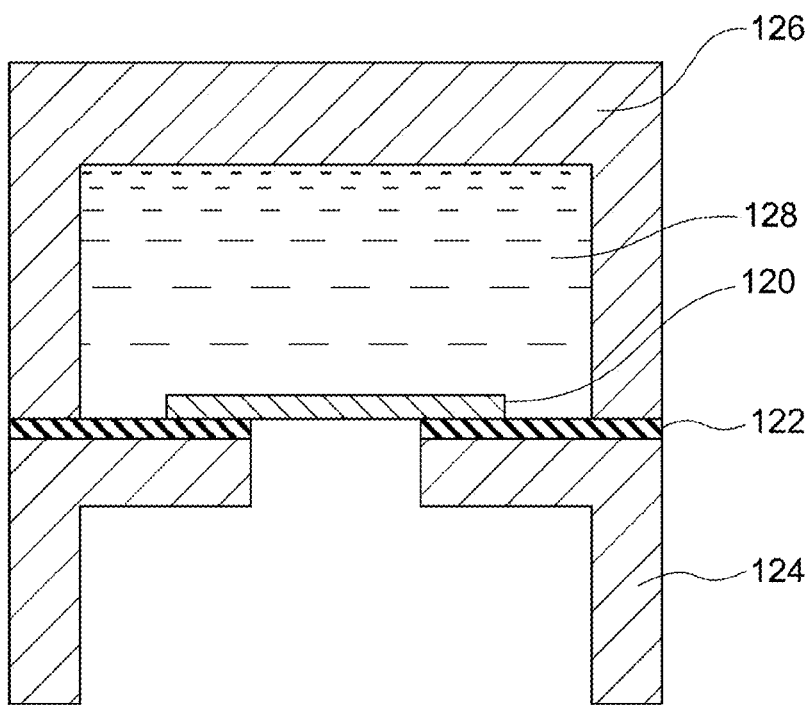
FIG. 12B a schematic cross-sectional view of a system for evaluating and measuring density in Example A3.

A density evaluation test was performed on the membrane sample for determining whether the sample has high density and thus water impermeability. With reference to FIG. 12A, a silicone rubber 122 having a central opening 122a (0.5 cm×0.5 cm) was bonded to the membrane sample of composite material sample 120 prepared in (1) above (cut into a piece of 1 cm×1 cm), and the resultant laminate was disposed between two acrylic units 124 and 126 and bonded to these acrylic units. The acrylic unit 124 disposed on the silicone rubber 122 has no bottom, and thus the silicone rubber 122 is bonded to the acrylic unit 124 such that the opening 122a is exposed. The acrylic unit 126 disposed on the porous substrate of composite material sample 120 has a bottom and contains ion-exchange water 128. In this case, Al and/or Mg may be dissolved in the ion-exchange water. Thus, these components are arranged to form an assembly such that the ion-exchange water 128 comes into contact with the porous substrate of composite material sample 120 if the assembly is inverted upside down. After formation of the assembly, the total weight thereof was measured. It should be noted the unit 126 has a closed vent (not shown) and the vent is opened after inversion of the assembly. As illustrated in FIG. 12B, the assembly was inverted and left for one week at 25° C., and then the total weight thereof was measured again. Before measurement of the weight of the assembly, water droplets on the inner side(s) of the acrylic unit 124 were wiped off, if any. The density of the membrane sample was evaluated on the basis of the difference between the total weights of the assembly before and after the inversion. No change in weight of the ion-exchange water was observed even after the one-week test at 25° C. The results demonstrate that the membrane sample (i.e., functional membrane) exhibits high density and thus water impermeability.

(5e) Evaluation of Density II

Figure 13A:
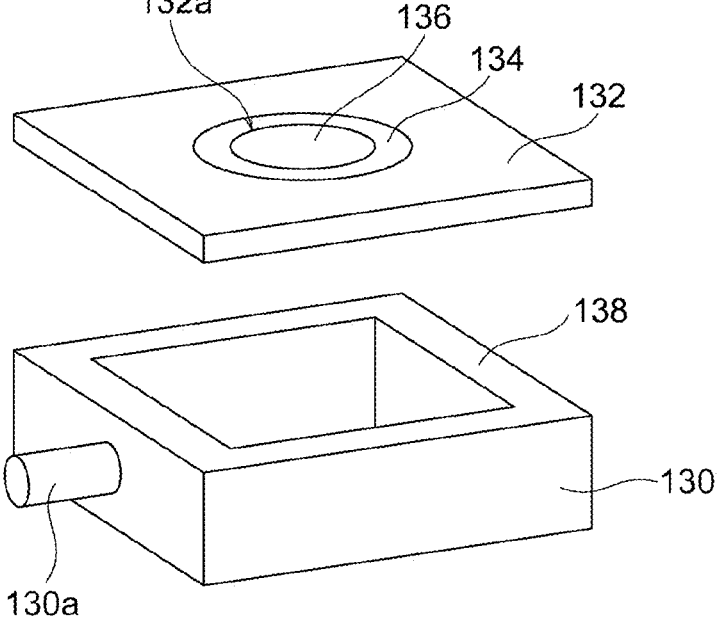
FIG. 13A is an exploded perspective view of a hermetic container used in density evaluation test II in Example A3.
Figure 13B:
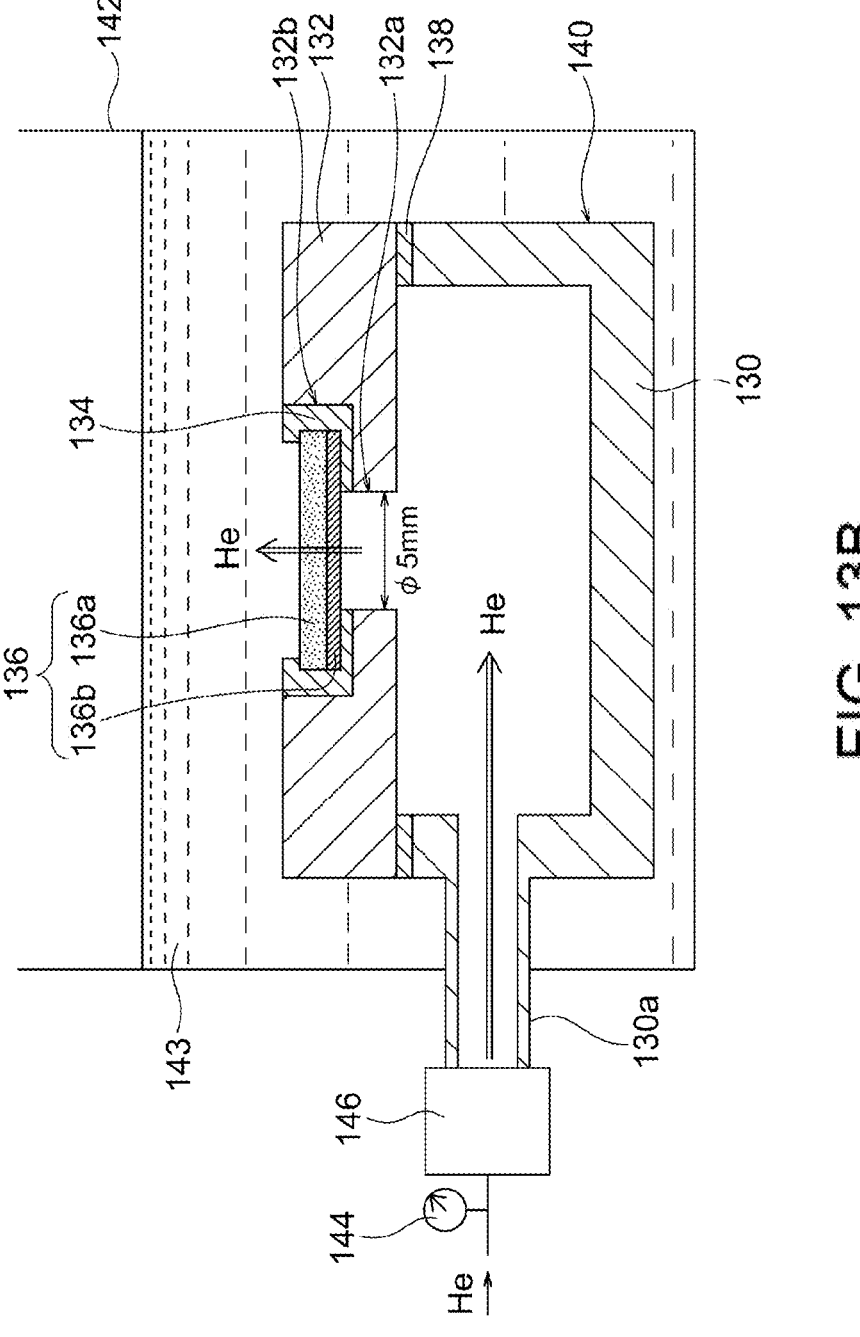
FIG. 13B is a schematic cross-sectional view of a system used in density evaluation test II in Example A3.

A density evaluation test was performed on the membrane sample for determining whether the sample has high density and thus gas impermeability. As illustrated in FIGS. 13A and 13B, an acrylic container 130 and an alumina jig 132 were provided. The container 130 has no lid, and the jig 132 has a shape and a size such that it serves as a lid for the container 130. The acrylic container 130 has a gas inlet 130a for feeding a gas into the container 130. The alumina jig 132 has an opening 132a having a diameter of 5 mm, and a dent 132b provided around the opening 132a for supporting the membrane sample. An epoxy adhesive 134 was applied to the dent 132b of the alumina jig 132, and a membrane sample 136b of a composite material sample 136 was placed on the dent 132b and gas- and liquid-tightly bonded to the alumina jig 132. The alumina jig 132 provided with the composite material sample 136 was gas- and liquid-tightly bonded to the upper edge of the acrylic container 130 with a silicone adhesive 138 so as to completely cover the opening of the acrylic container 130, to prepare a hermetic container 140 for evaluation. The hermetic container 140 was placed in a water bath 142, and the gas inlet 130a of the acrylic container 130 was connected to a pressure gauge 144 and a flowmeter 146 so as to allow helium gas to be fed into the acrylic container 130. Water 143 was poured into the water bath 142 such that the hermetic container 140 was completely submerged in the water. The hermetic container 140 was ensured to have gas tightness and liquid tightness. The membrane sample 136b of the composite material sample 136 was exposed to the inner space of the hermetic container 140, and the porous substrate 136a of the composite material sample 136 was in contact with the water in the water bath 142. Helium gas was fed into the hermetic container 140 through the gas inlet 130a of the acrylic container 130. The pressure gauge 144 and the flowmeter 146 were monitored to achieve a differential pressure of 0.5 atm at the membrane sample 136b (i.e., the pressure applied to the surface in contact with helium gas was higher by 0.5 atm than water pressure applied to the opposite surface), to determine the presence of helium gas bubbles in the water caused by permeation of helium gas through the composite material sample 136. No helium gas bubbles were observed. The results demonstrate that the membrane sample 136b has high density and thus gas impermeability.

Example A4 (Reference): Production and Evaluation of Nickel-Zinc Battery (1) Preparation of Separator with Porous Substrate A separator provided with a porous substrate (hydrotalcite membrane on alumina substrate) (size: 5 cm×8 cm) was prepared as in Example A1.

(2) Preparation of Positive Electrode Plate

Particulate nickel hydroxide containing zinc and cobalt in the form of solid solution was prepared. The particulate nickel hydroxide was coated with cobalt hydroxide to yield a positive-electrode active material. The positive-electrode active material was mixed with a 2% aqueous carboxymethyl cellulose solution to prepare a paste. The paste was evenly applied to a collector composed of a nickel porous substrate having a porosity of about 95% and dried so that the porosity of the positive-electrode active material was 50% to prepare a positive electrode plate having a region of 5 cm×5 cm coated with the active material. The amount of coating was adjusted so that the active material contained particulate nickel hydroxide corresponding to 4 Ah.

(3) Preparation of Negative Electrode Plate

A mixture of powdery zinc oxide (80 parts by weight), powdery zinc (20 parts by weight), and particulate polytetrafluoroethylene (3 parts by weight) was applied onto a collector composed of punched copper sheet, to prepare a negative electrode plate having a porosity of about 50% and a region of 5 cm×5 cm coated with the active material. The amount of coating was adjusted so that the active material contained powdery zinc oxide corresponding to a positive electrode plate capacity of 4 Ah.

(4) Assembly of Battery

The positive electrode plate, the negative electrode plate, and the separator provided with the porous substrate were assembled as described below into a nickel-zinc battery illustrated in FIG. 1.

A rectangular parallelepiped casing composed of ABS resin and having no lid was provided. The separator provided with the porous substrate (hydrotalcite membrane on alumina substrate) was placed near the center of the casing, and three edges of the separator were fixed to the inner wall of the casing with a commercially available epoxy-resin adhesive. The positive electrode plate and the negative electrode plate were placed in a positive-electrode chamber and a negative-electrode chamber, respectively. The positive electrode plate and the negative electrode plate were disposed so that a positive-electrode collector and a negative-electrode collector came into contact with the inner wall of the casing. A 6 mol/L aqueous KOH solution, serving as an electrolytic solution, was injected into the positive-electrode chamber in an amount such that the region coated with the positive-electrode active material was completely submerged in the solution. The liquid level of the electrolytic solution in the positive-electrode chamber was about 5.2 cm from the bottom of the casing. A 6 mol/L aqueous KOH solution, serving as an electrolytic solution, was injected into the negative-electrode chamber in an amount such that the region coated with the negative-electrode active material was completely submerged in the solution. The amount of the electrolytic solution was adjusted so as to meet the amount of water that will decrease during a charge mode. The liquid level of the electrolytic solution in the negative-electrode chamber was about 6.5 cm from the bottom of the casing. The terminals of the positive-electrode collector and the negative-electrode collector were connected to external terminals provided at the top of the casing. A lid for the casing was fixed to the casing by thermal fusion to hermetically seal the battery casing. The nickel-zinc battery was thereby produced. In the battery, the separator had a width of 5 cm and a height of 8 cm, and the region of the positive or negative electrode plates coated with the active material had a width of 5 cm and a height of 5 cm. Thus, an upper space of the positive-electrode or negative electrode chamber corresponding to a difference in height of 3 cm was respectively an extra positive-electrode or negative-electrode space.

(5) Evaluation

The resultant nickel-zinc battery was subjected to constant-current charging for 10 hours (design capacity: 4 Ah, current: 0.4 mA corresponding to 0.1 C). Neither the deformation of the casing nor the leakage of the electrolytic solution was observed after the charging. The liquid level of the electrolytic solution was observed after the charging. The liquid level of the electrolytic solution in the positive-electrode chamber was about 7.5 cm from the bottom of the casing, and the liquid level of the electrolytic solution in the negative-electrode chamber was about 5.2 cm from the bottom of the casing. Although the amount of the electrolytic solution increased in the positive-electrode chamber and the amount of the electrolytic solution decreased in the negative-electrode chamber through the charging, the region coated with the negative-electrode active material was immersed in a sufficient amount of the electrolytic solution. Thus, the electrolytic solution was retained in the casing in an amount sufficient for the charge/discharge reaction of the coated positive-electrode active material and negative-electrode active material through charge/discharge of the battery.

Example A5 (Reference): Production of Zinc-Air Secondary Battery (1) Preparation of Separator Provided with Porous Substrate A separator provided with a porous substrate (hereinafter referred to simply as "separator") (i.e., hydrotalcite membrane on alumina substrate) was prepared as in Example A1.

(2) Preparation of Air Electrode Layer

Particulate $\alpha$-$MnO_2$ serving as an air electrode catalyst was prepared as follows: $Mn(SO_4)\cdot5H_2O$ and $KMnO_4$ were mixed in a molar ratio of 5:13 and dissolved in deionized water. The resultant mixture was poured into a stainless steel hermetic container lined with Teflon (registered trademark) and subjected to hydrothermal synthesis at 140° C. for two hours. The precipitate obtained through the hydrothermal synthesis was filtered, washed with distilled water, and then dried at 80° C. for six hours, to prepare particulate $\alpha$-$MnO_2$.

A particulate layered double hydroxide (hereinafter referred to as "particulate LDH") serving as a hydroxide-ion-conductive material was prepared as follows: $Ni(NO_3)_2\cdot6H_2O$ and $Fe(NO_3)_3\cdot9H_2O$ were mixed (molar ratio of Ni:Fe=3:1) and dissolved in deionized water. The resultant mixture was added dropwise to a 0.3M $Na_2CO_3$ solution at 70° C. with agitation. The pH of the mixture was adjusted to 10 by addition of a 2M NaOH solution, and the mixture was maintained at 70° C. for 24 hours. The precipitate produced in the mixture was filtered, washed with distilled water, and then dried at 80° C., to prepare powdery LDH.

The particulate $\alpha$-$MnO_2$, the particulate LDH, and carbon black (VXC72, manufactured by Cabot Corporation) serving as an electron conductive material were weighed in predetermined proportions and then wet-mixed in the presence of ethanol solvent. The resultant mixture was dried at 70° C. and then pulverized. The resultant powder was mixed with a binder (PTFE, EC-TEF-500ML, manufactured by ElectroChem) and water (1 mass % relative to the air electrode) to be fibrillated. The resultant fibrillary mixture was press-bonded to a collector (carbon cloth, EC-CC1-060T, manufactured by ElectroChem) into a sheet having a thickness of 50 μm, to prepare a laminate of an air electrode layer on the collector. The resultant air electrode layer contained the electron conductive phase (carbon black) in an amount of 20 vol. %, the catalyst layer (particulate $\alpha$-$MnO_2$) in an amount of 5 vol. %, the hydroxide-ion-conductive phase (particulate LDH) in an amount of 70 vol. %, and the binder phase (PTFE) in an amount of 5 vol. %.

(3) Preparation of Air Electrode with Separator

An anion-exchange membrane (NEOSEPTAAHA, manufactured by ASTOM Corporation) was immersed in a 1M aqueous NaOH solution overnight. The anion-exchange membrane, serving as an intermediate layer, is disposed on the hydrotalcite membrane (separator), to prepare a laminate of the separator on the intermediate layer. The intermediate layer has a thickness of 30 μm. The above-prepared air electrode layer/collector laminate is press-bonded to the separator/intermediate layer laminate such that the air electrode layer is in contact with the intermediate layer, to prepare an air electrode with the separator.

(4) Preparation of Negative Electrode Plate

A mixture of powdery zinc oxide (80 parts by weight), powdery zinc (20 parts by weight), and particulate polytetrafluoroethylene (3 parts by weight) is applied onto a collector composed of punched copper sheet, to prepare a negative electrode plate having a porosity of about 50% and a region coated with the active material.

(5) Preparation of Third Electrode

A platinum paste is applied to a nickel mesh collector to prepare a third electrode.

(6) Assembly of Battery

The air electrode with the separator, the negative electrode plate, and the third electrode are assembled into a horizontal zinc-air secondary battery illustrated in FIG. 3A through the procedure described below. A rectangular parallelepiped container composed of ABS resin and having no lid (hereinafter referred to as "resin container") is provided. The negative electrode plate is disposed on the bottom of the resin container such that the surface coated with the negative-electrode active material faces upward. The negative-electrode collector is in contact with the bottom of the resin container, and one end of the negative-electrode collector is connected to an external terminal penetrating through the side of the resin container. The third electrode is disposed on the inner wall of the resin container at a position above the top surface of the negative electrode (i.e., a position that is not in contact with the negative electrode and is not involved in the charge/discharge reaction), and a non-woven separator is disposed to come into contact with the third electrode. The opening of the resin container is covered with the air electrode with the separator such that the air electrode is exposed to the outside. In this case, a commercially available epoxy-resin adhesive is applied to the periphery of the opening such that the opening is gas- and liquid-tightly sealed with the air electrode. A 6 mol/L aqueous KOH solution, serving as an electrolytic solution, is injected into the resin container through a small inlet provided near the top of the resin container. Thus, the separator is in contact with the electrolytic solution, and the electrolytic solution is always in contact with the third electrode because of the liquid-retaining ability of the non-woven separator despite a variation in amount of the electrolytic solution. In view of the production of the battery in a discharge end state, an excess amount of the electrolytic solution is injected into the resin container such that the region coated with the negative-electrode active material is completely submerged in the electrolytic solution in the container and the amount of the electrolytic solution meets the amount of water that will decrease during a charge mode. Thus, the resin container is designed so as to accommodate the excess amount of the electrolytic solution. The inlet of the resin container is then sealed. The space defined by the resin container and the separator is gas- and liquid-tightly sealed. The third electrode is then connected to the collector layer of the air electrode via an external circuit. The zinc-air secondary battery is thereby produced.

As described above, the separator exhibits high density and thus water impermeability and gas impermeability. This configuration of the zinc-air secondary battery physically inhibits the penetration of dendritic zinc (which may be formed during a charge mode of the battery) through the separator, to prevent the short circuit between the positive and negative electrodes. This configuration also inhibits the intrusion of carbon dioxide contained in air, to prevent precipitation of an alkaline carbonate (caused by carbon dioxide) in the electrolytic solution. In addition, hydrogen gas generated from the negative electrode 34 by the side reaction comes into contact with the third electrode 38 to produce water through the above-described reactions. Thus, the zinc-air secondary battery has a configuration suitable for preventing both the short circuit caused by dendritic zinc and the intrusion of carbon dioxide, and can address problems caused by the generation of hydrogen gas; i.e., the zinc-air secondary battery exhibits high reliability.

Examples B1 to B8

Examples B1 to B7 shown below are reference examples for LDH-like compound separators, while Examples B8 shown below is a comparative example for an LDH separator. The LDH-like compound separators and LDH separator will be collectively referred to as hydroxide ion-conductive separators. The method for evaluating the hydroxide ion-conductive separators produced in the following examples was as follows.
Evaluation 1: Observation of Surface Microstructure
The surface microstructure of the hydroxide ion-conductive separator was observed using a scanning electron microscope (SEM, JSM-6610LV, manufactured by JEOL Ltd.) at an acceleration voltage of 10 to 20 kV.
Evaluation 2: STEM Analysis of Layered Structure
The layered structure of the hydroxide ion-conductive separator was observed using a scanning transmission electron microscope (STEM) (product name: JEM-ARM200F, manufactured by JEOL Ltd.) at an acceleration voltage of 200 kV.

Figure 14A:
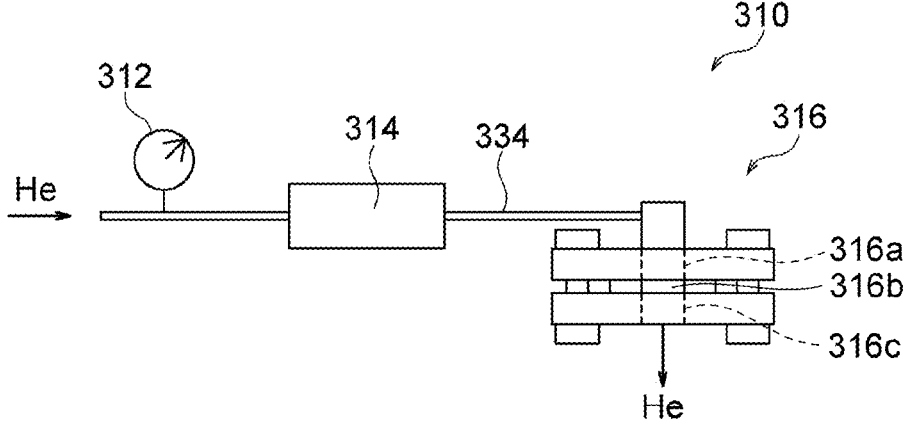
FIG. 14A is a conceptual view illustrating an example system for measuring helium permeability used in Examples B1 to D2.
Figure 14B:
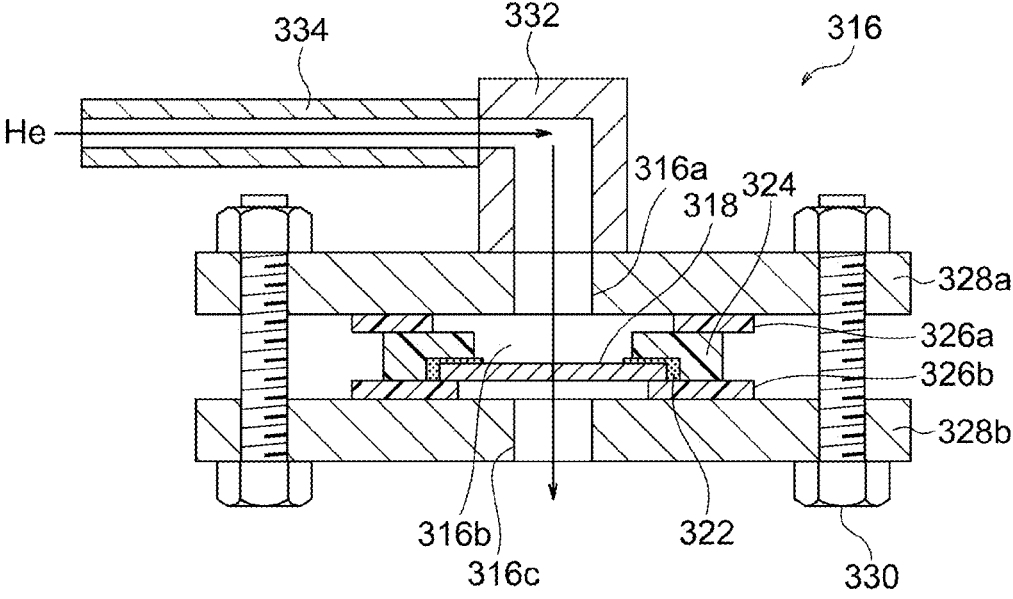
FIG. 14B is a schematic cross-sectional view of a sample holder and its peripheral configuration used in the measurement system shown in FIG. 14A.

Evaluation 3: Elemental Analysis Evaluation (EDS)
A surface of the hydroxide ion-conductive separator was subjected to compositional analysis using an EDS analyzer (device name: X-act, manufactured by Oxford Instruments), to calculate the composition ratio (atomic ratio) Mg:Ti:Y:Al. This analysis was performed by 1) capturing an image at an acceleration voltage of 20 kV and a magnification of 5,000 times, 2) performing analysis at three points at intervals of about 5 μm in the point analysis mode, 3) repeating procedures 1) and 2) above once again, and 4) calculating an average of the six points in total.
Evaluation 4: X-Ray Diffraction Measurement
Using an X-ray diffractometer (RINT TTR III, manufactured by Rigaku Corporation), the crystalline phase of the hydroxide ion-conductive separator was measured under the measurement conditions of voltage: 50 kV, current value: 300 mA, and measurement range: 5 to 40°, to obtain an XRD profile. Further, the interlayer distance in the layered crystal structure was determined by Bragg's equation using 2θ corresponding to peaks derived from the LDH-like compound.
Evaluation 5: He Permeation Measurement
In order to evaluate the denseness of the hydroxide ion-conductive separator in view of the He permeation, a He permeation test was performed as shown below. The helium permeability measurement system 310 shown in FIGS. 14A and 14B was constructed. The helium permeability measurement system 310 was configured to supply helium gas from a gas cylinder filled with helium gas to a sample holder 316 through the pressure gauge 312 and a flow meter 314 (digital flow meter), and to discharge the gas by permeating from one side to the other side of the hydroxide ion-conductive separator 318 held by the sample holder 316.

The sample holder 316 had a structure including a gas supply port 316a, a sealed space 316b and a gas discharge port 316c, and was assembled as follows: An adhesive 322 was applied along the outer periphery of the hydroxide ion-conductive separator 318 and bonded to a jig 324 (made of ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each including a flange having an opening. Thus, the sealed space 316b was partitioned by the hydroxide ion-conductive separator 318, the jig 324, the sealing member 326a, and the supporting member 328a. The supporting members 328a and 328b were tightly fastened to each other with fastening means 330 with screws not to cause leakage of helium gas from portions other than the gas discharge port 316c. A gas supply pipe 334 was connected to the gas supply port 316a of the sample holder 316 assembled as above through a joint 332.

Helium gas was then supplied to the helium permeability measurement system 310 via the gas supply pipe 334, and the gas was permeated through the hydroxide ion-conductive separator 318 held in the sample holder 316. A gas supply pressure and a flow rate were then monitored with a pressure gauge 312 and a flow meter 314. After permeation of helium gas for one to thirty minutes, the helium permeability was calculated. The helium permeability was calculated from the expression of F/(P×S) where F (cm³/min) was the volume of permeated helium gas per unit time, P (atm) was the differential pressure applied to the hydroxide ion-conductive separator when helium gas permeated through, and S (cm²) was the area of the membrane through which helium gas permeates. The permeation rate F (cm³/min) of helium gas was read directly from the flow meter 314. The gauge pressure read from the pressure gauge 312 was used for the differential pressure P. Helium gas was supplied such that the differential pressure P was within the range of 0.05 to 0.90 atm.

Evaluation 6: Measurement of Ion Conductivity

Figure 15:
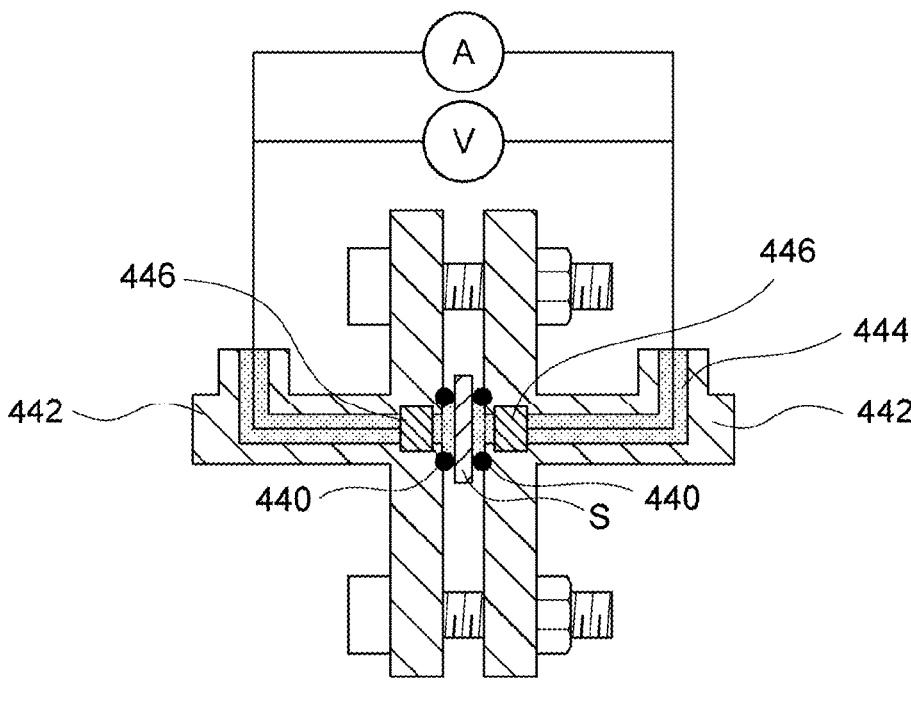
FIG. 15 is a schematic cross-sectional view illustrating an electrochemical measurement system used in Examples B1 to B5.

The conductivity of the hydroxide ion-conductive separator in the electrolytic solution was measured using the electrochemical measurement system shown in FIG. 15, as follows. A hydroxide ion-conductive separator sample S was sandwiched by 1-mm thick silicone packings 440 from both sides, to be assembled in a PTFE flange-type cell 442 with an inner diameter of 6 mm. As electrodes 446, nickel wire meshes of #100 mesh were assembled in the cell 442 into a cylindrical shape with a diameter of 6 mm, so that the distance between the electrodes was 2.2 mm. The cell 442 was filled with a 5.4 M KOH aqueous solution as an electrolytic solution 444. Using electrochemical measurement systems (potentiostat/galvanostat-frequency response analyzers Type 1287A and Type 1255B, manufactured by Solartron Metrology), measurement was performed under the conditions of a frequency range of 1 MHz to 0.1 Hz and an applied voltage of 10 mV, and the real axis intercept was taken as the resistance of the hydroxide ion conductive separator sample S. The same measurement as above was carried out without the hydroxide ion-conductive separator sample S, to determine a blank resistance. The difference between the resistance of the hydroxide ion-conductive separator sample S and the blank resistance was taken as the resistance of the hydroxide ion-conductive separator. The conductivity was determined using the resistance of the hydroxide ion-conductive separator obtained, and the thickness and area of the hydroxide ion-conductive separator.

Evaluation 7: Evaluation of Alkali Resistance

A 5.4 M KOH aqueous solution containing zinc oxide at a concentration of 0.4 M was prepared. 0.5 mL of the KOH aqueous solution prepared and a hydroxide ion-conductive separator sample with a size of 2 cm square were put into a closed container made of Teflon®. Thereafter, it was maintained at 90° C. for one week (that is, 168 hours), and then the hydroxide ion-conductive separator sample was taken out of the closed container. The hydroxide ion-conductive separator sample taken out was dried overnight at room temperature. For the sample obtained, the He permeability was calculated in the same manner as in Evaluation 5, to determine whether or not the He permeability changed before and after the immersion in alkali.

Evaluation 8: Evaluation of Dendrite Resistance (Cycle Test)

In order to evaluate the effect of suppressing short circuits due to zinc dendrites (dendrite resistance) of the hydroxide ion-conductive separator, a cycle test was performed, as follows. First, each of the positive electrode (containing nickel hydroxide and/or nickel oxyhydroxide) and the negative electrode (containing zinc and/or zinc oxide) was wrapped with a non-woven fabric, and the current extraction terminal was welded thereto. The positive electrode and the negative electrode thus prepared were opposed to each other via the hydroxide ion-conductive separator and sandwiched between laminate films provided with current outlets, and three sides of the laminate films were heat-sealed. An electrolytic solution (a solution in which 0.4 M zinc oxide was dissolved in a 5.4 M KOH aqueous solution) was added to the cell container with the top open thus obtained, and the positive electrode and the negative electrode was sufficiently impregnated with the electrolytic solution by vacuuming or the like. Thereafter, the remaining one side of the laminate films was heat-sealed, to form a simple sealed cell. Using a charge/discharge device (TOSCAT3100, manufactured by TOYO SYSTEM CO., LTD.), the simple sealed cell was charged at 0.1 C and discharged at 0.2 C for chemical conversion. Thereafter, a 1-C charge/discharge cycle was conducted. While repeating the charge/discharge cycle under the same conditions, the voltage between the positive electrode and the negative electrode was monitored with a voltmeter, and the presence or absence of sudden voltage drops (specifically, voltage drops of 5 mV or more from the voltage that was just previously plotted) following short circuits due to zinc dendrites between the positive electrode and the negative electrode was examined and evaluated according to the following criteria.

No short circuits occurred: No sudden voltage drops as described above were observed during charging even after 300 cycles.

Short circuits occurred: Sudden voltage drops as described above were observed during charging in less than 300 cycles.

Example B1 (Reference)

(1) Preparation of Porous Polymer Substrate

A commercially available polyethylene microporous membrane with a porosity of 50%, a mean pore size of 0.1 μm, and a thickness of 20 μm was prepared as a porous polymer substrate and cut out into a size of 2.0 cm×2.0 cm.

(2) Titania Sol Coating on Porous Polymer Substrate

The substrate prepared by procedure (1) above was coated with a titanium oxide sol solution (M6, manufactured by Taki Chemical Co., Ltd.) by dip coating. Dip coating was performed by immersing the substrate in 100 ml of the sol solution and pulling it out perpendicularly, followed by drying at room temperature for 3 hours.

(3) Production of Raw Material Aqueous Solution

As raw materials, magnesium nitrate hexahydrate (Mg $(NO_3)_2 \cdot 6H_2O$, manufactured by KANTO CHEMICAL CO., INC.) and urea $((NH_2)_2CO$, manufactured by Sigma-Aldrich Corporation) were prepared. The magnesium nitrate hexahydrate was weighed to 0.015 mol/L and put into a beaker, and deionized water was added thereto so that the total amount was 75 ml. After stirring the solution obtained, urea weighed at a ratio urea/$NO_3^-$ (molar ratio) of 48 was added into the solution, followed by further stirring, to obtain a raw material aqueous solution.

(4) Membrane Formation by Hydrothermal Treatment

The raw material aqueous solution and the dip-coated substrate were enclosed together in a closed container made of Teflon® (autoclave container, content: 100 ml, with an outer stainless steel jacket). At this time, the substrate was lifted from the bottom of the closed container made of Teflon® and fixed and installed vertically so that the solution was in contact with both sides of the substrate. Thereafter, an LDH-like compound was formed on the surface and inside the substrate by applying hydrothermal treatment at a hydrothermal temperature of 120° C. for 24 hours. After a lapse of a predetermined time, the substrate was taken out of the closed container, washed with deionized water, and dried at 70° C. for 10 hours, to form an LDH-like compound in the pores of the porous substrate. Thus, an LDH-like compound separator was obtained.

(5) Densification by Roll Pressing

The LDH-like compound separator was sandwiched by a pair of PET films (Lumirror®, manufactured by Toray Industries, Inc., with a thickness of 40 μm) and roll-pressed at a roll rotation speed of 3 mm/s and a roller heating temperature of 70° C. with a roll gap of 70 μm, to obtain an LDH-like compound separator that was further densified.
(6) Evaluation Results The LDH-like compound separator obtained was subjected to Evaluations 1 to 8. The results were as follows.

Figure 16A:
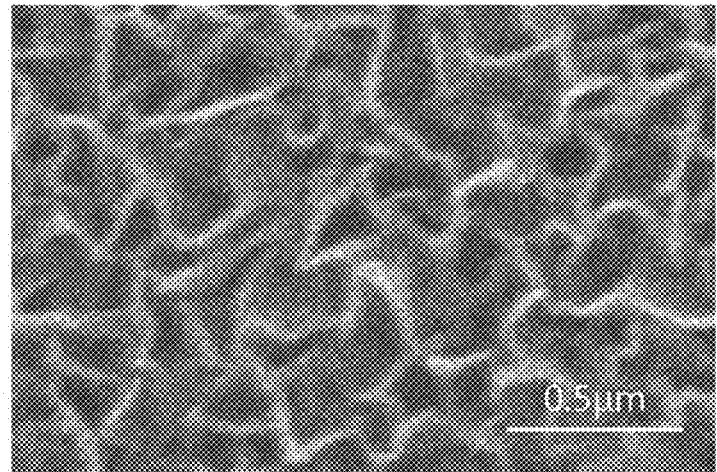
FIG. 16A is an SEM image of a surface of an LDH-like compound produced in Example B1.

Evaluation 1: The SEM image of the surface microstructure of the LDH-like compound separator obtained in Example B1 (before roll pressing) was as shown in FIG. 16A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg and Ti, which were constituent elements of the LDH-like compound, were detected on the surface of the LDH-like compound separator. Further, the composition ratio (atomic ratio) of Mg and Ti on the surface of the LDH-like compound separator, which was calculated by EDS elemental analysis, was as shown in Table 1.

Figure 16B:
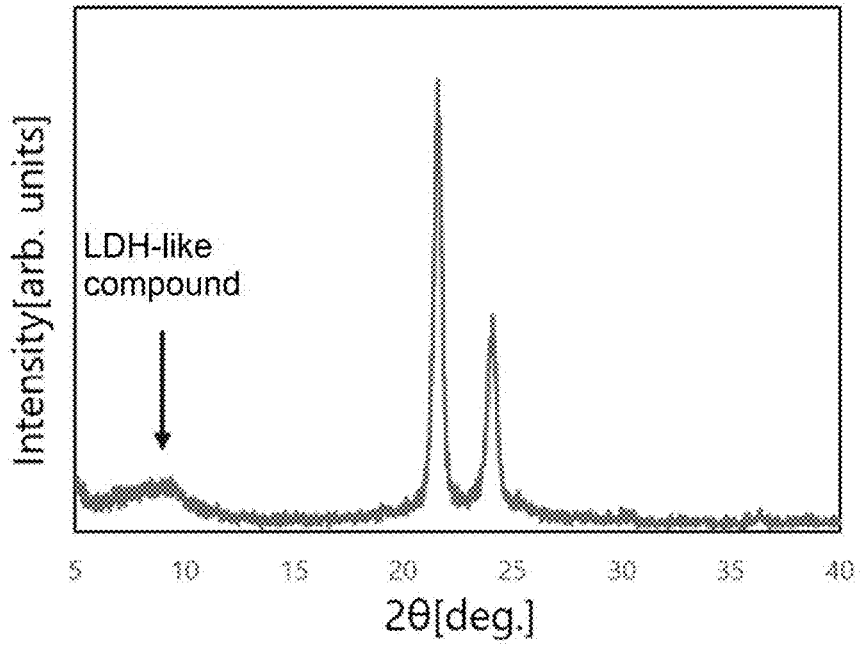
FIG. 16B is the result of X-ray diffraction of the LDH-like compound separator produced in Example B1.

Evaluation 4: FIG. 16B shows the XRD profile obtained in Example B1. In the XRD profile obtained, a peak was observed around $2\theta=9.4°$. Generally, the (003) peak position of LDH is observed at $2\theta=11$ to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at $20<2\theta°<25$ in the XRD profile are peaks derived from polyethylene constituting the porous substrate. Further, the interlayer distance in the layered crystal structure of the LDH-like compound was 0.94 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B2 (Reference)

An LDH-like compound separator was produced and evaluated in the same manner as in Example B1 except that the raw material aqueous solution was produced as follows in procedure (3) above, and the temperature for the hydrothermal treatment was changed to 90° C. in procedure (4) above.
(Production of Raw Material Aqueous Solution)

As raw materials, magnesium nitrate hexahydrate (Mg(NO₃)₂·6H₂O, manufactured by KANTO CHEMICAL CO., INC.) and urea ((NH₂)₂CO, manufactured by Sigma-Aldrich Corporation) were prepared. The magnesium nitrate hexahydrate was weighed to 0.03 mol/L and put into a beaker, and deionized water was added thereto so that the total amount was 75 ml. After stirring the solution obtained, urea weighed at a ratio urea/NO₃-(molar ratio) of 8 was added into the solution, followed by further stirring, to obtain a raw material aqueous solution.

Figure 17A:
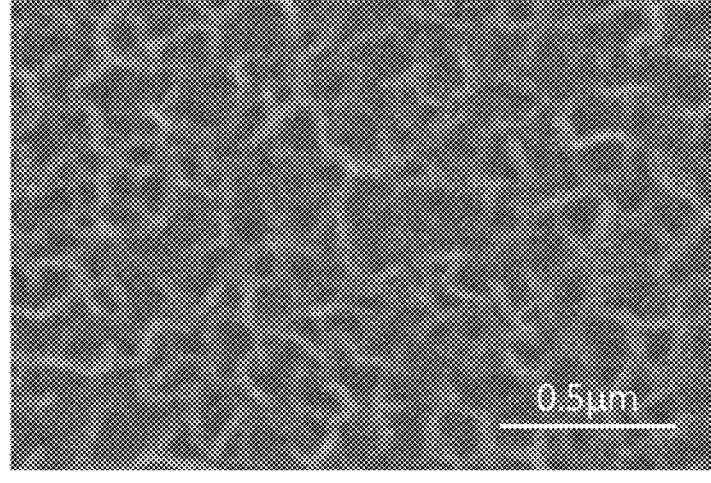
FIG. 17A is an SEM image of a surface of an LDH-like compound separator produced in Example B2.

Evaluation 1: The SEM image of the surface microstructure of the LDH-like compound separator obtained in Example B2 (before roll pressing) was as shown in FIG. 17A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg and Ti, which were constituent elements of the LDH-like compound, were detected on the surface of the LDH-like compound separator. Further, the composition ratio (atomic ratio) of Mg and Ti on the surface of the LDH-like compound separator, which was calculated by EDS elemental analysis, was as shown in Table 2.

Figure 17B:
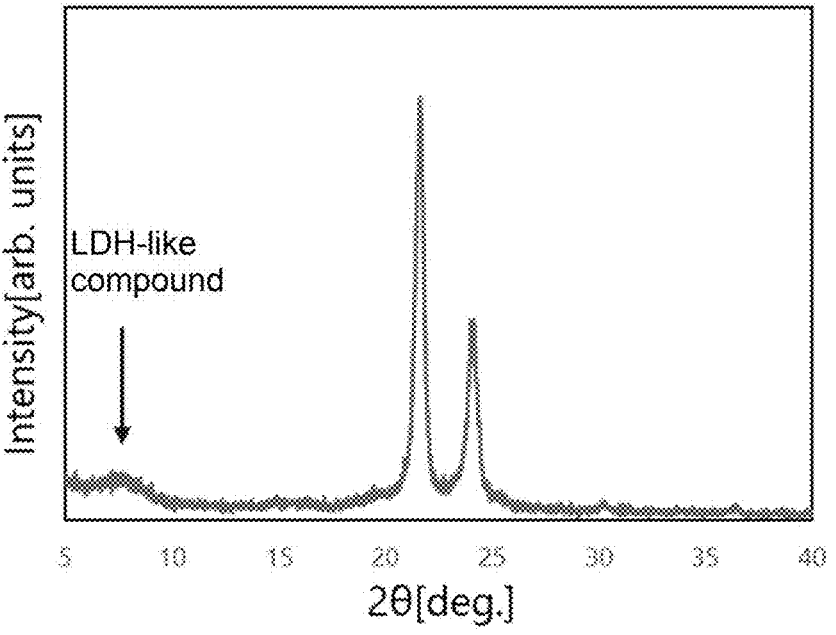
FIG. 17B is the result of X-ray diffraction of the LDH-like compound separator produced in Example B2.

Evaluation 4: FIG. 17B shows the XRD profile obtained in Example B2. In the XRD profile obtained, a peak was observed around $2\theta=7.2°$. Generally, the (003) peak position of LDH is observed at $2\theta=11$ to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at $20<2\theta°<25$ in the XRD profile are peaks derived from polyethylene constituting the porous substrate. Further, the interlayer distance in the layered crystal structure of the LDH-like compound was 1.2 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B3 (Reference)

An LDH-like compound separator was produced and evaluated in the same manner as in Example B1 except that the porous polymer substrate was coated with titania and yttria sols as follows, instead of procedure (2) above.
(Titania-Yttria Sol Coating on Porous Polymer Substrate)

A titanium oxide sol solution (M6, manufactured by Taki Chemical Co., Ltd.) and a yttrium sol were mixed at a molar ratio Ti/Y of 4. The substrate prepared in procedure (1) above was coated with the mixed solution obtained by dip coating. Dip coating was performed by immersing the substrate in 100 ml of the mixed solution and pulling it out perpendicularly, followed by drying at room temperature for 3 hours.

Figure 18A:
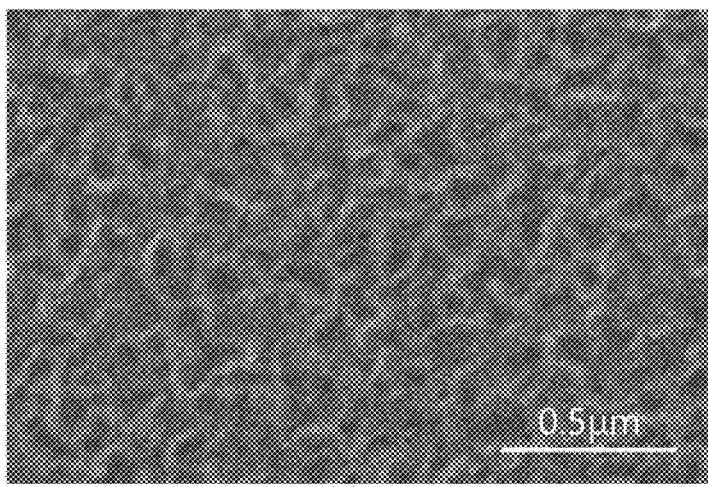
FIG. 18A is an SEM image of a surface of an LDH-like compound separator produced in Example B3.

Evaluation 1: The SEM image of the surface microstructure of the LDH-like compound separator obtained in Example B3 (before roll pressing) was as shown in FIG. 18A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Ti, and Y, which were constituent elements of the LDH-like compound, were detected on the surface of the LDH-like compound separator. Further, the composition ratio (atomic ratio) of Mg, Ti, and Y on the surface of the LDH-like compound separator, which was calculated by EDS elemental analysis, was as shown in Table 2.

Figure 18B:
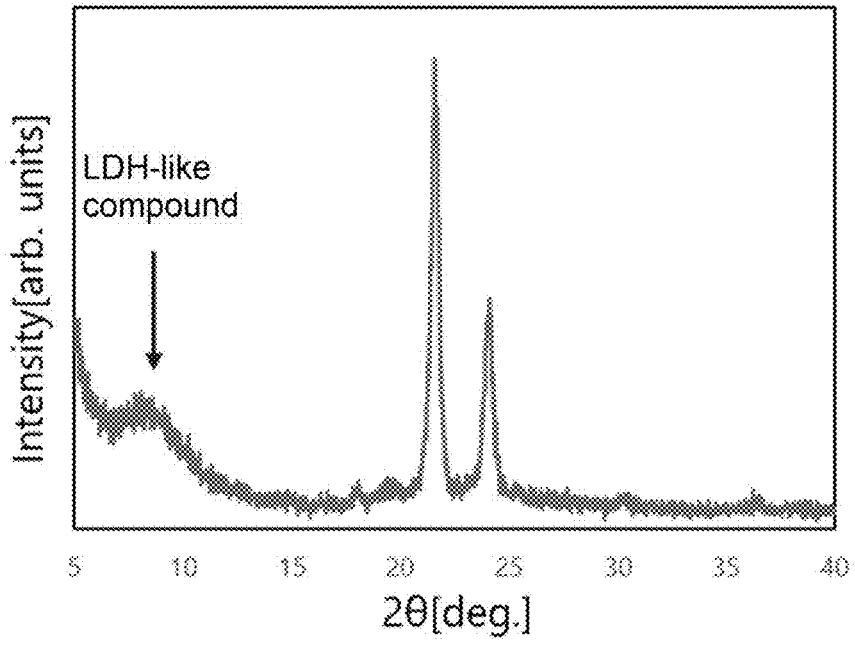
FIG. 18B is the result of X-ray diffraction of the LDH-like compound separator produced in Example B3.

Evaluation 4: FIG. 18B shows the XRD profile obtained in Example B3. In the XRD profile obtained, a peak was observed around $2\theta=8.0°$. Generally, the (003) peak position of LDH is observed at $2\theta=11$ to $12°$, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at $20<2\theta°<25$ in the XRD profile are peaks derived from polyethylene constituting the porous substrate. Further, the interlayer distance in the layered crystal structure of the LDH-like compound was 1.1 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B4 (Reference)

An LDH-like compound separator was produced and evaluated in the same manner as in Example B1 except that the porous polymer substrate was coated with titania, yttria, and alumina sols as follows, instead of procedure (2) above.

(Titania-Yttria-Alumina Sol Coating on Porous Polymer Substrate)

A titanium oxide sol solution (M6, manufactured by Taki Chemical Co., Ltd.), a yttrium sol, and an amorphous alumina solution (Al-ML15, manufactured by Taki Chemical Co., Ltd.) were mixed at a molar ratio Ti/(Y+Al) of 2 and a molar ratio Y/Al of 8. The substrate prepared in procedure (1) above was coated with the mixed solution by dip coating. Dip coating was performed by immersing the substrate in 100 ml of the mixed solution and pulling it out perpendicularly, followed by drying at room temperature for 3 hours.

Figure 19A:
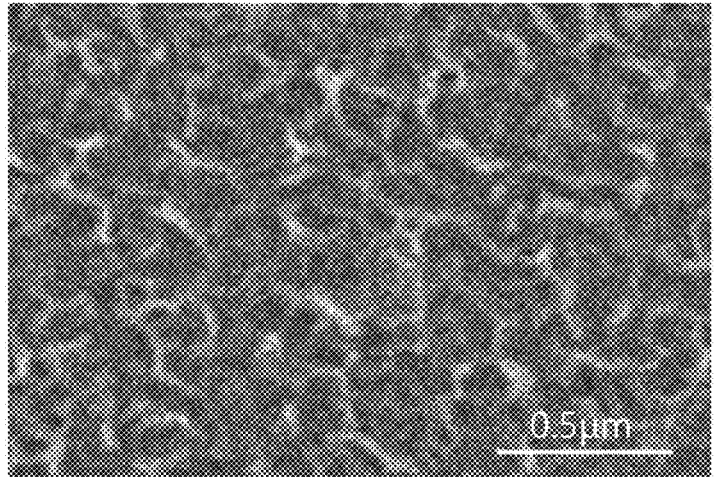
FIG. 19A is an SEM image of a surface of an LDH-like compound separator produced in Example B4.

Evaluation 1: The SEM image of the surface microstructure of the LDH-like compound separator obtained in Example B4 (before roll pressing) was as shown in FIG. 19A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Al, Ti, and Y, which were constituent elements of the LDH-like compound, were detected on the surface of the LDH-like compound separator. Further, the composition ratio (atomic ratio) of Mg, Al, Ti, and Y on the surface of the LDH-like compound separator, which was calculated by EDS elemental analysis, was as shown in Table 2.

Figure 19B:
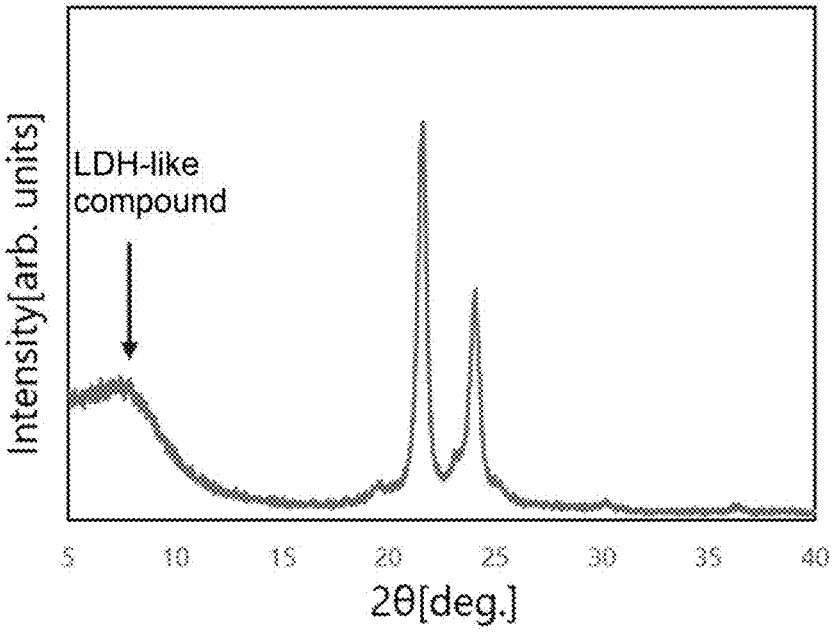
FIG. 19B is the result of X-ray diffraction of the LDH-like compound separator produced in Example B4.

Evaluation 4: FIG. 19B shows the XRD profile obtained in Example B4. In the XRD profile obtained, a peak was observed around $2\theta=7.8°$. Generally, the (003) peak position of LDH is observed at $2\theta=11$ to $12°$, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at $20<2\theta°<25$ in the XRD profile are peaks derived from polyethylene constituting the porous substrate. Further, the interlayer distance in the layered crystal structure of the LDH-like compound was 1.1 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B5 (Reference)

An LDH-like compound separator was produced and evaluated in the same manner as in Example B1 except that the porous polymer substrate was coated with titania and yttria sols as follows, instead of procedure (2) above, and the raw material aqueous solution was produced as follows in procedure (3) above.

(Titania-Yttria Sol Coating on Porous Polymer Substrate)

A titanium oxide sol solution (M6, manufactured by Taki Chemical Co., Ltd.) and a yttrium sol were mixed at a molar ratio Ti/Y of 18. The substrate prepared in procedure (1) above was coated with the mixed solution obtained by dip coating. Dip coating was performed by immersing the substrate in 100 ml of the mixed solution and pulling it out perpendicularly, followed by drying at room temperature for 3 hours.

(Production of Raw Material Aqueous Solution)

As raw materials, magnesium nitrate hexahydrate (Mg$(NO_3)_2$·$6H_2O$, manufactured by KANTO CHEMICAL CO., INC.) and urea ($(NH_2)_2CO$, manufactured by Sigma-Aldrich Corporation) were prepared. The magnesium nitrate hexahydrate was weighed to 0.0075 mol/L and put into a beaker, and deionized water was added thereto so that the total amount was 75 ml. Then, the solution obtained was stirred.

Urea weighed at a ratio urea/$NO_3^-$ (molar ratio)=96 was added into the solution, followed by further stirring, to obtain a raw material aqueous solution.

Figure 20A:
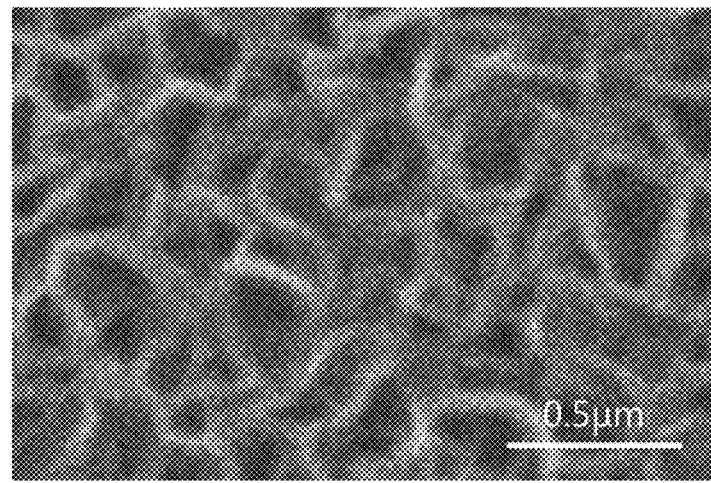
FIG. 20A is an SEM image of a surface of an LDH-like compound separator produced in Example B5.

Evaluation 1: The SEM image of the surface microstructure of the LDH-like compound separator obtained in Example B5 (before roll pressing) was as shown in FIG. 20A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Ti, and Y, which were constituent elements of the LDH-like compound, were detected on the surface of the LDH-like compound separator. Further, the composition ratio (atomic ratio) of Mg, Ti, and Y on the surface of the LDH-like compound separator, which was calculated by EDS elemental analysis, was as shown in Table 2.

Figure 20B:
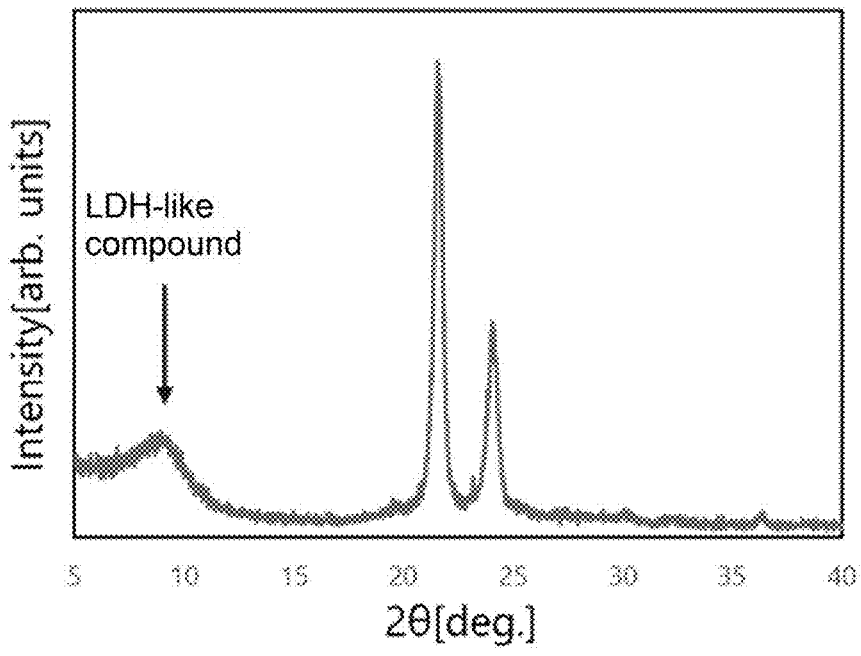
FIG. 20B is the result of X-ray diffraction of the LDH-like compound separator produced in Example B5.

Evaluation 4: FIG. 20B shows the XRD profile obtained in Example B5. In the XRD profile obtained, a peak was observed around $2\theta=8.9°$. Generally, the (003) peak position of LDH is observed at $2\theta=11$ to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at $20<2\theta°<25$ in the XRD profile are peaks derived from polyethylene constituting the porous substrate. Further, the interlayer distance in the layered crystal structure of the LDH-like compound was 0.99 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B6 (Reference)

An LDH-like compound separator was produced and evaluated in the same manner as in Example B1 except that the porous polymer substrate was coated with titania and alumina sols as follows, instead of procedure (2) above, and the raw material aqueous solution was produced as follows in procedure (3) above.

(Titania-Alumina Sol Coating on Porous Polymer Substrate)

A titanium oxide sol solution (M6, manufactured by Taki Chemical Co., Ltd.) and an amorphous alumina solution (Al-ML15, manufactured by Taki Chemical Co., Ltd.) were mixed at a molar ratio Ti/Al of 18. The substrate prepared in procedure (1) above was coated with the mixed solution by dip coating. Dip coating was performed by immersing the substrate in 100 ml of the mixed solution and pulling it out perpendicularly, followed by drying at room temperature for 3 hours.

(Production of Raw Material Aqueous Solution)

As raw materials, magnesium nitrate hexahydrate (Mg$(NO_3)_2$·$6H_2O$, manufactured by KANTO CHEMICAL CO., INC.), yttrium nitrate n hydrate (Y$(NO_3)_3$·n$H_2O$, manufactured by FUJIFILM Wako Pure Chemical Corporation), and urea (($NH_2)_2$CO, manufactured by Sigma-Aldrich Corporation) were prepared. The magnesium nitrate hexahydrate was weighed to 0.0015 mol/L and put into a beaker. Further, the yttrium nitrate n hydrate was weighed to 0.0075 mol/L and put into the beaker, and deionized water was added thereto so that the total amount was 75 ml. Then, the solution obtained was stirred. Urea weighed at a ratio urea/$NO_3^-$ (molar ratio) of 9.8 was added into the solution, followed by further stirring, to obtain a raw material aqueous solution.

Figure 21A:
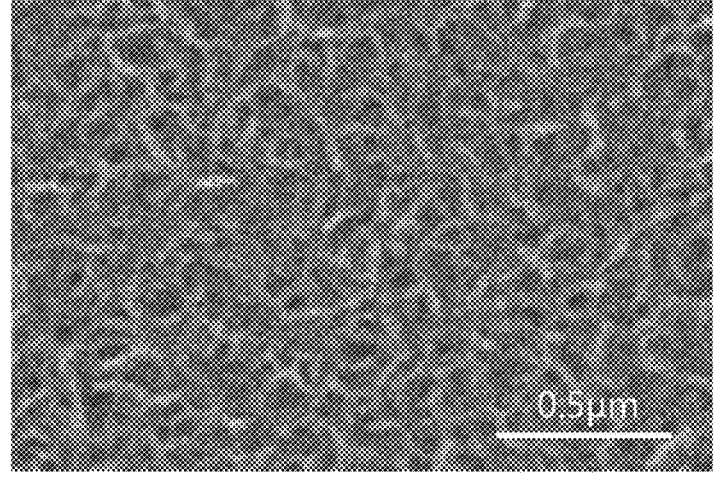
FIG. 21A is an SEM image of a surface of an LDH-like compound separator produced in Example B6.

Evaluation 1: The SEM image of the surface microstructure of the LDH-like compound separator obtained in Example B6 (before roll pressing) was as shown in FIG. 21A.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Al, Ti, and Y, which were constituent elements of the LDH-like compound, were detected on the surface of the LDH-like compound separator. Further, the composition ratio (atomic ratio) of Mg, Al, Ti, and Y on the surface of the LDH-like compound separator, which was calculated by EDS elemental analysis, was as shown in Table 2.

Figure 21B:
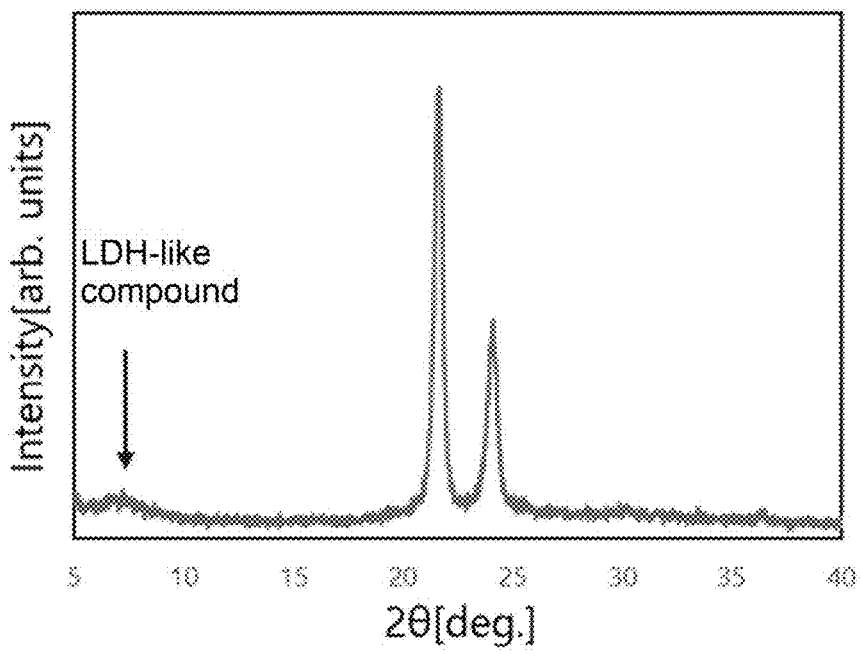
FIG. 21B is the result of X-ray diffraction of the LDH-like compound separator produced in Example B6.

Evaluation 4: FIG. 21B shows the XRD profile obtained in Example B6. In the XRD profile obtained, a peak was observed around $2\theta=7.2°$. Generally, the (003) peak position of LDH is observed at $2\theta=11$ to 12°, and therefore it is considered that the peak is the (003) peak of LDH shifted to the low angle side. Therefore, the peak cannot be called that of LDH, but it suggests that it is a peak derived from a compound similar to LDH (that is, an LDH-like compound). Two peaks observed at $20<2\theta°<25$ in the XRD profile are peaks derived from polyethylene constituting the porous substrate. Further, the interlayer distance in the layered crystal structure of the LDH-like compound was 1.2 nm.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B7 (Reference)

An LDH-like compound separator was produced and evaluated in the same manner as in Example B6 except that the raw material aqueous solution was produced as follows in procedure (3) above.

(Production of Raw Material Aqueous Solution)

As raw materials, magnesium nitrate hexahydrate (Mg $(NO_3)_2 \cdot 6H_2O$, manufactured by KANTO CHEMICAL CO., INC.), yttrium nitrate n hydrate ($Y(NO_3)_3 \cdot nH_2O$, manufactured by FUJIFILM Wako Pure Chemical Corporation), and urea (($NH_2)_2CO$, manufactured by Sigma-Aldrich Corporation) were prepared. The magnesium nitrate hexahydrate was weighed to 0.0075 mol/L and put into a beaker. Further, the yttrium nitrate n hydrate was weighed to 0.0075 mol/L and put into the beaker, and deionized water was added thereto so that the total amount was 75 ml. Then, the solution obtained was stirred. Urea weighed at a ratio urea/$NO_3^-$ (molar ratio) of 25.6 was added into the solution, followed by further stirring, to obtain a raw material aqueous solution.

Figure 22:
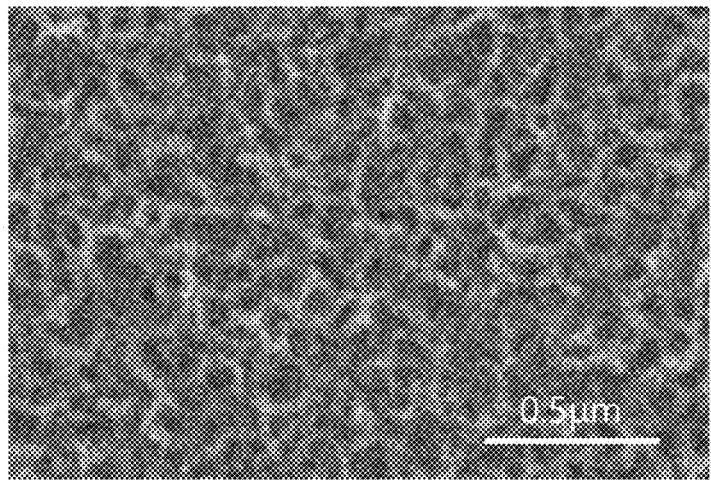
FIG. 22 is an SEM image of a surface of an LDH-like compound separator produced in Example B7.

Evaluation 1: The SEM image of the surface microstructure of the LDH-like compound separator obtained in Example B7 (before roll pressing) was as shown in FIG. 22.

Evaluation 2: From the result that layered plaids could be observed, it was confirmed that the portion of the LDH-like compound separator other than the porous substrate was a compound with a layered crystal structure.

Evaluation 3: As a result of EDS elemental analysis, Mg, Al, Ti, and Y, which were constituent elements of the LDH-like compound, were detected on the surface of the LDH-like compound separator. Further, the composition ratio (atomic ratio) of Mg, Al, Ti, and Y on the surface of the LDH-like compound separator, which was calculated by EDS elemental analysis, was as shown in Table 2.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: The He permeability after immersion in alkali was 0.0 cm/min·atm, as in Evaluation 5, and it was confirmed that the He permeability did not change even after the immersion in alkali at a high temperature of 90° C. for one week, indicating that the alkali resistance was excellent.

Evaluation 8: As shown in Table 2, it was confirmed that short circuits due to zinc dendrites did not occur even after 300 cycles, indicating that the dendrite resistance was excellent.

Example B8 (Comparison)

An LDH separator was produced and evaluated in the same manner as in Example B1 except that alumina sol coating was performed as follows, instead of procedure (2) above.

(Alumina Sol Coating on Porous Polymer Substrate)

The substrate prepared in procedure (1) above was coated with an amorphous alumina sol (Al-ML15, manufactured by Taki Chemical Co., Ltd.) by dip coating. Dip coating was performed by immersing the substrate in 100 ml of the amorphous alumina sol and pulling it out perpendicularly, followed by drying at room temperature for 3 hours.

Figure 23A:
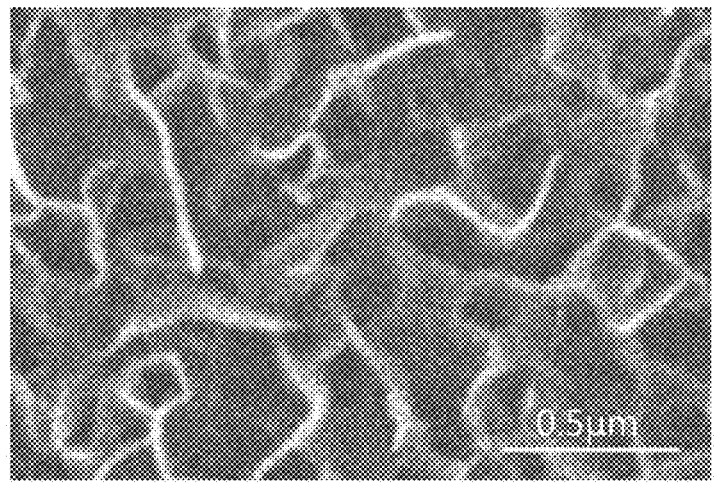
FIG. 23A is an SEM image of a surface of an LDH separator produced in Example B8 (comparison).

Evaluation 1: The SEM image of the surface microstructure of the LDH separator obtained in Example B8 (before roll pressing) was as shown in FIG. 23A.

Evaluation 2: From the result that layered plaids could be observed, it was confirmed that the portion of the LDH separator other than the porous substrate was a compound with a layered crystal structure.

Evaluation 3: As a result of EDS elemental analysis, Mg and Al, which were constituent elements of LDH, were detected on the surface of the LDH separator. Further, the composition ratio (atomic ratio) of Mg and Al on the surface of the LDH separator, which was calculated by EDS elemental analysis, was as shown in Table 2.

Figure 23B:
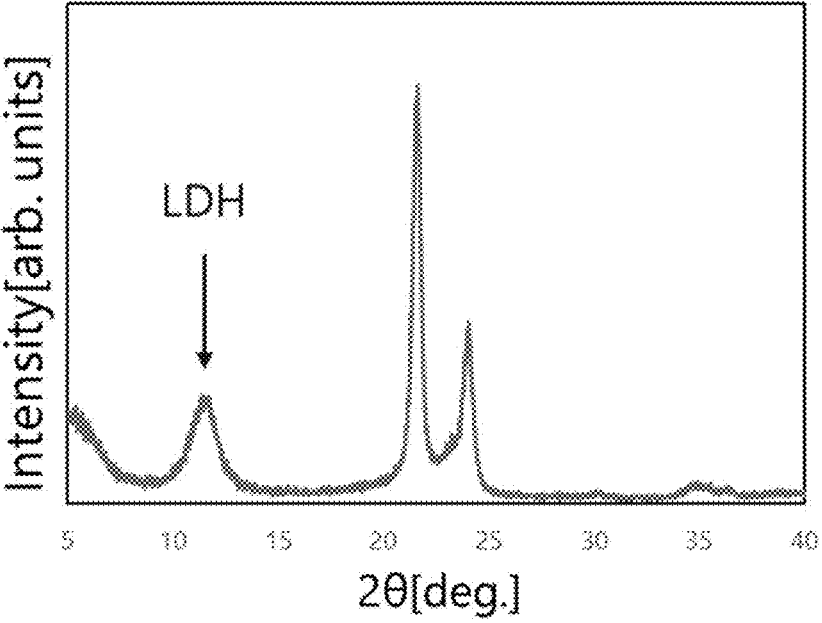
FIG. 23B is the result of X-ray diffraction of the LDH separator produced in Example B8 (comparison).

Evaluation 4: FIG. 23B shows the XRD profile obtained in Example B8. From a peak around $2\theta=11.5°$ in the XRD profile obtained, the LDH separator obtained in Example B8 was identified to be an LDH (hydrotalcite compound). This identification was performed using the diffraction peak of the LDH (hydrotalcite compound) described in JCPDS card NO. 35-0964. Two peaks observed at $20<2\theta°<25$ in the XRD profile are peaks derived from polyethylene constituting the porous substrate.

Evaluation 5: As shown in Table 2, it was confirmed that the He permeability was 0.0 cm/min·atm, indicating that the denseness was extremely high.

Evaluation 6: As shown in Table 2, it was confirmed that the ion conductivity was high.

Evaluation 7: As a result of the immersion in alkali at a high temperature of 90° C. for one week, the He permeability that was 0.0 cm/min·atm in Evaluation 5 was over 10 cm/min·atm, revealing that the alkali resistance was poor.

Evaluation 8: As shown in Table 2, short circuits due to zinc dendrites occurred in less than 300 cycles, revealing that the dendrite resistance was poor.

TABLE 2

| | | | Evaluation of hydroxide ion-conductive separator | | | |
|---|---|---|---|---|---|---|
| | LDH-like compound or composition of LDH | Composition ratio (Atomic ratio) | He permeation (cm/min · atm) | Ion conductivity (mS/cm) | Alkali resistance Presence or absence of change in He permeability | Dendrite resistance Presence or absence of short circuits |
| Example B1# | Mg-Ti-LDH-like | Mg:Ti = 6:94 | 0.0 | 3.0 | Absent | Absent |
| Example B2# | Mg-Ti-LDH-like | Mg:Ti = 20:80 | 0.0 | 2.0 | Absent | Absent |
| Example B3# | Mg-(Ti,Y)-LDH-like | Mg:Ti:Y = 5:83:12 | 0.0 | 3.0 | Absent | Absent |
| Example B4# | Mg-(Ti,Y,Al)-LDH-like | Mg:Al:Ti:Y = 7:3:79:12 | 0.0 | 3.1 | Absent | Absent |
| Example B5# | Mg-(Ti,Y)-LDH-like | Mg:Ti:Y = 6:88:6 | 0.0 | 3.0 | Absent | Absent |

TABLE 2-continued

| | | | Evaluation of hydroxide ion-conductive separator | | | |
|---|---|---|---|---|---|---|
| | LDH-like compound or composition of LDH | Composition ratio (Atomic ratio) | He permeation (cm/min · atm) | Ion conductivity (mS/cm) | Alkali resistance Presence or absence of change in He permeability | Dendrite resistance Presence or absence of short circuits |
| Example B6[#] | Mg-(Ti,Y,Al)-LDH-like | Mg:Al:Ti:Y = 5:2:67:25 | 0.0 | 3.1 | Absent | Absent |
| Example B7[#] | Mg-(Ti,Y,Al)-LDH-like | Mg:Al:Ti:Y = 15:1:47:37 | 0.0 | 2.9 | Absent | Absent |
| Example B8* | Mg-Al-LDH | Mg:Al = 67:32 | 0.0 | 2.7 | Present | Present |

Symbol [#]represents a reference example.
Symbol *represents a comparative example.

Examples C1 to C9

Examples C1 to C9 shown below are reference examples for LDH-like compound separators. The method for evaluating the LDH-like compound separators produced in the following examples was the same as in Examples B1 to B8, except that the composition ratio (atomic ratio) of Mg:Al:Ti:Y: additive element M was calculated in Evaluation 3.

Example C1 (Reference)

(1) Preparation of Polymer Porous Substrate

A commercially available polyethylene microporous membrane having a porosity of 50%, an average pore diameter of 0.1 μm, and a thickness of 20 μm was prepared as a polymer porous substrate and cut out to a size of 2.0 cm×2.0 cm.

(2) Coating of Titania-Yttria-Alumina Sol on Polymer Porous Substrate

A titanium dioxide sol solution (M6, manufactured by Taki Chemical Co., Ltd.), an yttrium sol, and an amorphous alumina solution (Al-ML15, manufactured by Taki Chemical Co. Ltd.) were mixed so that Ti/(Y+Al) (molar ratio)=2, and Y/Al (molar ratio)=8. The substrate prepared in (1) above was coated with the mixed solution by dip coating. The dip coating was carried out by dipping the substrate into 100 ml of the mixed solution, pulling up the coating substrate vertically, and allowing it to dry for 3 hours at room temperature.

(3) Preparation of Raw Material Aqueous Solution (I)

Magnesium nitrate hexahydrate ($Mg(NO_3)_2 \cdot 6H_2O$, manufactured by Kanto Chemical Co., Inc.) and urea (($NH_2)_2CO$, manufactured by Sigma-Aldrich Co. LLC) were prepared as raw materials. Magnesium nitrate hexahydrate was weighed so that it would be 0.015 mol/L and placed in a beaker, and ion-exchanged water was added therein to make a total amount of 75 ml. After stirring the obtained solution, the urea weighed at a ratio that urea/$NO_3^-$ (molar ratio)=48 was added to the solution, and the mixture was further stirred to obtain a raw material aqueous solution (I).

(4) Membrane Formation by Hydrothermal Treatment

Both the raw material aqueous solution (I) and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH-like compound was formed on the surface and the inside of the substrate by subjecting it to hydrothermal treatment at a hydrothermal temperature of 120° C. for 22 hours. With an elapse of the predetermined time, the substrate was taken out from the airtight container, washed with ion-exchanged water, and dried at 70° C. for 10 hours to form an LDH-like compound inside the pores of the porous substrate.

(5) Preparation of Raw Material Aqueous Solution (II)

Indium sulfate n-hydrate ($In_2(SO_4)_3nH_2O$, manufactured by FUJIFILM Wako Pure Chemical Corporation) was prepared as the raw material. The Indium sulfate n-hydrate was weighed so that it would be 0.0075 mol/L and placed in a beaker, to which ion-exchanged water was added to make a total volume 75 ml. The resulting solution was stirred to obtain a raw material aqueous solution (II).

(6) Addition of Indium by Immersion Treatment

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter Indium was added on the substrate by subjecting it to immersion treatment at 30° C. for 1 hour. With an elapse of the predetermined time, the substrate was taken out from the airtight container, washed with ion-exchanged water, and dried at 70° C. for 10 hours to obtain an LDH-like compound separator with Indium added thereon.

(7) Densification by Roll Pressing

The LDH-like compound separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH-like compound separator.

(8) Evaluation Result

Various evaluations were conducted on the LDH-like compound separators obtained. The results were as follows.

Figure 24:
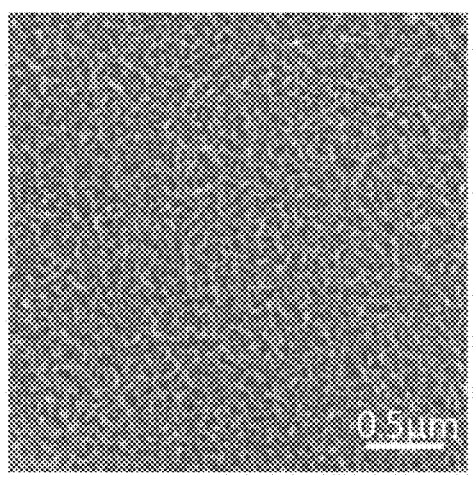
FIG. 24 is an SEM image of a surface of the LDH-like compound separator produced in Example C1.

Evaluation 1: The SEM image of surface microstructure of the LDH-like compound separator obtained in Example C1 (before having been roll pressed) was shown in FIG. 24.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Al, Ti, Y, and In were detected on the surface of the LDH-like compound separator. Moreover, the composition ratio (atomic ratio) of Al, Ti, Y, and In on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: As shown in Table 3, the high ionic conductivity was confirmed.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, the excellent dendrite resistance was confirmed in that there was no short circuit due to zinc dendrites even after 300 cycles.

Example C2 (Reference)

An LDH-like compound separator was fabricated and evaluated in the same manner as in Example C1 except that the time of immersion treatment was changed to 24 hours in indium addition by the immersion treatment of (6) above.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Al, Ti, Y, and In were detected on the surface of the LDH-like compound separator. Moreover, the composition ratio (atomic ratio) of Al, Ti, Y, and In on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C3 (Reference)

An LDH-like compound separator was fabricated and evaluated in the same manner as in Example C1 except that the titania-yttria sol coating was carried out as follows instead of (2) above.

(Coating of Titania-Yttria Sol on Polymer Porous Substrate)

A titanium dioxide sol solution (M6, manufactured by Taki Chemical Co., Ltd.) and an yttrium sol were mixed so that Ti/Y (molar ratio)=2. The substrate prepared in (1) above was coated with the obtained mixed solution by dip coating. The dip coating was carried out by dipping the substrate into 100 ml of the mixed solution, pulling up the coating substrate vertically, and allowing it to dry for 3 hours at room temperature.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Ti, Y, and In were detected on the surface of the LDH-like compound separator. Moreover, the composition ratio (atomic ratio) of Ti, Y, and In on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C4 (Reference)

An LDH-like compound separator was fabricated and evaluated in the same manner as in Example C1 except that the preparation of the raw material aqueous solution (II) in (5) above was carried out as follows, and bismuth was added by immersion treatment as follows instead of (6) above.

(Preparation of Raw Material Aqueous Solution (II))

Bismuth nitrate pentahydrate ($Bi(NO_3)_3·5H_2O$) was prepared as the raw material. The bismuth nitrate pentahydrate was weighed so that it would be 0.00075 mol/L and placed in a beaker, to which ion-exchanged water was added to make a total volume 75 ml. The resulting solution was stirred to obtain a raw material aqueous solution (II).

(Addition of Bismuth by Immersion Treatment)

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter bismuth was added on the substrate by subjecting it to immersion treatment at 30° C. for 1 hour. With an elapse of the predetermined time, the substrate was taken out from the airtight container, washed with ion-exchanged water, and dried at 70° C. for 10 hours to obtain an LDH-like compound separator with bismuth added thereon.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Mg, Al, Ti, Y, and Bi were detected on the surface of the LDH-like compound separator. Moreover, the composition ratio (atomic ratio) of Mg, Al, Ti, Y, and Bi on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C5 (Reference)

An LDH-like compound separator was fabricated and evaluated in the same manner as in Example C4 except that the time of immersion treatment was changed to 12 hours in bismuth addition by the immersion treatment described above.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Mg, Al, Ti, Y, and Bi were detected on the surface of the LDH-like compound separator. Moreover, the composition ratio (atomic ratio) of Mg, Al, Ti, Y, and Bi on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C6 (Reference)

An LDH-like compound separator was fabricated and evaluated in the same manner as in Example C4 except that the time of immersion treatment was changed to 24 hours in bismuth addition by the immersion treatment described above.

Evaluation 2: From the observation result of layered lattice stripes, the portion other than the porous substrate of the LDH-like compound separator was confirmed to be a compound having a layered crystal structure Evaluation 3: As a result of EDS elemental analysis, the constituent elements of the LDH-like compound that were Mg, Al, Ti, Y, and Bi were detected on the surface of the LDH-like compound separator. Moreover, the composition ratio (atomic ratio) of Mg, Al, Ti, Y, and Bi on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C7 (Reference)

An LDH-like compound separator was fabricated and evaluated in the same manner as in Example C1 except that the preparation of the raw material aqueous solution (II) in (5) above was carried out as follows, and calcium was added by immersion treatment as follows instead of (6) above.

(Preparation of Raw Material Aqueous Solution (II))

Calcium nitrate tetrahydrate ($Ca(NO_3)_2·4H_2O$) was prepared as the raw material. The calcium nitrate tetrahydrate was weighed so that it would be 0.015 mol/L and placed in a beaker, to which ion-exchanged water was added to make a total volume 75 ml. The resulting solution was stirred to obtain a raw material aqueous solution (II).

(Addition of Calcium by Immersion Treatment)

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter calcium was added on the substrate by subjecting it to immersion treatment at 30° C. for 6 hours. With an elapse of the predetermined time, the substrate was taken out from the airtight container, washed with ion-exchanged water, and dried at 70° C. for 10 hours to obtain an LDH-like compound separator with calcium added thereon.

Evaluation 2: From the observation result of layered lattice stripes, the portion other than the porous substrate of the LDH-like compound separator was confirmed to be a compound having a layered crystal structure Evaluation 3: As a result of EDS elemental analysis, the constituent elements of the LDH-like compound that were Mg, Al, Ti, Y, and Ca were detected on the surface of the LDH-like compound separator. Moreover, the composition ratio (atomic ratio) of Mg, Al, Ti, Y, and Ca on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C8 (Reference)

An LDH-like compound separator was fabricated and evaluated in the same manner as in Example C1 except that the preparation of the raw material aqueous solution (II) in (5) above was carried out as follows, and strontium was added by immersion treatment as follows instead of (6) above.

(Preparation of Raw Material Aqueous Solution (II))

Strontium nitrate $(Sr(NO_3)_2)$ was prepared as the raw material. The strontium nitrate was weighed so that it would be 0.015 mol/L and placed in a beaker, to which ion-exchanged water was added to make a total volume 75 ml. The resulting solution was stirred to obtain a raw material aqueous solution (II).

(Addition of Strontium by Immersion Treatment)

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter strontium was added on the substrate by subjecting it to immersion treatment at 30° C. for 6 hours. With an elapse of the predetermined time, the substrate was taken out from the airtight container, washed with ion-exchanged water, and dried at 70° C. for 10 hours to obtain an LDH-like compound separator with strontium added thereon.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Mg, Al, Ti, Y, and Sr were detected on the surface of the LDH-like compound separator. Moreover, the composition ratio (atomic ratio) of Mg, Al, Ti, Y, and Sr on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

Example C9 (Reference)

An LDH-like compound separator was fabricated and evaluated in the same manner as in Example C1 except that the preparation of the raw material aqueous solution (II) in (5) above was carried out as follows, and barium was added by immersion treatment as follows instead of (6) above.

(Preparation of Raw Material Aqueous Solution (II))

Barium nitrate $(Ba(NO_3)_2)$ was prepared as the raw material. The barium nitrate was weighed so that it would be 0.015 mol/L and placed in a beaker, to which ion-exchanged water was added to make a total volume 75 ml. The resulting solution was stirred to obtain a raw material aqueous solution (II).

(Addition of Barium by Immersion Treatment)

In a Teflon® airtight container (autoclave container having a content of 100 ml and an outer side jacket made of stainless steel), the raw material aqueous solution (II) and the LDH-like compound separator obtained in (4) above were enclosed together. At that time, a substrate was fixed while being floated from the bottom of the Teflon® airtight container and arranged vertically so that the solution was in contact with both sides of the substrate. Thereafter barium was added on the substrate by subjecting it to immersion treatment at 30° C. for 6 hours. With an elapse of the predetermined time, the substrate was taken out from the airtight container, washed with ion-exchanged water, and dried at 70° C. for 10 hours to obtain an LDH-like compound separator with barium added thereon.

Evaluation 2: From the observation result of layered lattice stripes, the portion other than the porous substrate of the LDH-like compound separator was confirmed to be a compound having a layered crystal structure.

Evaluation 3: As a result of EDS elemental analysis, the constituent elements of the LDH-like compound that were Al, Ti, Y, and Ba were detected on the surface of the LDH-like compound separator. Moreover, the composition ratio (atomic ratio) of Al, Ti, Y, and Ba on the surface of the LDH-like compound separator, calculated by EDS elemental analysis was as shown in Table 3.

Evaluation 5: As shown in Table 3, the extremely high denseness was confirmed by a He permeability of 0.0 cm/min·atm.

Evaluation 6: The high ionic conductivity was confirmed, as shown in Table 3.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 3, no short circuit caused by zinc dendrite occurred even after 300 cycles, confirming the excellent dendrite resistance.

TABLE 3

| | | | | | | Evaluation of hydroxide ion-conductive separator | |
| | | | | | | | |
| | | Composition ratio (atomic ratio relative to 100 of the total amount of Mg + Al + Ti + Y + M) | M/(Mg + Al + Ti + Y + M) | He permeability (cm/min · atm) | Ion conductivity (mS/cm) | Alkali resistance Presence or absence of change in He permeability | Dendrite resistance Presence or absence of short circuit |
| | LDH-like compound or LDH composition | | | | | | |
| Example C1[#] | Al,Ti,Y,In-LDH-like | Mg: 0, Al: 2, Ti: 78, Y: 8, In: 12 | 0.12 (M = In) | 0.0 | 3.1 | Absent | Absent |
| Example C2[#] | Al,Ti,Y,In-LDH-like | Mg: 0, Al: 1, Ti: 56, Y: 11, In: 32 | 0.32 (M = In) | 0.0 | 3.1 | Absent | Absent |
| Example C3[#] | Ti,Y,In-LDH-like | Mg: 0, Al: 0, Ti: 78, Y: 8, In: 14 | 0.14 (M = In) | 0.0 | 3.0 | Absent | Absent |
| Example C4[#] | Mg,Al,Ti,Y,Bi-LDH-like | Mg: 2, Al: 2, Ti: 81, Y: 12, Bi: 3 | 0.03 (M = Bi) | 0.0 | 2.9 | Absent | Absent |
| Example C5[#] | Mg,Al,Ti,Y,Bi-LDH-like | Mg: 2, Al: 2, Ti: 72, Y: 10, Bi: 14 | 0.14 (M = Bi) | 0.0 | 2.8 | Absent | Absent |
| Example C6[#] | Mg,Al,Ti,Y,Bi-LDH-like | Mg: 1, Al: 1, Ti: 66, Y: 7, Bi: 25 | 0.25 (M = Bi) | 0.0 | 2.8 | Absent | Absent |
| Example C7[#] | Mg,Al,Ti,Y,Ca-LDH-like | Mg: 1, Al: 3, Ti: 73, Y: 15, Ca: 8 | 0.08 (M = Ca) | 0.0 | 2.8 | Absent | Absent |
| Example C8[#] | Mg,Al,Ti,Y,Sr-LDH-like | Mg: 1, Al: 3, Ti: 74, Y: 14, Sr: 8 | 0.08 (M = Sr) | 0.0 | 3.0 | Absent | Absent |
| Example C9[#] | Al,Ti,Y,Ba-LDH-like | Mg: 0, Al: 4, Ti: 71, Y: 14, Ba: 11 | 0.11 (M = Ba) | 0.0 | 2.8 | Absent | Absent |
| Example B8* | Mg,Al-LDH | Mg: 68 Al: 32 | 0 | 0.0 | 2.7 | Present | Present |

Symbol [#]represents a reference example.
Symbol *represents a comparative example.

Examples D1 and D2

Examples D1 and D2 shown below are reference examples for LDH-like compound separators. The method for evaluating the LDH-like compound separators produced in the following examples was the same as in Examples B1 to B8, except that the composition ratio (atomic ratio) of Mg:Al:Ti:Y:In was calculated in Evaluation 3.

Example D1 (Reference)

(1) Preparation of Polymer Porous Substrate

A commercially available polyethylene microporous membrane having a porosity of 50%, an average pore diameter of 0.1 μm, and a thickness of 20 μm was prepared as a polymer porous substrate and cut out to a size of 2.0 cm×2.0 cm.

(2) Coating of Titania-Yttria-Alumina Sol on Polymer Porous Substrate

A titanium dioxide sol solution (M6, manufactured by Taki Chemical Co., Ltd.), an yttrium sol, and an amorphous alumina solution (Al-ML15, manufactured by Taki Chemical Co. Ltd.) were mixed so that Ti/(Y+Al) (molar ratio)=2, and Y/Al (molar ratio)=8. The substrate prepared in (1) above was coated with the mixed solution by dip coating. The dip coating was carried out by dipping the substrate into 100 ml of the mixed solution, pulling up the coating substrate vertically, and allowing it to dry for 3 hours at room temperature.

(3) Preparation of Raw Material Aqueous Solution

As the raw materials, magnesium nitrate hexahydrate $(Mg(NO_3)_2 \cdot 6H_2O$, manufactured by Kanto Chemical Co., Inc.), indium sulfate n-hydrate $(In(SO_4)_3 \cdot nH_2O$, manufactured by FUJIFILM Wako Pure Chemicals Corporation), and urea $((NH_2)_2CO$, manufactured by Sigma-Aldrich Co. LLC) were prepared. Magnesium nitrate hexahydrate, indium sulfate n-hydrate, and the urea were weighed so as to adjust the concentrations thereof to 0.0075 mol/L, 0.0075 mol/L, and 1.44 mol/L, respectively and placed in a beaker, to which ion-exchanged water was added to make a total volume 75 ml. The resulting solution was stirred to obtain a raw material aqueous solution.

(4) Membrane Formation by Hydrothermal Treatment

Both the raw material aqueous solution and the dip-coated substrate were sealed in a Teflon® airtight container (autoclave container having a content of 100 ml and an outer side jacket made of stainless steel). At this time, a substrate was fixed while being floated from the bottom of the Teflon® airtight container, and installed vertically so that the solution was in contact with both sides of the substrate. Thereafter, an LDH-like compound was formed on the surface and the inside of the substrate by subjecting it to hydrothermal treatment at a hydrothermal temperature of 120° C. for 22 hours. With an elapse of the predetermined time, the substrate was taken out from the airtight container, washed with ion-exchanged water, and dried at 70° C. for 10 hours to allow for forming of a functional layer including an LDH-like compound and $In(OH)_3$ inside pores of the porous substrates. Thus, an LDH-like compound separator was obtained.

(5) Densification by Roll Pressing

The LDH-like compound separator was sandwiched between a pair of PET films (Lumiler® manufactured by Toray Industries, Inc., thickness of 40 μm), and roll-pressed at a roll rotation speed of 3 mm/s, a roller heating temperature of 70° C., and a roll gap of 70 μm to obtain a further densified LDH-like compound separator.

(6) Evaluation Result

Evaluations 1 to 8 were conducted for the LDH-like compound separators obtained. The results were as follows.

Figure 25:
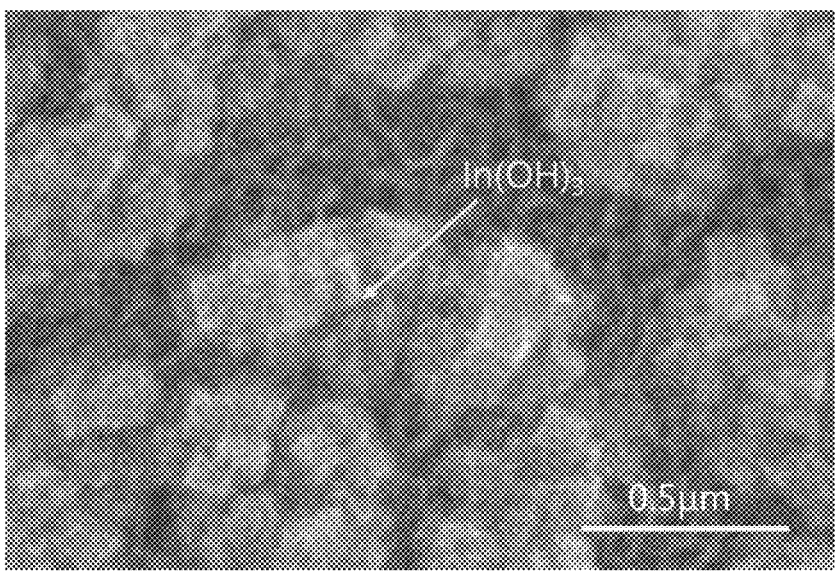
FIG. 25 is an SEM image of a surface of the LDH-like compound separator produced in Example D1.

Evaluation 1: The SEM image of surface microstructure of the LDH-like compound separator obtained in Example D1 (before having been roll pressed) was shown in FIG. 25. As shown in FIG. 25, cubic crystals were confirmed to be observed on the surface of the LDH-like compound separator. The results of EDS elemental analysis and X-ray diffraction measurement described below demonstrate that these cubic crystals are presumed to be $In(OH)_3$.

Evaluation 2: From the observation result of layered lattice stripes, the LDH-like compound separator was confirmed to include a compound with a layered crystal structure.

Evaluation 3: As a result of EDS elemental analysis, the constituent elements of the LDH-like compound or $In(OH)_3$, which were Mg, Al, Ti, Y, and In were detected on the surface of the LDH-like compound separator. Moreover, in the cubic crystals present on the surface of the LDH-like compound separator, In that was a constituent element of $In(OH)_3$, was detected. The composition ratio (atomic ratio) of Mg, Al, Ti, Y, and In on the surface of the LDH-like compound separator, calculated by EDS elemental analysis is as shown in Table 4.

Evaluation 4: The peaks in the XRD profile obtained identified that $In(OH)_3$ was present in the LDH-like compound separator. This identification was conducted using the diffraction peaks of $In(OH)_3$ listed in JCPDS card No. 01-085-1338.

Evaluation 5: As shown in Table 4, the extremely high denseness was confirmed by a He permeability of 0.0 cm/min·atm.

Evaluation 6: As shown in Table 4, the high ionic conductivity was confirmed.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 4, the excellent dendrite resistance was confirmed in that there was no short circuit due to zinc dendrites even after 300 cycles.

Example D2 (Reference)

An LDH-like compound separator was fabricated and evaluated in the same manner as in Example D1 except that the titania-yttria sol coating was carried out as follows instead of (2) above.

coating. The dip coating was carried out by dipping the substrate into 100 ml of the mixed solution, pulling up the coating substrate vertically, and allowing it to dry for 3 hours at room temperature.

Figure 26:
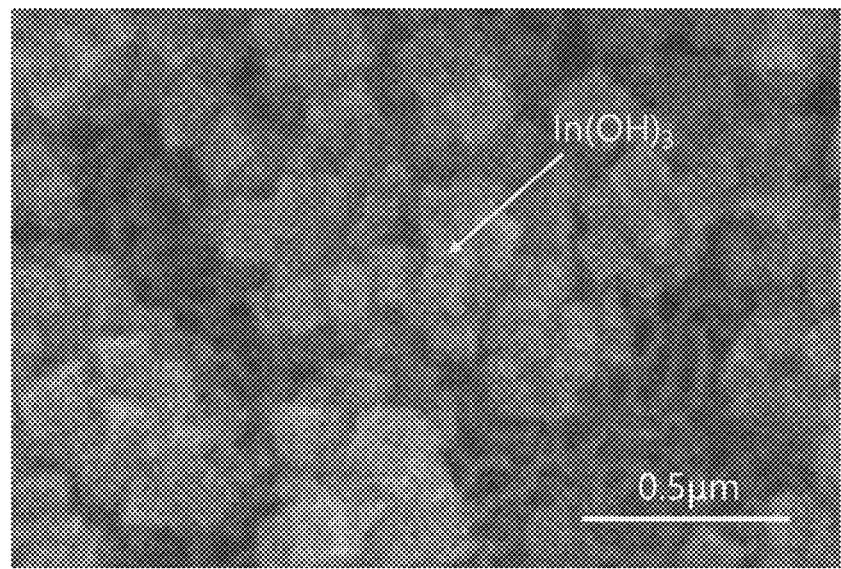
FIG. 26 is an SEM image of a surface of the LDH-like compound separator produced in Example D2.

Evaluation 1: The SEM image of surface microstructure of the LDH-like compound separator obtained in Example D2 (before being roll pressed) is as shown in FIG. 26. As shown in FIG. 26, cubic crystals were confirmed to be observed on the surface of the LDH-like compound separator. The results of EDS elemental analysis and X-ray diffraction measurement described below demonstrate that these cubic crystals are presumed to be $In(OH)_3$.

Evaluation 2: From the observation result of layered lattice stripes, the LDH-like compound separator was confirmed to include a compound having a layered crystal structure.

Evaluation 3: As a result of EDS elemental analysis, the constituent elements of the LDH-like compound or $In(OH)_3$, which were Mg, Ti, Y, and In were detected on the surface of the LDH-like compound separator. Moreover, in the cubic crystals on the surface of the LDH-like compound separator, In that is a constituent element of $In(OH)_3$, was detected. The composition ratio (atomic ratio) of Mg, Ti, Y, and In on the surface of the LDH-like compound separator, calculated by EDS elemental analysis is as shown in Table 4.

Evaluation 4: The peaks in the XRD profile obtained identified that $In(OH)_3$ was present in the LDH-like compound separator. This identification was conducted using the diffraction peaks of $In(OH)_3$ listed in JCPDS card No. 01-085-1338.

Evaluation 5: As shown in Table 4, the extremely high denseness was confirmed by a He permeability of 0.0 cm/min·atm.

Evaluation 6: The high ionic conductivity was confirmed, as shown in Table 4.

Evaluation 7: The He permeability after alkaline immersion was 0.0 cm/min·atm, as in Evaluation 5, and the He permeability remained unchanged even over one week of alkaline immersion at the elevated temperature of 90° C., confirming the excellent alkali resistance.

Evaluation 8: As shown in Table 4, no short circuit caused by zinc dendrite occurred even after 300 cycles, confirming the excellent dendrite resistance.

TABLE 4

| | | | | | | Evaluation of hydroxide ion-conductive separator | |
|---|---|---|---|---|---|---|---|
| | Constitution of functional layer | Composition ratio (atomic ratio relative to 100 of total amount of Mg + Al + Ti + Y + In) | In/(Mg + Al + Ti + Y + In) | He permeability (cm/min · atm) | Ion conductivity (mS/cm) | Alkali resistance Presence or absence of change in He permeability | Dendrite resistance Presence or absence of short circuit |
| Example D1# | LDH-like + In(OH)₃ | Mg: 7, Al: 1, Ti: 24, Y: 3, In: 65 | 0.65 | 0.0 | 2.7 | Absent | Absent |
| Example D2# | LDH-like + In(OH)₃ | Mg: 6, Al: 0, Ti: 17, Y: 3, In: 74 | 0.74 | 0.0 | 2.8 | Absent | Absent |
| Example B8* | LDH | Mg: 68, Al: 32 | 0 | 0.0 | 2.7 | Present | Present |

The Symbol #represents a reference example.
The Symbol *represents a comparative example.

(Coating of Titania-Yttria Sol on Polymer Porous Substrate)

A titanium dioxide sol solution (M6, manufactured by Taki Chemical Co., Ltd.) and an yttrium sol were mixed so that Ti/Y (molar ratio)=2. The substrate prepared in (1) above was coated with the obtained mixed solution by dip

What is claimed is:

1. A battery with a layered double hydroxide (LDH)-like compound, the battery comprising:
   a positive electrode;
   a negative electrode;

an electrolytic solution being an aqueous alkali metal hydroxide solution; and an LDH-like compound provided so as to be in contact with the electrolytic solution, wherein a metal compound containing at least one metal element constituting the LDH-like compound is dissolved in the electrolytic solution such that erosion of the LDH-like compound by the electrolytic solution is suppressed.

2. The battery according to claim 1, wherein the LDH-like compound is:

(a) a hydroxide and/or an oxide with a layered crystal structure, containing: Mg and Ti; and optionally one or more selected from the group consisting of Y and Al, or (b) a hydroxide and/or an oxide with a layered crystal structure, comprising (i) Ti, Y, and optionally Al and/or Mg, and (ii) at least one additive element M selected from the group consisting of In, Bi, Ca, Sr, and Ba, or (c) a hydroxide and/or an oxide with a layered crystal structure, comprising Mg, Ti, Y, and optionally Al and/or In, wherein in (c) the LDH-like compound is present in a form of a mixture with In $(OH)_3$.

3. The battery according to claim 1, wherein the aqueous alkali metal hydroxide solution is an aqueous potassium hydroxide solution.

4. The battery according to claim 1, wherein the metal element is dissolved in the electrolytic solution in the form of a metal ion, a hydroxide, and/or a hydroxy complex.

5. The battery according to claim 1, wherein the metal compound is preliminarily dissolved in the electrolytic solution.

6. The battery according to claim 1, wherein the LDH-like compound comprises Al, and wherein the metal compound comprises Al.

7. The battery according to claim 6, wherein the electrolytic solution has an Al concentration of 0.1 mol/L or more.

8. The battery according to claim 6, wherein the electrolytic solution has an Al concentration of 2.0 mol/L or more.

9. The battery according to claim 1, wherein the metal compound is aluminum hydroxide and/or γ-alumina.

10. The battery according to claim 1, wherein the battery comprises the LDH-like compound as a separator exhibiting hydroxide ion conductivity, and the separator separates the positive electrode from the negative electrode.

11. The battery according to claim 10, wherein the separator further comprises an additional material other than the LDH-like compound.

12. The battery according to claim 11, wherein the additional material is a polymer.

13. The battery according to claim 11, wherein the separator is densified to exhibit water impermeability and gas impermeability.

14. The battery according to claim 10, wherein the separator further comprises a porous substrate, and the LDH-like compound plugs pores in the porous substrate.

15. The battery according to claim 14, wherein the porous substrate is composed of a polymer material.

16. The battery according to claim 1, wherein the negative electrode is coated with the LDH-like compound.

\* \* \* \* \*